(12) United States Patent
Ebina et al.

(10) Patent No.: US 6,300,940 B1
(45) Date of Patent: Oct. 9, 2001

(54) INPUT DEVICE FOR A COMPUTER AND THE LIKE AND INPUT PROCESSING METHOD

(75) Inventors: Kiyoshi Ebina, Kashihara; Takatoshi Mizoguchi, Gojyo; Shinya Kawanishi, Tenri; Mitsuo Kobachi, Mie-ken; Nobumasa Ono, Hashimoto; Akihiro Fujita, Nara-ken, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/271,459

(22) Filed: Mar. 18, 1999

Related U.S. Application Data

(62) Division of application No. 08/577,242, filed on Dec. 22, 1995, now Pat. No. 5,943,233.

(30) Foreign Application Priority Data

| Dec. 26, 1994 | (JP) | 6-322382 |
| Dec. 26, 1994 | (JP) | 6-322383 |
| Mar. 17, 1995 | (JP) | 7-58575 |
| Mar. 24, 1995 | (JP) | 7-066071 |
| Jun. 27, 1995 | (JP) | 7-161157 |

(51) Int. Cl.⁷ .................................................. G09G 5/08
(52) U.S. Cl. ............................ 345/161; 345/160; 700/85
(58) Field of Search .................................. 345/156, 157, 345/158, 160, 161, 163, 167, 168, 164, 165, 173, 175; 341/22; 250/221; 700/85

(56) References Cited

U.S. PATENT DOCUMENTS

| 3,886,361 | 5/1975 | Wester | 250/221 |
| 4,533,827 | 8/1985 | Fincher | 250/221 |
| 4,686,361 | 8/1987 | Bard | 250/221 |
| 5,065,146 | 11/1991 | Garrett | 345/161 |
| 5,355,148 | * 10/1994 | Anderson | 345/163 |
| 5,504,502 | * 4/1996 | Arita et al. | 345/160 |
| 5,530,455 | * 6/1996 | Gillick et al. | 345/156 |
| 5,563,629 | 10/1996 | Caprara | 345/160 |
| 5,621,207 | 4/1997 | O'Mara | 250/221 |
| 5,724,068 | 3/1998 | Sanchez et al. . | |

FOREIGN PATENT DOCUMENTS

| 47-25946 | 7/1972 | (JP) . |
| 61-6235 | 1/1986 | (JP) . |
| 61-157238 | 9/1986 | (JP) . |
| 62-31417 | 2/1987 | (JP) . |
| 63-170726 | 7/1988 | (JP) . |
| 1-259411 | 10/1989 | (JP) . |
| 3-48919 | 3/1991 | (JP) . |
| 3-48985 | 3/1991 | (JP) . |
| 3-196326 | 8/1991 | (JP) . |
| 4-277816 | 10/1992 | (JP) . |
| 5-233139 | 9/1993 | (JP) . |
| 5303466 | 11/1993 | (JP) . |
| 5313816 | 11/1993 | (JP) . |
| 5324186 | 12/1993 | (JP) . |
| 6-289989 | 10/1994 | (JP) . |
| 6-324801 | 11/1994 | (JP) . |

* cited by examiner

Primary Examiner—Dennis-Doon Chow

(57) ABSTRACT

The input device which includes a reflection type optical sensor having light emitting means and light receiving means; an operation section disposed facing the optical sensor, the operation section being tilted when a load is applied thereto; and output means for detecting a tilt status of the operation section based on signals from the light receiving means and outputting detected results to a computer body as positional information.

27 Claims, 75 Drawing Sheets

Rotation around X axis

Rotation around Y axis

Angle X-axis rotational direction (°)

FIG. 48A
X-axis rotational signal
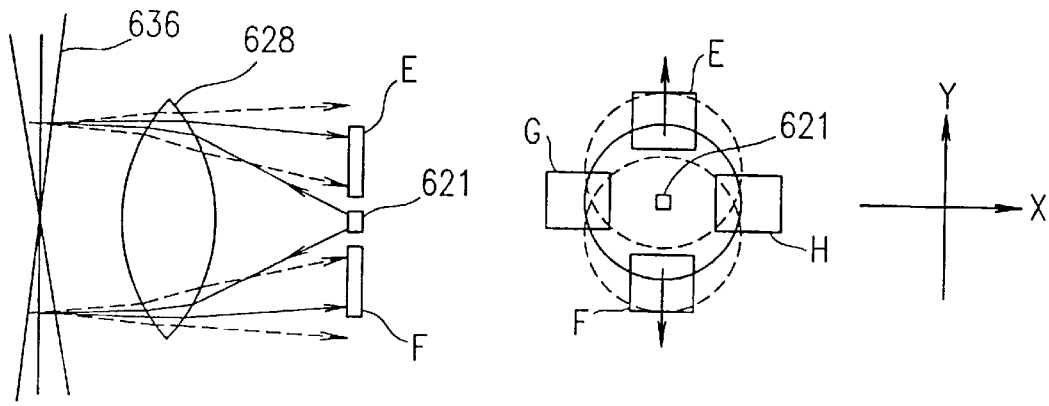
FIG. 48B
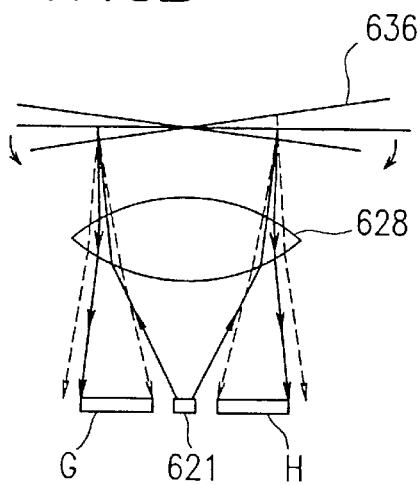
Y-axis rotational angle
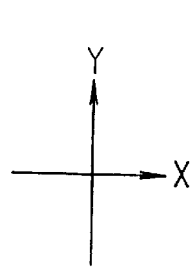

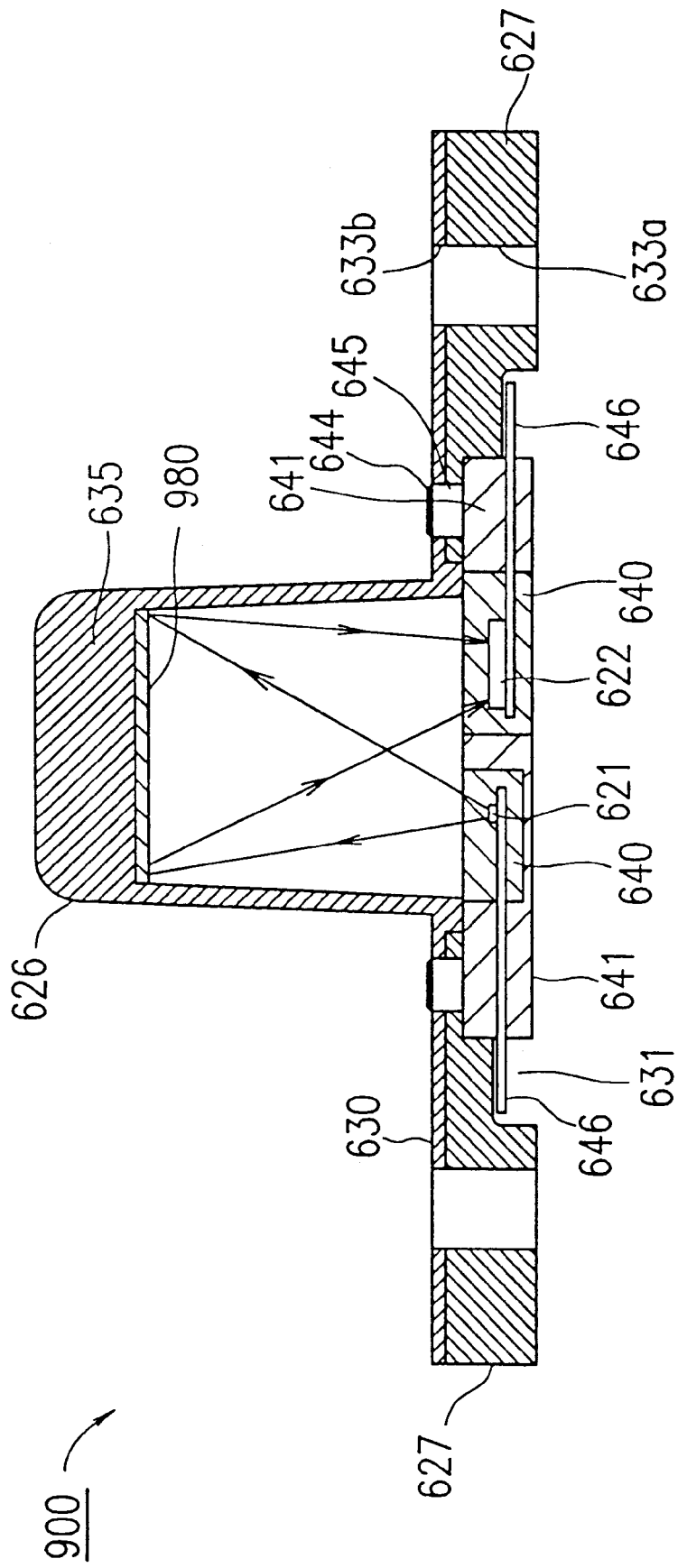

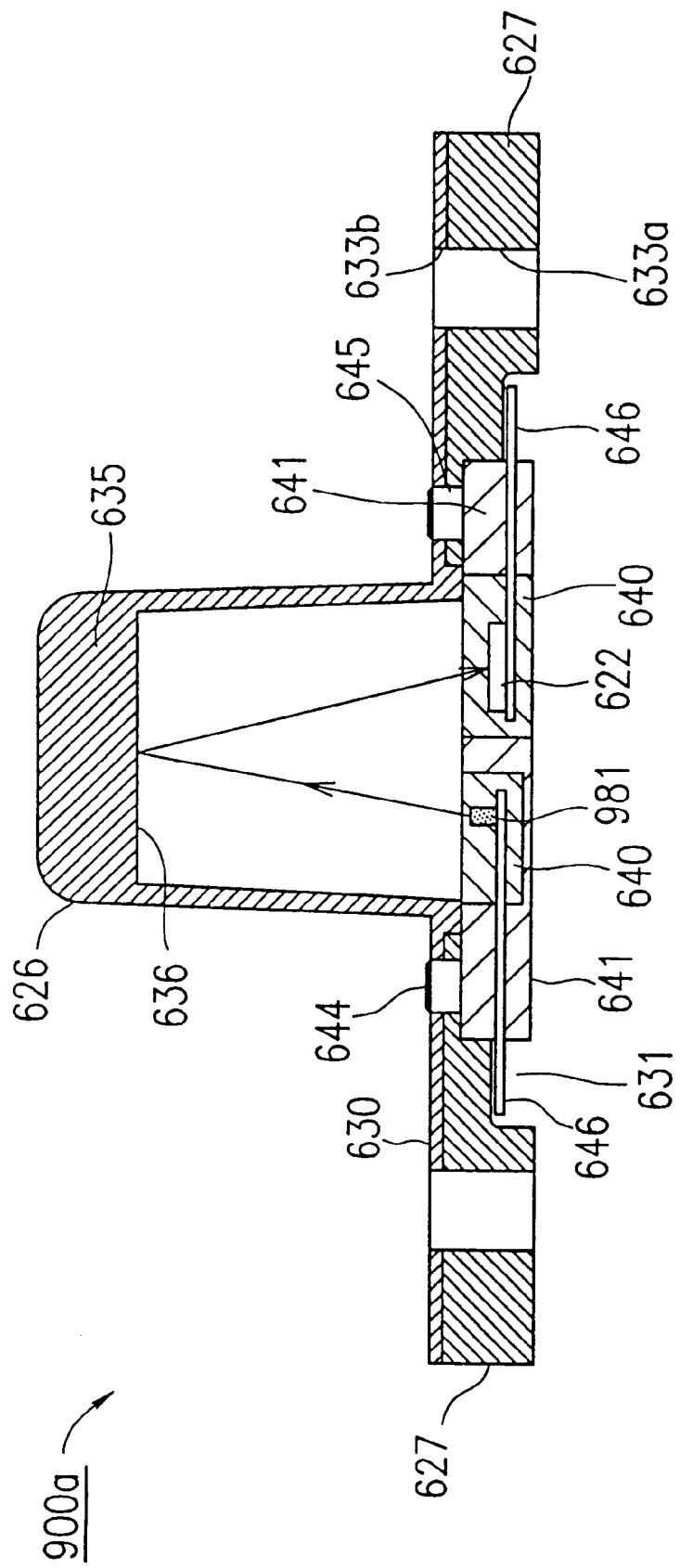

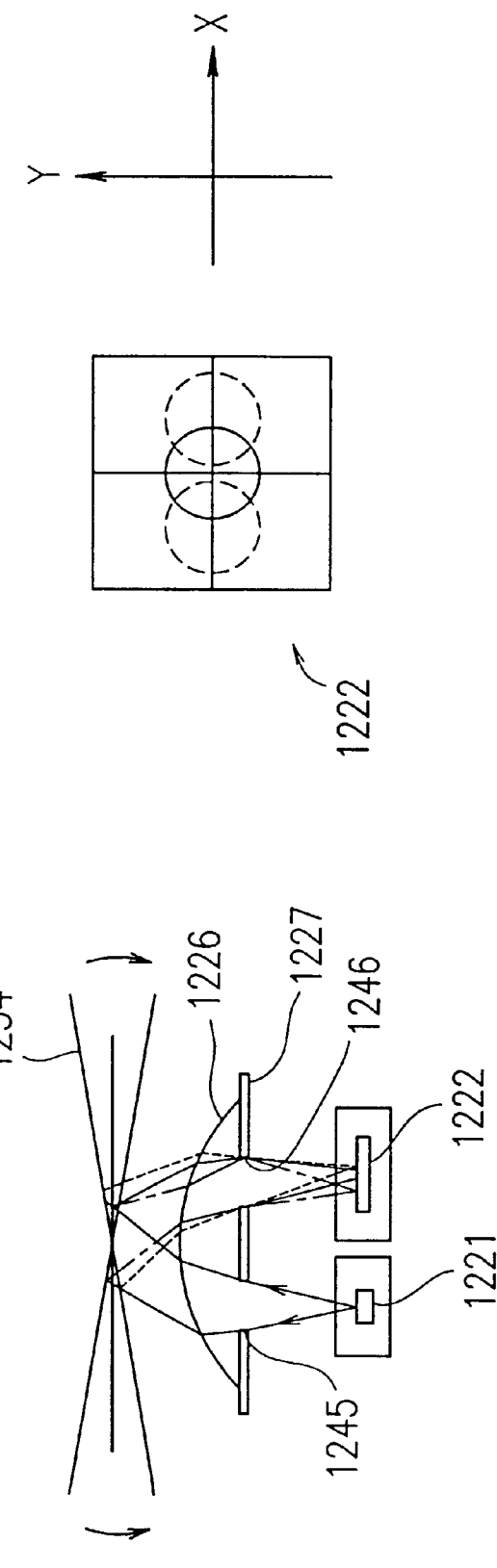

Angle X-axis rotational direction (°)

Angle Y-axis rotational direction (°)

PRIOR ART

PRIOR ART

PRIOR ART

PRIOR ART

INPUT DEVICE FOR A COMPUTER AND THE LIKE AND INPUT PROCESSING METHOD

This application is a Div. of Ser. No. 08/577,242 filed Dec. 22, 1995, now U.S. Pat. No. 5,943,233.

BACKGROUND OF THE INVENTION

1. Field of the Invention

The present invention relates to an input device for shifting the position of a cursor or an icon on a display screen for a computer or the like, and an input processing method using such an input device.

2. Description of the Related Art

Conventionally, a track ball and mouse have been used as a pointing device, i.e., an input device for shifting the position of a cursor or an icon on a display screen. As shown in FIG. 91, a track ball 1 is located, for example, on a keyboard 3 of a personal computer 2. A ball 4 portion of the track ball 1 is rotated with a finger, so as to allow a cursor or an icon on a screen of the personal computer 2 to shift in a direction and by an amount determined by the direction and amount of the rotation of the ball 4.

Referring to FIG. 92, the operational principle of the track ball 1 will be briefly described. Rotary encoders 7 and 8 are disposed in two directions, X axis and Y axis, with respect to the ball 4. The encoders 7 and 8 include rollers 5 and 6, respectively, for detecting the direction and amount of rotation of the ball 4. The rotary encoders 7 and 8 generate signals indicating the direction and amount of the rotation of the ball 4. The signals are converted into electric signals corresponding to the X-axis direction and the Y-axis direction, and are transmitted to the circuitry included as part of the personal computer body. The computer body instructs the cursor or the icon on the screen to shift according to the received signals.

Each of the rotary encoders 7 and 8 includes a rotary plate 11 having a plurality of slits 10 and two sets made up of an LED 12 and a light receiving element 13 disposed to face each other with the rotary plate 11 therebetween. The rotary encoders 7 and 8 are connected to shafts 9a and 9b in the X-axis and Y-axis directions, respectively. When the ball 4 rotates in the X-axis direction, for example, the shaft 9a in the X-axis direction rotates, which rotates the rotary plate 11 of the rotary encoder 7. The rotation of the rotary plate 11 allows light emitted from the LEDs 12 to be pulsed as a result of passing through the slits 10. The pulsed signal is then converted into an electric signal by the light receiving elements 13. Thus, the rotational direction and the number of increments of rotation of the rotary plate 11 are detected, and thereby the amount of rotation of the ball 4 in the X-axis direction is determined. The position of the cursor or the icon on the screen is thus shifted in a direction on the screen corresponding to the X-axis direction by the determined amount of rotation. When the rotational direction of the ball 4 is 45° with respect to the X axis and the Y axis, signals indicating the rotational direction and the same amount of rotation are obtained from both the X-axis and Y-axis rotary encoders 7 and 8 simultaneously. In such a case, the position of the cursor or the icon shifts obliquely according to the signals from the X-axis and Y-axis rotary encoders 7 and 8 as is known.

Now, referring to FIGS. 93 and 94, a mouse will be described. A mouse 15 has a ball 16, similar to the ball 4 of the track ball 1, in the lower position thereof. The mouse 15 is moved forward, backward, rightward, and leftward on an operation board 17 or on a desk, so as to shift a cursor or an icon on a computer screen. Then, a click button 18 is pressed to conduct an input operation. The inner structure of the mouse 15 is substantially the same as that of the track ball 1.

In the track ball 1, the rollers 5 and 6 which transmit the rotation of the ball 4 to the rotary encoders 7 and 8 may slip on the ball 4. This may cause malfunction of the track ball 1. Further, since it is structurally difficult to seal the rotary encoders 7 and 8, the slits 10 may be clogged with dust which has entered inside of the rotary encoders 7 and 8. This may also cause malfunction of the track ball 1. Moreover, since spaces for the track ball 1 and a mechanical operation portion for the track ball 1 are required, it is difficult to reduce the size of the personal computer.

The mouse 15 has the same problem as the track ball 1 since the mechanism for detecting the rotation of the ball 16 is the same as that of the track ball 1. Additionally, since the mouse 15 is separated from the personal computer and moved on the operation board 17 or on a desk so as to rotate the ball 16, a plane for moving the mouse 15 is required. Accordingly, the mouse is not applicable to small-size portable personal computers.

Instead of the above-described mechanical mouse 15, there is also available an optical mouse where a light emitting element and a light receiving element are provided to detect an amount of movement of the mouse in each of the X-axis and Y-axis directions. The optical mouse requires no mechanical operation portion. However, it requires a specific operation board on which the mouse is maneuvered. Therefore, the problem of the mouse requiring an additional operation space is not settled.

FIGS. 95A, 95B, and 96 show a pointing stick 20 which requires a smaller operation space than the track ball 1 and the mouse 15. The pointing stick 20 includes a rectangular parallelopiped resin rigid body 21, distortion sensors 22 attached to the four faces of the rigid body 21, and a cylindrical cover 23 covering the rigid body 21 with a space therebetween. When the cover 23 is pressed, the distortion sensors 22 detect the direction of the pressing. A cursor or an icon is shifted according to the detected direction. The pointing stick 20 with the above structure is disposed between keys 26 in a keyboard 25 of a personal computer body 24 as shown in FIG. 96. This arrangement makes it possible to significantly reduce the area and volume occupied by the pointing stick 20. However, since the pointing stick 20 is of a contact type using a contact or a distortion sensor, the reliability and the durability are low. Accordingly, a non-contact type with high reliability and durability is desirable for a frequently-used pointing device. The pointing stick 20 is also disadvantageous in the aspect of cost because the configuration for subsequent input processing is complicate.

The above conventional input devices only allow the cursor and the like to shift upward, downward, rightward, and leftward. With the recent advent of the computer graphics, it becomes necessary to also shift the cursor and the like in the depth direction of the screen. In the conventional input devices, three-dimensional screen control is not possible.

Two-dimensional input operation is possible for all of the above input devices (pointing devices). However, there requires separate switches for a click function and a drag function to realize the input operation. These switches prevent the input devices from being made smaller and more compact.

SUMMARY OF THE INVENTION

The input device for a computer of this invention includes: a reflection type optical sensor having light emitting means and light receiving means; an operation section disposed facing the optical sensor, the operation section being tilted when a load is applied thereto; and output means for detecting a tilt status of the operation section based on signals from the light receiving means and outputting detected results to a computer body as positional information.

Alternatively, the input device for a computer of the present invention includes: light emitting means for emitting a light; two position sensitive detectors for optically detecting a position on which the light is incident and outputting signals in accordance with a detection result; and output means for outputting to a computer body screen input information based on the signals from the two position sensitive detectors.

Alternatively, the input device for a computer of the present invention includes: a movable body which displaces upon receipt of a load in a two-dimensional direction; a light emitting element for emitting light; and a light receiving element for receiving an image of the light from the light emitting element shifting in association with the displacement of the movable body, wherein the movable body, the light emitting element, and the light receiving element are integrally formed.

According to another aspect of the invention, an input device for a computer having a three-dimensional input function for a display of the computer is provided. The device includes: a movable body which displaces three-dimensionally upon receipt of a load in a three-dimensional direction; a light emitting element for emitting light; a light receiving element optically coupled with the light emitting element for receiving an image of the light shifting in association with the displacement of the movable body; and an optical section for regulating the light passing toward the light receiving element, wherein the light emitting element, the light receiving element, and the optical section are integrally formed.

According to still another aspect of the invention, an input processing method for an input device for a computer is provided. The method includes the steps of: detecting a shift of an image of light emitted from a light emitting element and shifting in association with a displacement of a movable body; determining from the shift of the image of light vectors in two directions crossing each other at right angles corresponding to a direction and amount of the displacement; and synthesizing the vectors in the two directions to obtain a synthesized vector and calculating a direction and amount of operation from the synthesized vector.

Alternatively, the input processing method for an input device for a computer of the present invention includes the steps of: detecting an image of light shifting in association with a movable body displaced by a three-dimensional operation; determining a first direction output amount and a second direction output amount from the shift of the image of the light according to a two-dimensional displacement among the displacement by the three-dimensional operation; determining a third direction output amount from a change of the amount of the light according to a remaining one-directional displacement; and calculating a direction and amount of the three-dimensional operation from the first direction output amount, the second direction output amount, and the third direction output amount.

Alternatively, the input processing method for an input device for a computer of the present invention includes the steps of: detecting an image of light shifting in association with a movable body displaced by a three-dimensional operation by a user; determining a first direction output amount and a second direction output amount from the shift of the image of the light according to a two-dimensional displacement among the displacement by the three-dimensional operation; determining a third direction output amount from a change of the amount of the light according to a remaining one-directional displacement; calculating a direction and amount of the two-dimensional operation from the first direction output amount and the second direction output amount; and judging ON/OFF for a click function from the third direction output amount.

In the above input device, when the operation section is tilted in a direction where the user desires to shift the cursor, light emitted from the light emitting element is reflected by the reflection plate and reaches the light receiving element. The light receiving element outputs a current corresponding to the tilt status of the operation section to the output means. The output means calculates a value based on the output of the light receiving element and outputs the calculated results corresponding to the tilt direction and amount of the operation section to a control circuit of the computer body as an x direction output and a y direction output.

The computer body calculates the shift direction and speed of the cursor based on the positional information and shifts the cursor on the display under the calculated conditions.

The entire output amount from the light receiving element changes by pressing the operation section. By detecting this change and outputting an ON signal to the computer body, the operation section can be provided with the click function.

In the above input device, when light emitted from the light source reaches the PSDs (position sensitive detectors) after being reflected by a finger tip and the like or directly, each of the PSDs outputs a current corresponding to the light incident position thereon. The output means calculates values based on the output currents from the PSDs and outputs the calculated results to the computer body as screen input information The computer body determines the shift direction and speed of the cursor based on the screen input information, so as to shift the cursor on the display. Alternatively, a line is drawn according to the movement of the light source, so as to display a character, a code, and the like on the screen.

In the above input device, when the operation section is operated forward, backward, leftward, rightward, upward, and downward in a direction where the user desires to move a cursor on a screen, light emitted from the light emitting element reaches the PSDs after being reflected by the operation section. The PSDs output currents corresponding to the tilt status and the vertical position of the operation section. The output means calculates values based on the outputs of the PSDs and outputs the calculated results corresponding to the tilt direction and amount of the operation section to the computer body as an x direction output, a y direction output, and a z direction output.

The computer body calculates the shift direction and speed of the cursor based on the three-dimensional positional information, so as to shift the cursor on the display three-dimensionally.

In the above input device, when the movable section is operated by the user and displaced, the displacement is detected by the detector composed of the light emitting element, the light receiving element, and the like. In other words, the image of light from the light emitting element shifts in association with the displacement of the movable body. This shift of the light image is detected by the light receiving element. The direction of the load applied to the movable body is represented by the two crossing axial directions, a vector of the axial direction outputs is obtained, and the direction and amount of the operation is calculated from the synthesized vector. Based on the calculated results, the shift direction and speed of the cursor on the display is determined. Thus, the cursor shift according to the operation of the movable body is realized.

The above input device can adopt the detection by a non-contact optical method, which provides high reliability and durability. Further, when the input device is disposed in a space surrounded by keys of the keyboard, space savings can be realized. Alternatively, when the device is large enough to be handled with the palm of the user and is disposed separately from the corresponding apparatus such as a computer, operability as high as that provided by the mouse can be obtained. Since this type of the input device is not required to be moved on a plane, unlike in the case of the mouse, space savings can be realized.

In the above input device, when a load is applied to the movable section in three dimensions to displace the movable section three-dimensionally, light emitted from the light emitting element reaches the light receiving element after being restricted by a light shader. The received light image moves on the light receiving element in association with the displacement of the movable section. In other words, the light image moves on the light receiving element for the two-dimensional displacement of the movable section. Based on this shift, the two-dimensional direction outputs, i.e., the first and second direction outputs can be obtained. As for the displacement of the movable section in the third direction, the amount of light received by the light receiving element changes because the light shader restricts the optical path. This change of the light amount is used to determine the third direction output. The direction and amount of the three-dimensional operation are then calculated based on these three direction outputs. The calculated results are then given to the apparatus such as a computer so as to shift a cursor or the like on a display.

A click function can be realized by generating an ON signal or an OFF signal based on the amount of the third-dimensional direction output and inputting the ON or OFF signal into the apparatus such as a computer. Thus, a multi-functional input device can be realized.

Thus, the invention described herein makes possible the advantages of (1) providing an input device for a computer with high durability and reliability which does not require a large operation space and does not include a mechanical operation portion, (2) providing an input device for a computer allowing for three-dimensional image input operation, (3) providing a non-contact type input device with high reliability and durability having an operability as high as that of a mouse, (4) providing an input processing method using such an input device, and (5) providing an input device for a computer or the like having multiple functions for input operation such as a three-dimensional input function and a click function.

These and other advantages of the present invention will become apparent to those skilled in the art upon reading and understanding the following detailed description with reference to the accompanying figures.

BRIEF DESCRIPTION OF THE DRAWINGS

FIGS. 48A and 48B are views showing the shift of a light image when the displacement is around the X axis and the Y axis, respectively.

FIG. 50 is a sectional view of a ninth example of the input device according to the present invention.

FIG. 51 is a sectional view of an input device employing a tilt sensor without a lens according to the present invention.

FIGS. 65A to 65D show alternative elastic sections according to the present invention.

FIGS. 73A and 73B show the displacement of a reflection surface around the Y-axis direction and the shift of the light image caused by the displacement shown in FIG. 73A, respectively.

DESCRIPTION OF THE PREFERRED EMBODIMENTS

EXAMPLE 1

A first example of the input device according to the present invention will be described with reference to FIGS. 1 to 6.

Figure 1:
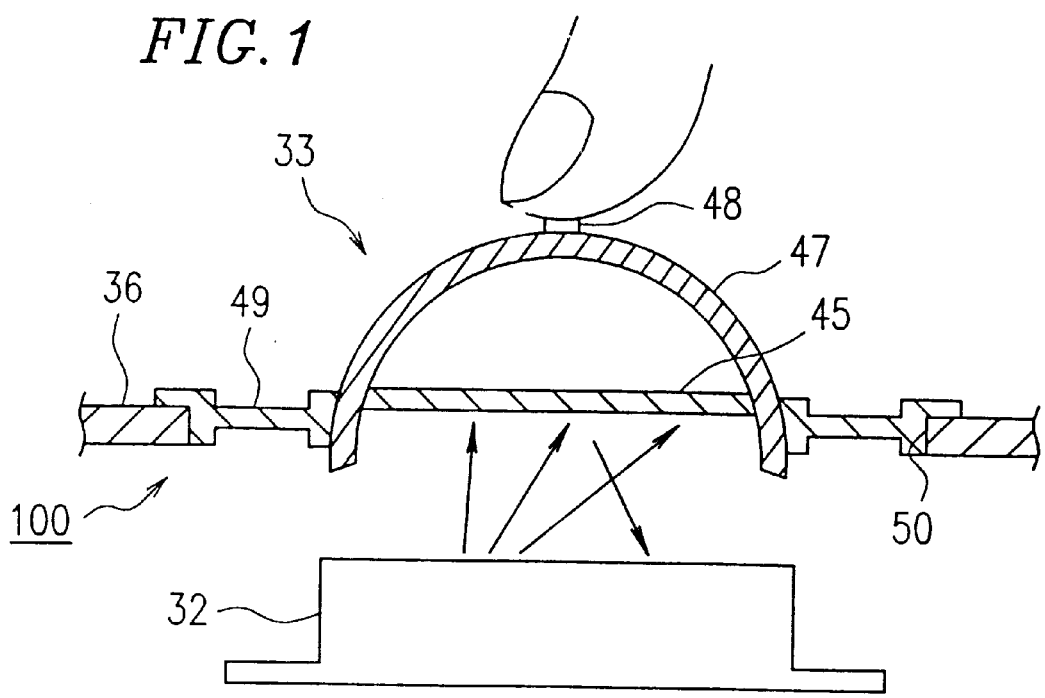
FIG. 1 is a sectional view of a first example of the input device according to the present invention.
Figure 2:
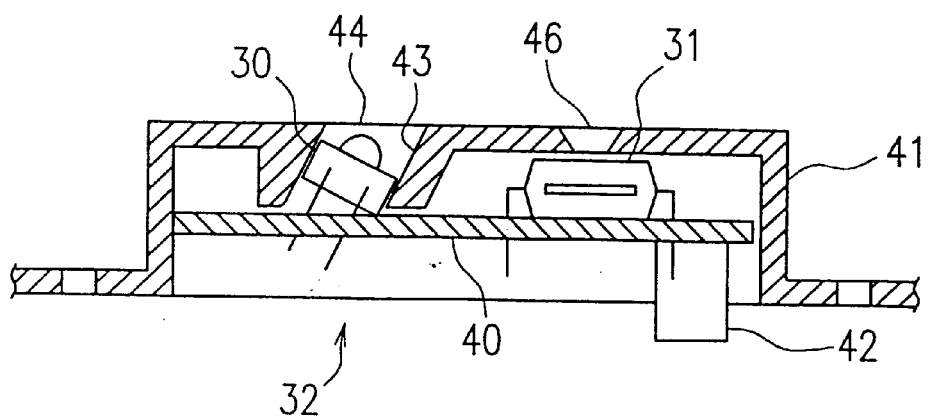
FIG. 2 is a sectional view of an optical sensor according to the present invention.
Figure 3:
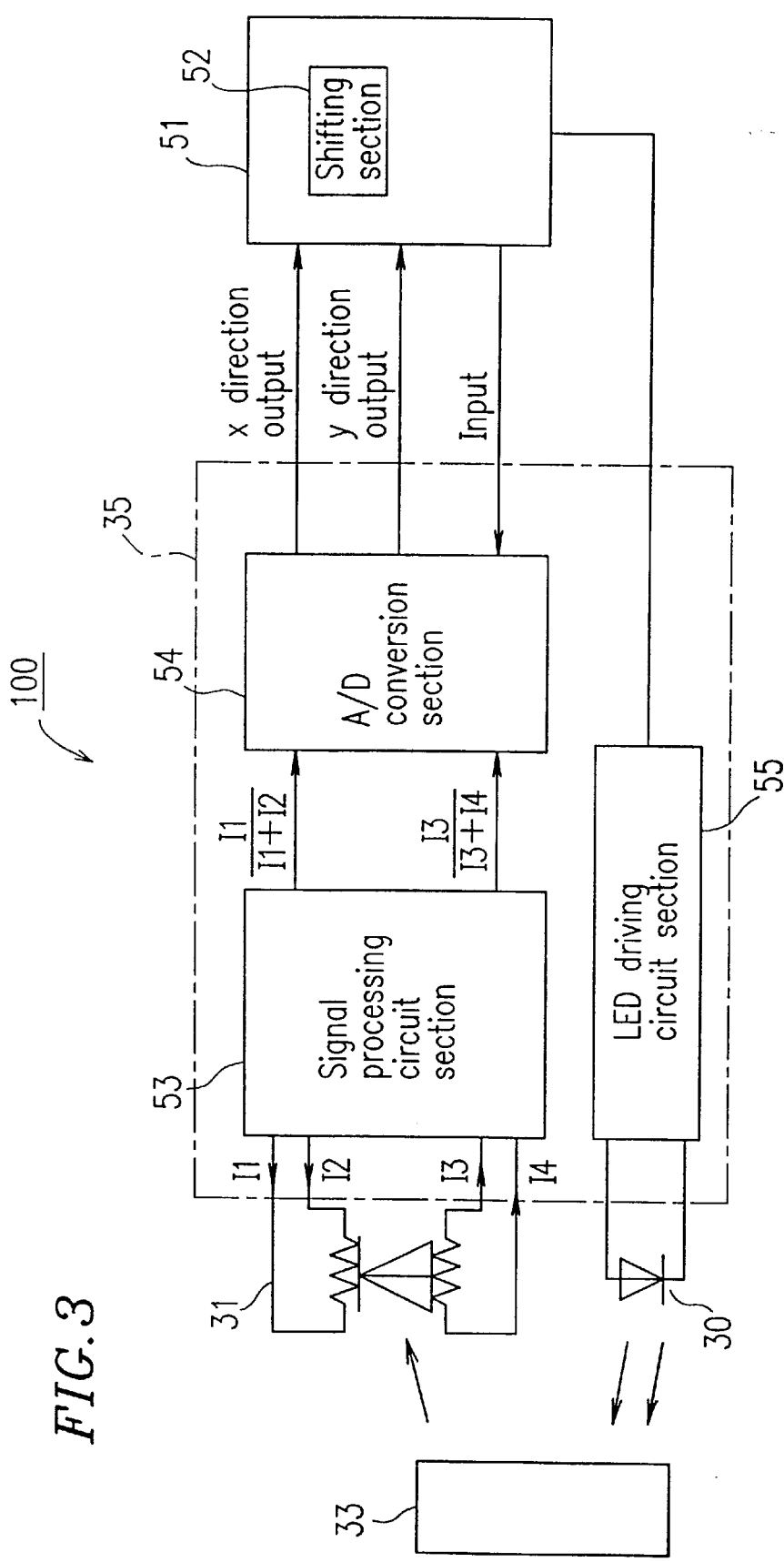
FIG. 3 is a block diagram of the input device according to the present invention.
Figure 4:
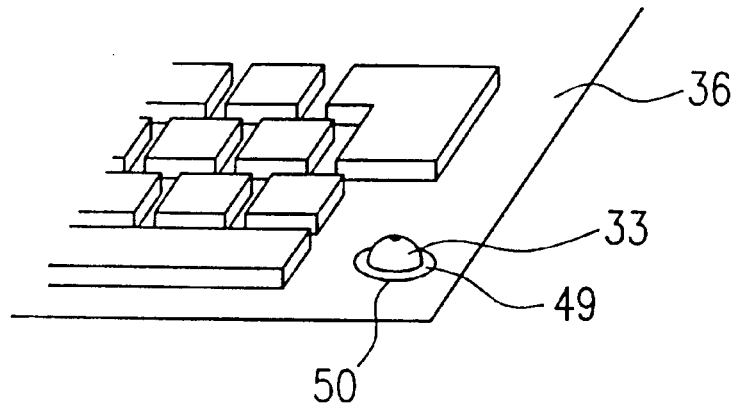
FIG. 4 is a view showing the position of the input device according to the present invention.

FIGS. 1, 2, and 3 schematically show a configuration of an input device 100 of Example 1. The input device 100, which is used for a computer or the like, includes a reflection type optical sensor 32, an input operation section 33 disposed above the optical sensor 32 in such a manner that it can be tilted relative to the optical sensor 32, and an output circuit 35 (FIG. 3). The reflection type optical sensor 32 includes a light emitting diode (LED) 30 as a light emitting element and a both-side division type position sensitive detector (PSD) 31 for two-dimensional position detection as a light receiving element. The PSD 31 is described in more detail below. The output circuit 35 detects the tilt of the operation section 33 caused when no load is applied from outside to the operation section 33 based on an output signal of the PSD 31 and outputs the detected results to a computer body as positional information. The input device 100 with the above configuration is disposed on a corner of a keyboard 36 of a personal computer, for example, so that the operation section 33 protrudes from the plane of the keyboard 36, as shown in FIG. 4.

The configuration of the optical sensor 32 is shown in FIG. 2. The optical sensor 32 further includes a printed board 40 on which the LED 30 and the PSD 31 are mounted with a space therebetween and a light-shading resin case 41 covering the printed board 40. The optical sensor 32 is secured inside the keyboard 36 with a screw or the like. A connector 42 for connection with an internal circuit of the computer body is attached to the printed board 40. The LED 30 is inclined toward the PSD 31 and is surrounded by an oblique wall 43 extending from the case 41 so that light emitted from the LED 30 is prevented from being directly incident on the PSD 31. On the top surface of the case 41 are provided an emitted light pass hole 44 for allowing light emitted from the LED 30 to pass therethrough and a reflected light pass hole 46 for allowing only light reflected by a reflection plate 45 to pass therethrough to be incident on the PSD 31. The reflected light pass hole 46 is a conical shaped hole having a predetermined size and is formed above the PSD 31. The case 41 helps prevent dust from attaching to the PSD 31.

The operation section 33 as shown in FIG. 1 includes a dome 47 made of a light-shading resin and the reflection plate 45 disposed inside of the dome 47. The reflection plate 45 has a mirror bottom surface. A protrusion 48 is formed on the zenith of the dome 47 for providing a position where a finger is put. A ring-shaped elastic rubber support 49 is secured to the outer circumference of the lower portion of the dome 47. The support 49 is fitted in a hole 50 formed at the top surface of the keyboard 36. With this configuration, the operation section 33 can be tilted forward, backward, rightward, and leftward, as well as being moved upward and downward.

Now, the operational principle of the PSD 31 will be described. The PSD 31 is a sensor utilizing a silicon photodiode for detecting the position of a light spot. When light is incident on the PSD 31 to form a spot thereon, electric charges of an amount in proportion to the light energy are generated at the incident position. The electric charges are output from an electrode as a photoelectric current. The photoelectric current is divided inversely proportionally to the distance between the incident position and the electrode before being output from the electrode. The light incident position can thus be determined.

Figure 5:
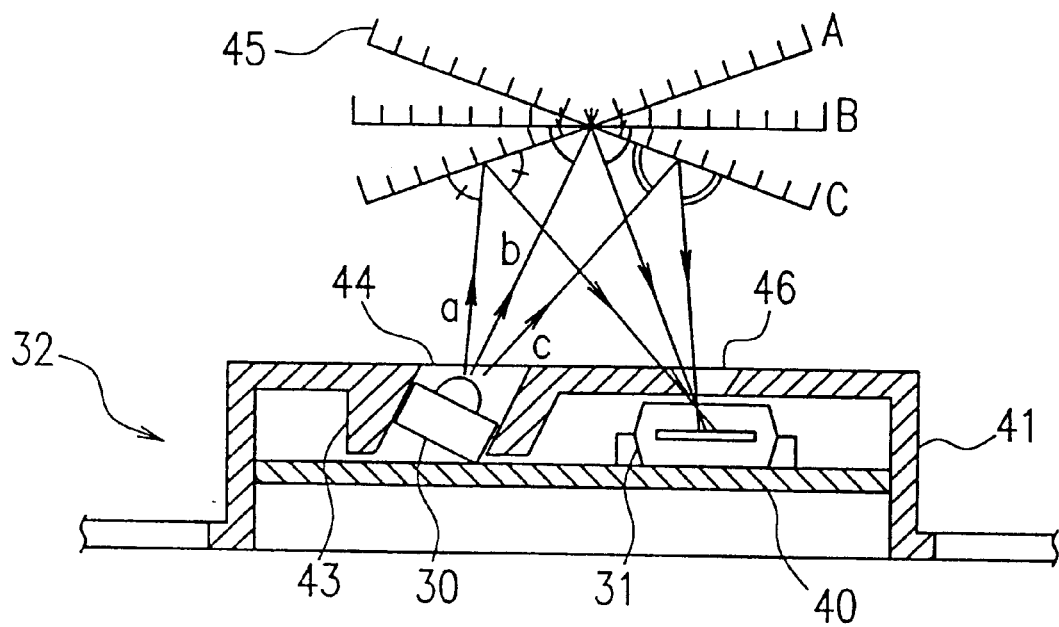
FIG. 5 is a view showing optical paths of light emitted from an light emitting element according to the present invention.

Accordingly, the incident position on the PSD 31 of light which has been emitted from the LED 30 and arrived at the PSD 31 after being reflected by the reflection plate 45 is determined. As shown in FIG. 5, the light emitted from the LED 30 has a fixed divergent angle. The law of reflection defines that the angle of incident light and the angle of reflected light to and from the mirror face of the reflection plate 45 are the same, and that the incident light, the reflected light, and the normal at the reflection point on the mirror surface are in the same plane. By using this law, the angle of light passing through the reflected light pass hole 46 can be determined according to the angle of the reflection plate 45, i.e., the tilt of the operation section 33. Once the angle of light passing through the reflected light pass hole 46 is determined, the light incident position on the PSD 31 is determined. For example, when the reflection plate 45 is at a tilt A, light a is reflected by the reflection plate 45 and is incident on the PSD 31. Likewise, when the reflection plate 45 is at a tilt B, light b is reflected by the reflection plate 45 and is incident on the PSD 31. When the reflection plate 45 is at a tilt C, light c is reflected by the reflection plate 45 and is incident on the PSD 31. Thus, the light incident position on the PSD 31 varies depending on the tilt of the reflection plate 45.

Figure 6:
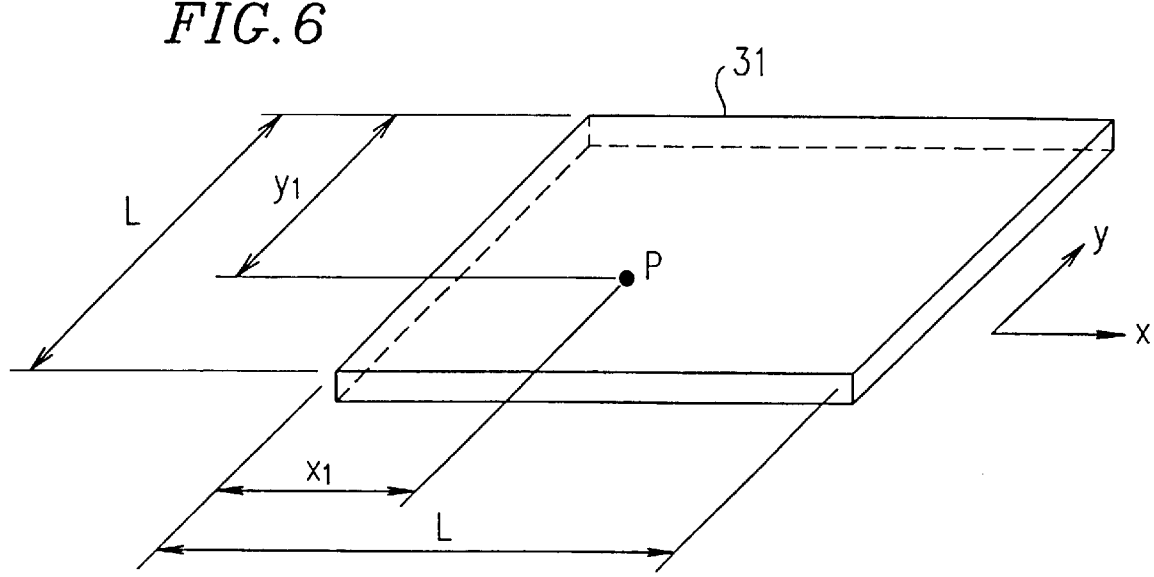
FIG. 6 is a view for explaining the principle of a PSD according to the present invention.

Referring to FIG. 6, assume that reflected light from the reflection plate 45 passes through the reflected light pass hole 46 and is incident on a point P on the PSD 31 having an effective light receiving size of L (mm)×L (mm). Output currents $I_1$ and $I_2$ in the x direction obtained from the PSD 31 are expressed by:

$$I_1 = I_0 \times x_1/L \quad (1)$$

$$I_2 = I_0 \times (L-x_1)/L \quad (2)$$

Output currents $I_3$ and $I_4$ in the y direction obtained from the PSD 31 are expressed by:

$$I_3 = I_0 \times y_1/L \quad (3)$$

$$I_4 = I_0 \times (L-y_1)/L \quad (4)$$

where $I_0$ is the electric charges generated at the point P in correspondence with the incident light amount.

Here, from the above Formulae, $I_1/(I_1+I_2)$ and $I_3/(I_3+I_4)$, for example, are expressed by:

$$I_1/(I_1+I_2) = (I_0 \times x_1/L)/I_0 = x_1/L \quad (5)$$

$$I_3/(I_3+I_4) = (I_0 \times y_1/L)/I_0 = y_1/L \quad (6)$$

Thus, by calculating the above formulae of the output currents of the PSD 31, an output corresponding to the position of light incident on the PSD 31 can be obtained. Also, as described above, when the direction and angle of the tilt of the reflection plate 45 varying in association with the tilt of the operation section 33 are determined, the position of light incident on the PSD 31 is determined. Accordingly, by calculating $I_1/(I_1+I_2)$ and $I_3/(I_3+I_4)$, for example, using the outputs of the PSD 31, outputs corresponding to the direction and angle of the tilt of the operation section 33 can be obtained. $I_1/(I_1+I_2)$ and $I_3/(I_3+I_4)$ correspond to the tilt amounts of the operation section 33 in the x and y directions, respectively.

Referring to FIG. 3, the output circuit 35 is connected to a control circuit 51 incorporated in the computer body where the input device 100 is disposed. The control circuit 51 includes, in addition to a CPU, a ROM, a RAM, etc., a shifting section 52 for controlling the shift of the cursor on a display of the computer body based on the positional information corresponding to the tilt of the operation section 33.

Referring to FIG. 3, the output circuit 35 includes a signal processing circuit section 53 and an A/D conversion section 54. The signal processing circuit section 53 calculates the tilt amount in the x direction, $I_1/(I_1+I_2)$, and the tilt amount in the y direction, $I_3/(I_3+I_4)$, based on the output currents of the PSD 31. The A/D conversion section 54 converts the analog values calculated by the signal processing circuit section 53 into digital values and outputs them to the control circuit 51 as an x direction output and a y direction output. The x direction output and the y direction output are output from individual output terminals of the A/D conversion section 54 as parallel data. Alternatively, they may be output from a single output terminal as serial data. The output circuit 35 also includes an LED driving circuit section 55 for driving the LED 30. The LED driving circuit section 55 controls the LED 30 so that the LED 30 always emits light as long as the power switch of the computer body is on.

Based on the positional information corresponding to the tilt amount of the operation section 33 in the x and y directions, i.e., the x direction output and the y direction output, the shifting section 52 of the control circuit 51 calculates the shift direction and speed of the cursor corresponding to the tilt amount of the operation section 33, so as to shift the cursor on the screen of the display based on the calculated results.

The cursor shift by the input device 100 with the above configuration will be described. As shown in FIG. 1, a finger is positioned on the protrusion 48 so as to tilt the operation section 33 in a direction in which the user wishes to shift the cursor on the screen. Light emitted from the LED 30 is reflected by the reflection plate 45, and only the reflected light which passes through the reflected light pass hole 46 reaches the PSD 31. The PSD 31 outputs a value corresponding to the light incident position on the PSD 31. The output circuit 35 calculates the tilt amounts in the x and y directions based on the value output from the PSD 31 and outputs the calculated results corresponding to the tilt direction and angle of the operation section 33, i.e, the x direction output and the y direction output, to the control circuit 51 of the computer body.

In the computer body, the control circuit 51 calculates the shift direction and speed of the cursor based on the positional information (i.e., the x direction output and the y direction output), and shifts the cursor on the screen based on the calculated results. For example, when the operation section 33 is tilted a little in the +x direction with no tilt in the y direction, the shift direction and speed of the cursor are determined based on the tilt amounts in the x direction and the y direction. Thus, the cursor is shifted in the +x direction at a low speed. When the operation section 33 is tilted largely in the +x direction with no tilt in the y direction, the cursor is shifted in the +x direction at a high speed. When the tilts are small and the same in the x and y directions, the cursor is shifted in the 45° direction at a low speed.

EXAMPLE 2

A second example of the input device according to the present invention will be described with reference to FIGS. 7 to 9.

Figure 7:
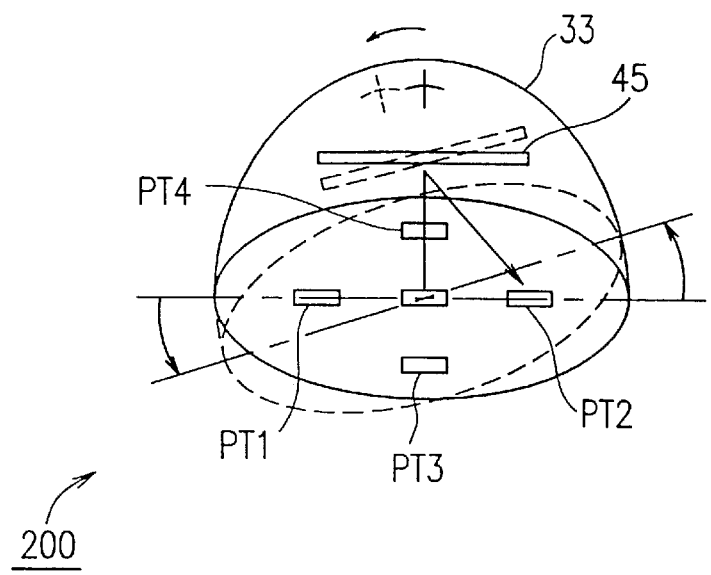
FIG. 7 is a perspective view of an inner structure of a second example of the input device according to the present invention.
Figure 8:
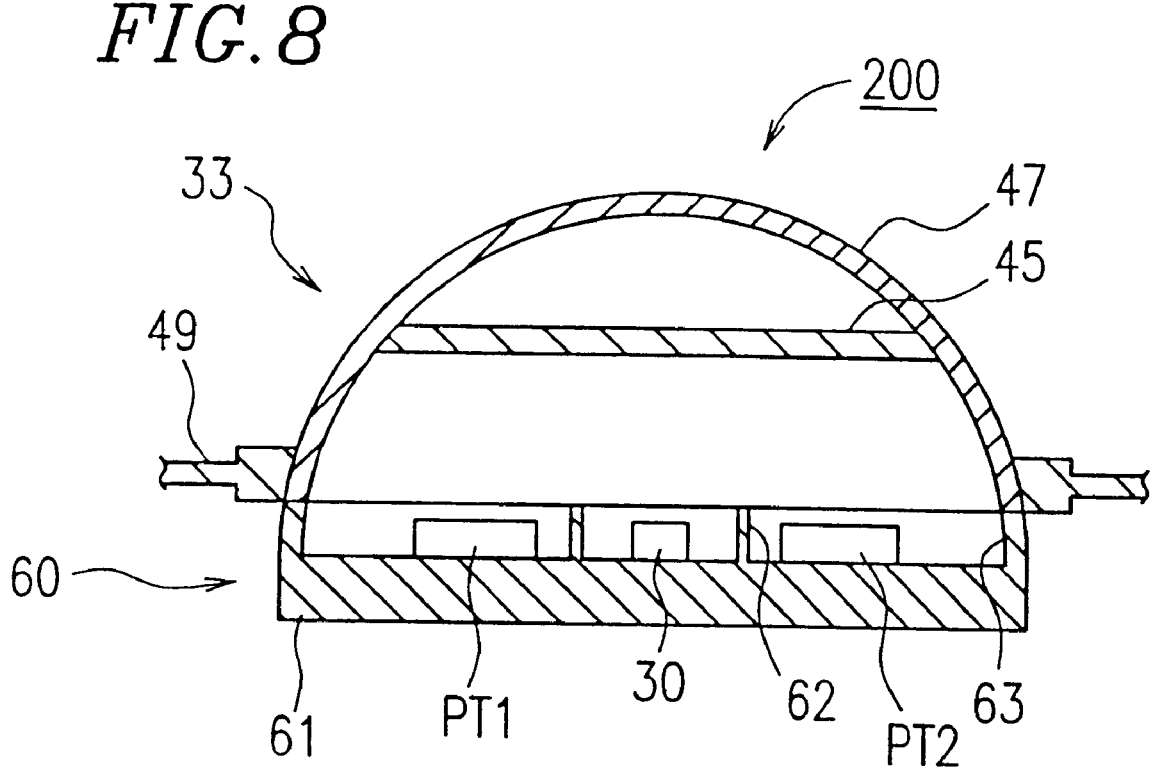
FIG. 8 is a sectional view of the input device according to the present invention.
Figure 9:
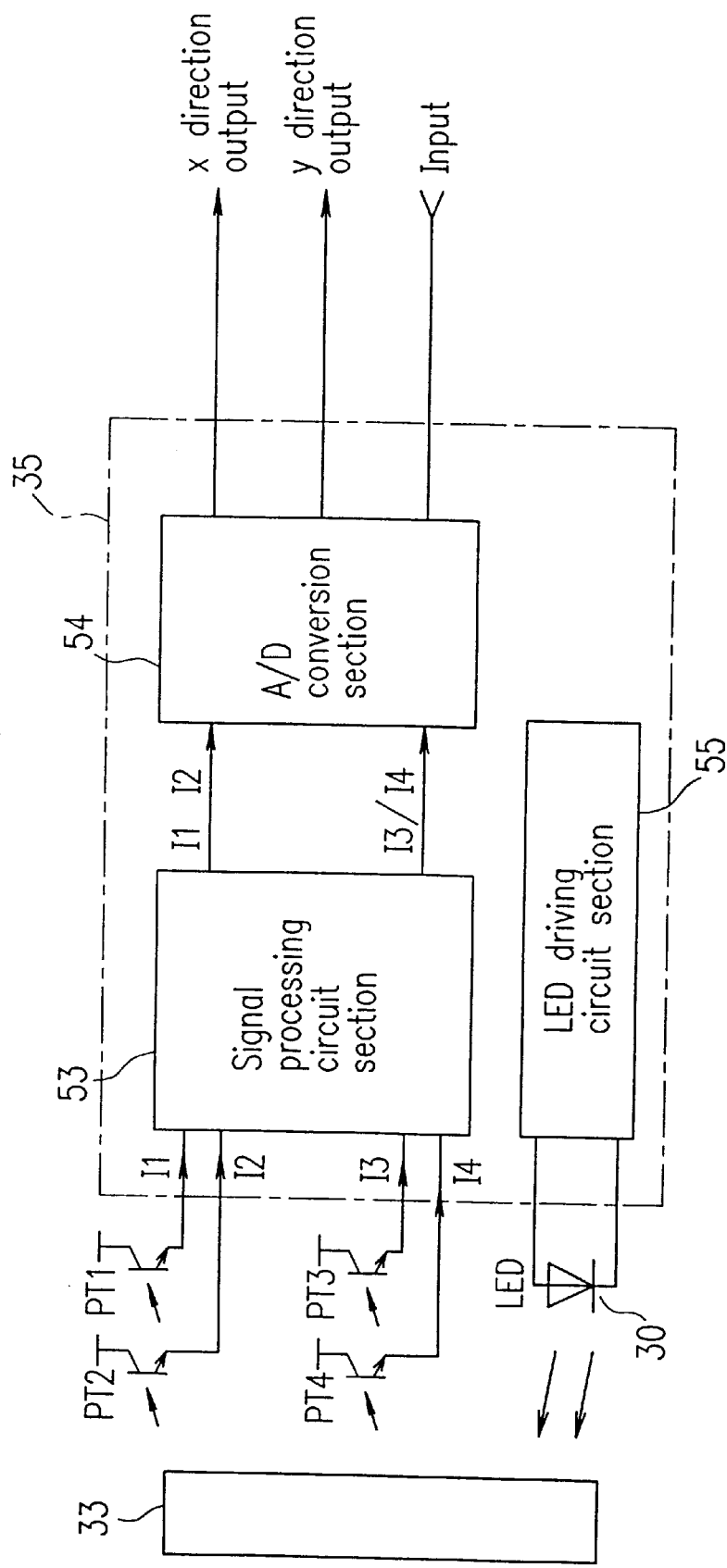
FIG. 9 is a block diagram of the input device according to the present invention.

Referring to FIGS. 7 and 8, an input device 200 of Example 2 includes an optical sensor 60 having an LED 30 and four phototransistors PT1 to PT4 as light receiving elements. The LED 30 is positioned at the center of the top surface of a holder 61 of which lead frame is insert-molded. The phototransistors PT1 to PT4 are disposed on the holder 61 concentrically around the LED 30 and along the x and y directions. As shown in FIG. 8, the holder 61 is attached to the bottom edge of a dome 47 of an operation section 33. A ring light-shading wall 62 is disposed on the holder 61 to surround the LED 30 so that light emitted from the LED 30 is prevented from being directly incident on the phototransistors PT1 to PT4. An external wall 63 is also formed so that external light is prevented from being directly incident on the phototransistors PT1 to PT4. The remaining sections of the input device 200 are the same as those described in Example 1.

When the light emitted from the LED 30 is reflected by a reflection plate 45 and incident on the phototransistors PT1 to PT4, the phototransistors PT1 to PT4 output currents $I_1$, $I_2$, $I_3$, and $I_4$, respectively, corresponding to the received light amounts. The currents $I_1$, $I_2$, $I_3$, and $I_4$ are sent to a signal processing circuit section 53 of an output circuit 35 as shown in FIG. 9. The signal processing circuit section 53 calculates $I_1/I_2$ as an output current ratio in the x direction and $I_3/I_4$ as an output current ratio in the y direction, and outputs the calculated results to a control circuit 51 of a computer body having the same configuration as that of Example 1, through an A/D conversion section 54, as an x direction output and a y direction output. The output current ratios in the x direction and in the y direction may also be $I_1/(I_1+I_2)$ and $I_3/(I_3+I_4)$, respectively.

The shift of a cursor on a computer display screen is controlled by the control circuit 51 of the computer body based on the positional information output from the output circuit 35, i.e., the x direction output and the y direction output from the A/D conversion section 54. For example, when the operation section 33 is not tilted as shown in FIG. 7, light from the LED 30 reflected by the reflection plate 45 is substantially equally incident on the four transistors PT1 to PT4. Thus, the values of the output currents $I_1$, $I_2$, $I_3$, and $I_4$ are substantially the same. In this case, the cursor does not shift.

When the operation section 33 is tilted in the −x direction (the direction indicated by the arrow in FIG. 7), the reflection plate 45 tilts, and as a result, the output current of the phototransistor PT1 decreases, while that of the phototransistor PT2 increases. By calculating the output current ratio of the phototransistor PT1 to the phototransistor PT2, an output corresponding to the amount of tilt of the operation section 33 in the x direction can be obtained. Likewise, by calculating the output current ratio of the phototransistor PT3 to the phototransistor PT4, an output corresponding to the amount of tilt of the operation section 33 in the y direction can be obtained. Based on the thus-obtained positional information, the cursor shifts on the screen in the -x direction at a speed corresponding to the amount of tilt.

EXAMPLE 3

Figure 10:
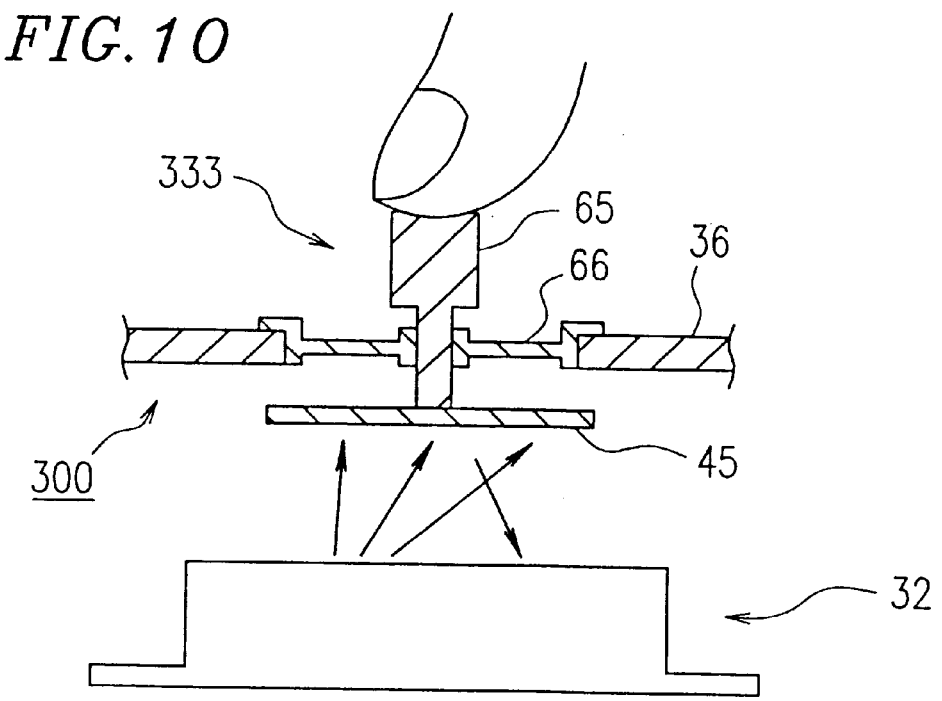
FIG. 10 is a sectional view of a third example of the input device according to the present invention.
Figure 11:
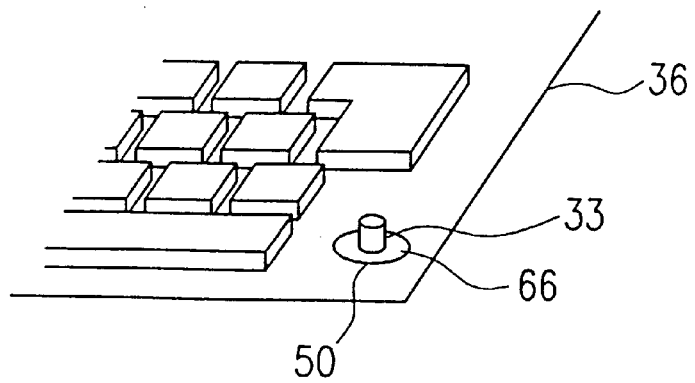
FIG. 11 is a view showing the position of the input device according to the present invention.

A third example of the input device according to the present invention will be described with reference to FIGS. 10 and 11.

An input device 300 of Example 3 includes an operation section 333, and an optical sensor 32 having the same configuration as that of Example 1. As shown in FIG. 10, the operation section 333 includes a stick section 65 and a reflection plate 45 attached to the bottom end of the stick section 65. A rubber ring support 66 is secured to the circumference of the stick section 65. The support 66 is fitted in a hole 50 formed on the surface of a keyboard 36, as shown in FIG. 11, so as to secure the input device 300 to the keyboard 36 of a computer. With this configuration, the operation section 333 can be tilted forward, backward, rightward, and leftward, as well as being shifted upward and downward. The remaining sections are the same as those described in Example 1, and the same functions and effects can be obtained.

In Examples 1 to 3, the operation section 33 or 333 is movable upward and downward as described above. When the operation section 33 or 333 is pressed downward, the distance between the reflection plate 45 and the optical sensor 32 is decreased, and thus the total output current of the light receiving elements, $I_1+I_2+I_3+I_4$ increases. This increase of the output current may be detected by the output circuit 35 and sent to the control circuit 51 as an ON signal, so that the operation sections 33 and 333 can be provided with a function of click button.

As the size of computers is increasingly made smaller, portable computers with a battery embedded therein become more popular. In order to reduce power consumption as is required for such small-size-portable computers, it is advisable that the LED driving circuit section 55 should control the LED 30 to emit light intermittently like a pulse. In such a case, the output currents from the light receiving elements can be detected in synchronization with the light emission of the LED 30. With this operation, an influence of turbulence such as noise can be eliminated, and thus the reliability of the input device can be enhanced.

The above examples can be modified and changed. For example, a laser diode or a fluorescent display tube may be used as the light emitting element. A photodiode may be used as the light receiving element. In Example 2, the number of phototransistors is not limited to four, but three or more phototransistors can be used. The larger the number of the phototransistors is, the higher the detection precision is.

As is apparent from the above description, in the above examples, the operation section is tilted, and the tilt is detected by the optical sensor. The cursor is shifted on the screen based on the positional information as the detected results. Accordingly, an input device employing a non-contact optical method without the need for a mechanical operation section can be realized. According to such an input device, malfunction does not occur due to the build up of dust coming from outside. Thus, the reliability and durability can be enhanced, and the life of the input device can be prolonged. The operation section of the input device is positioned on the top surface of the computer body and no space is additionally required. Accordingly, the computer can be used at any location without the need for a separation operation surface for a mouse, for example. The input device of the present invention can be therefore applied to small-size computers and portable information apparatuses. Moreover, in the case where the operation section is of a dome shape as in Examples 1 and 2, the cursor can be shifted using a manner similar to rotating a ball as in the case of the conventional track ball. In the case where the operation section has a stick shape as in Example 3, the cursor can be shifted by way of tilting the stick. Thus, in both cases, excellent operability can be provided.

The operation section is secured to the computer body via the elastic support. Accordingly, the operation section can be pressed to be closer to the optical sensor. This makes it possible to provide the operation section with the click function in addition to the cursor shifting function, realizing a multi-functional input device. Since a click button is not additionally required, the computer can be further miniaturalized.

The light emitting element can emit light intermittently. Accordingly, the current consumption can be reduced compared with the case where light is always emitted. As a result, the life of a battery and the like can be prolonged, and thus an input device more suitable for small-size computers and portable information apparatuses can be obtained.

EXAMPLE 4

A fourth example of the input device according to the present invention will be described with reference to FIGS. 12 to 17B.

Figure 12:
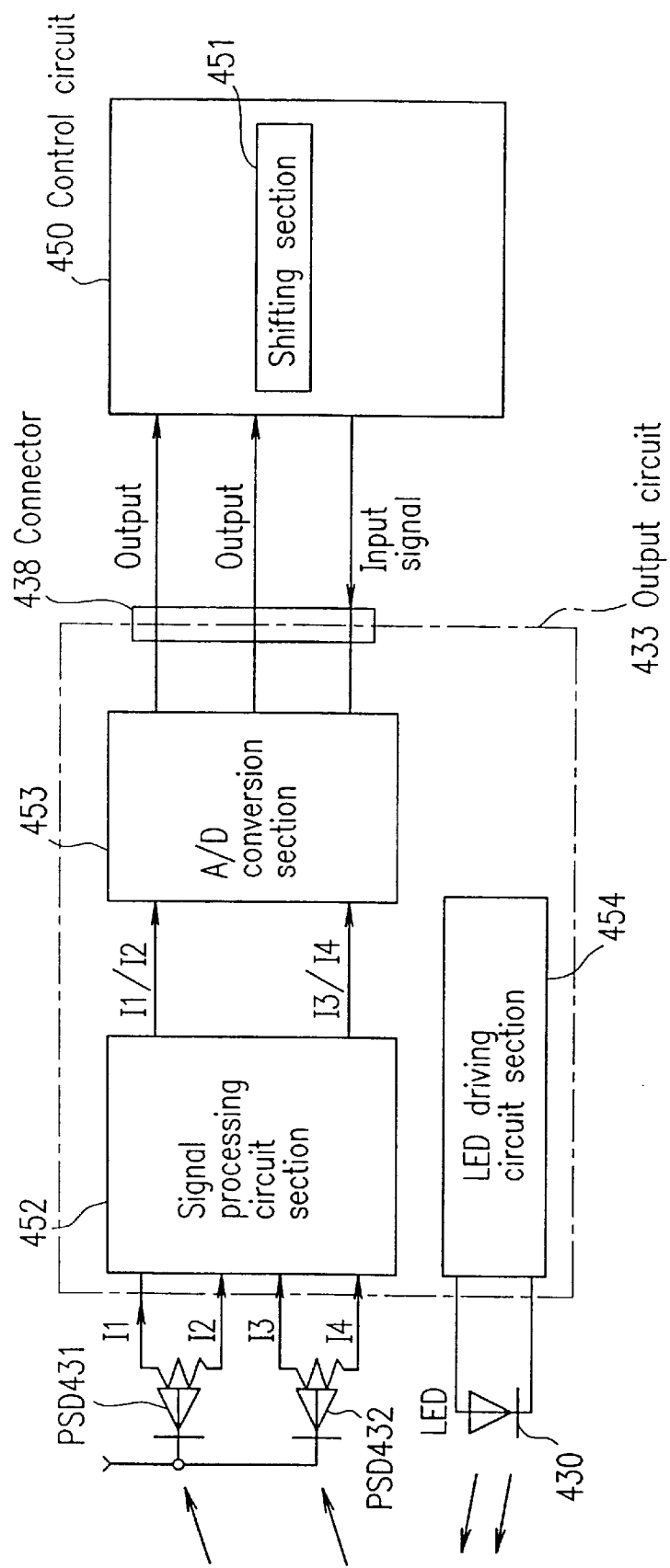
FIG. 12 is a block diagram of a fourth example of the input device according to the present invention.

As shown in FIG. 12, an input device 400 of Example 4 includes a light emitting element 430 as a light source, two two-dimensional PSDs 431 and 432, and an output circuit 433. An LED is used, for example, as the light emitting element 430. Each of the PSDs 431 and 432 outputs a signal to the output circuit 433 indicating the amount of light received thereby when it is irradiated with the light. The output circuit 433 calculates screen input information based on the signals output from the PSDs 431 and 432, and outputs the results to a control circuit 450 of a computer body.

Figure 13:
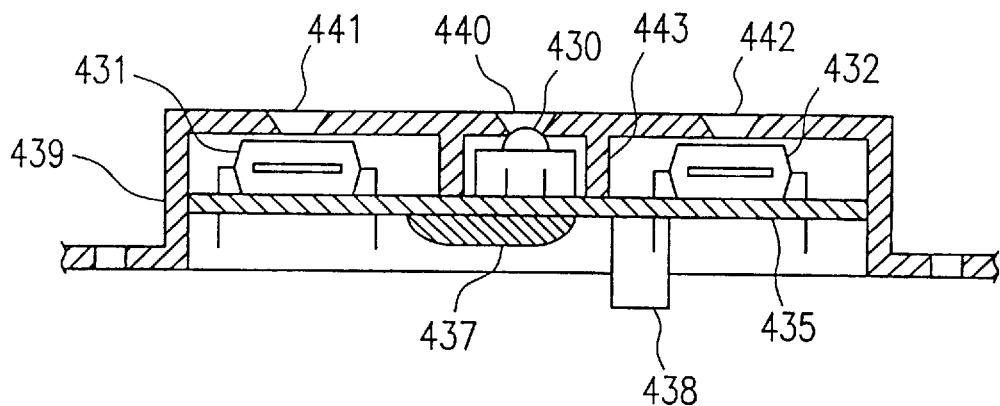
FIG. 13 is a sectional view of a positional detection sensor according to the present invention.

As shown in FIG. 13, the light emitting element 430 and the PSDs 431 and 432 are soldered to a printed board 435 so that the light emitting element 430 is located at the center and the PSDs 431 and 432 are located on the both sides of the light emitting element 430, thus constituting a positional detection sensor 436. An IC 437 used exclusively for control is attached by direct bonding to the surface of the printed board 435 opposite to the surface where the light emitting element 430 and the PSDs 431 and 432 are soldered. The IC 437 is connected to the light emitting element 430 and the PSDs 431 and 432. A connector 438 connected to the control circuit 450 of the computer body is also attached to the surface of the printed board 435 where the IC 437 is attached.

The printed board 435 is covered with a holder 439 made of a light-shading resin. The holder 439 has an emitted light pass hole 440, a first reflected light pass hole 441, and a second reflected light pass hole 442 at positions on the top surface thereof corresponding to the light emitting element 430, the PSDs 431 and 432, respectively. A light-shading wall 443 extends from the inner upper surface of the holder 439 toward the printed board 435 so as to surround the light emitting element 430. Light emitted from the light emitting element 430 is thus prevented from being directly incident on the PSDs 431 and 432.

Figure 14:
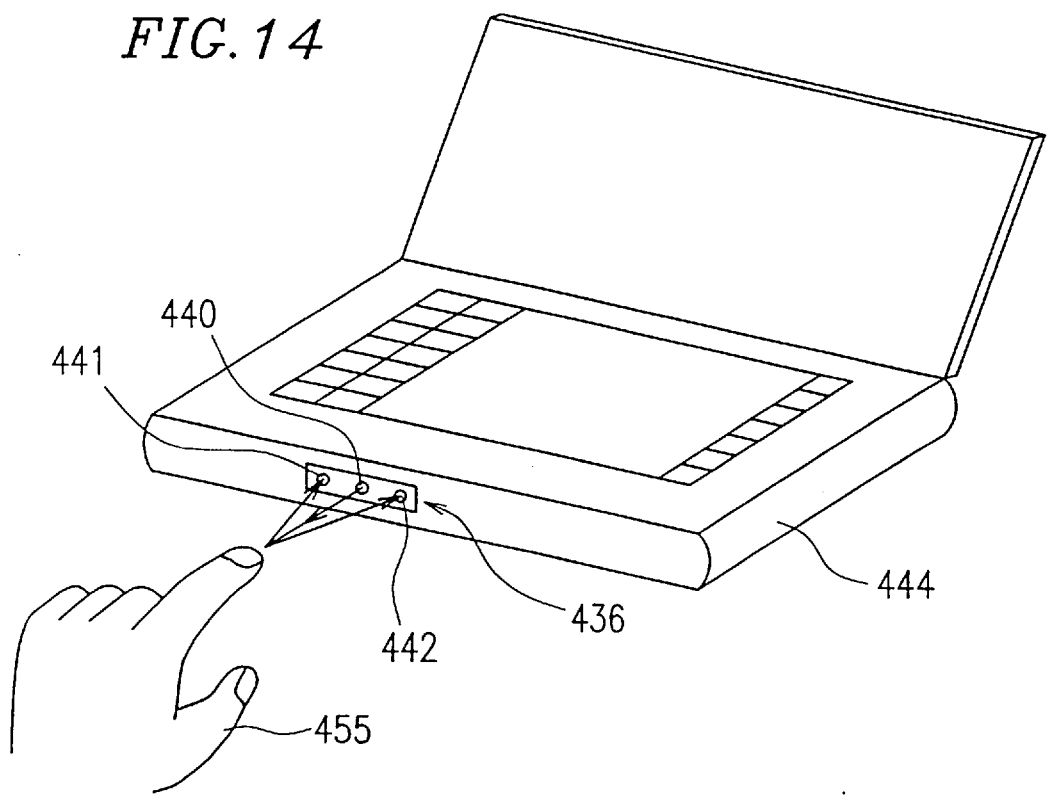
FIG. 14 is a perspective view of a personal information apparatus provided with the input device according to the present invention.

As shown in FIG. 14, the holder 439 where the positional detection sensor 436 is incorporated is mounted on the front side of the computer body (a personal information apparatus in this example) so that the light emitting element 430 and the PSDs 431 and 432 face outside. The emitted light pass hole 440 is of a conical shape with a large opening area so that the emitted light can diverge in a conical fashion. The reflected light pass holes 441 and 442 are also of a conical shape with a predetermined opening area which is smaller than that of the emitted light pass hole 440 so as to prevent turbulent light from entering through the holes. The attachment of dust to the PSDs 431 and 432 is prevented by the holder 439.

The output circuit 433 (FIG. 12) is incorporated in the exclusive IC 437 and connected to the control circuit 450 incorporated in the computer body. The control circuit 450 includes, in addition to a CPU, a ROM, a RAM, etc., a shifting section 451 for controlling the shift of a cursor on a display of the computer body from the screen input information based on the signals output from the PSDs 431 and 432.

The output circuit 433 receives output currents $I_1$, $I_2$, $I_3$, and $I_4$ of the PSDs 431 and 432 as shown in FIG. 12. The output circuit 433 includes a signal processing circuit section 452 for calculating $I_1/I_2$ and $I_3/I_4$ and an A/D conversion section 453. The A/D conversion section 453 converts the calculated analog results from the signal processing circuit section 452 into digital values, and outputs the digital values to the control circuit 450 as the x direction output and the y direction output. In Example 4, the x direction output and the y direction output are output from the A/D conversion section 453 as parallel data. Alternatively, they may be output from a single output terminal as serial data. The output circuit 433 further includes an LED driving circuit section 454 for driving the light emitting element 430. The LED driving circuit section 454 controls the light emitting element 30 so that the light emitting element 30 always emits light as long as the power switch of the computer body is on.

The shifting section 451 of the control circuit 450 calculates the shift direction and speed of the cursor from the screen input information, i.e., the x direction output and the y direction output of the output circuit 433, so as to shift the cursor on the screen.

Figure 15:
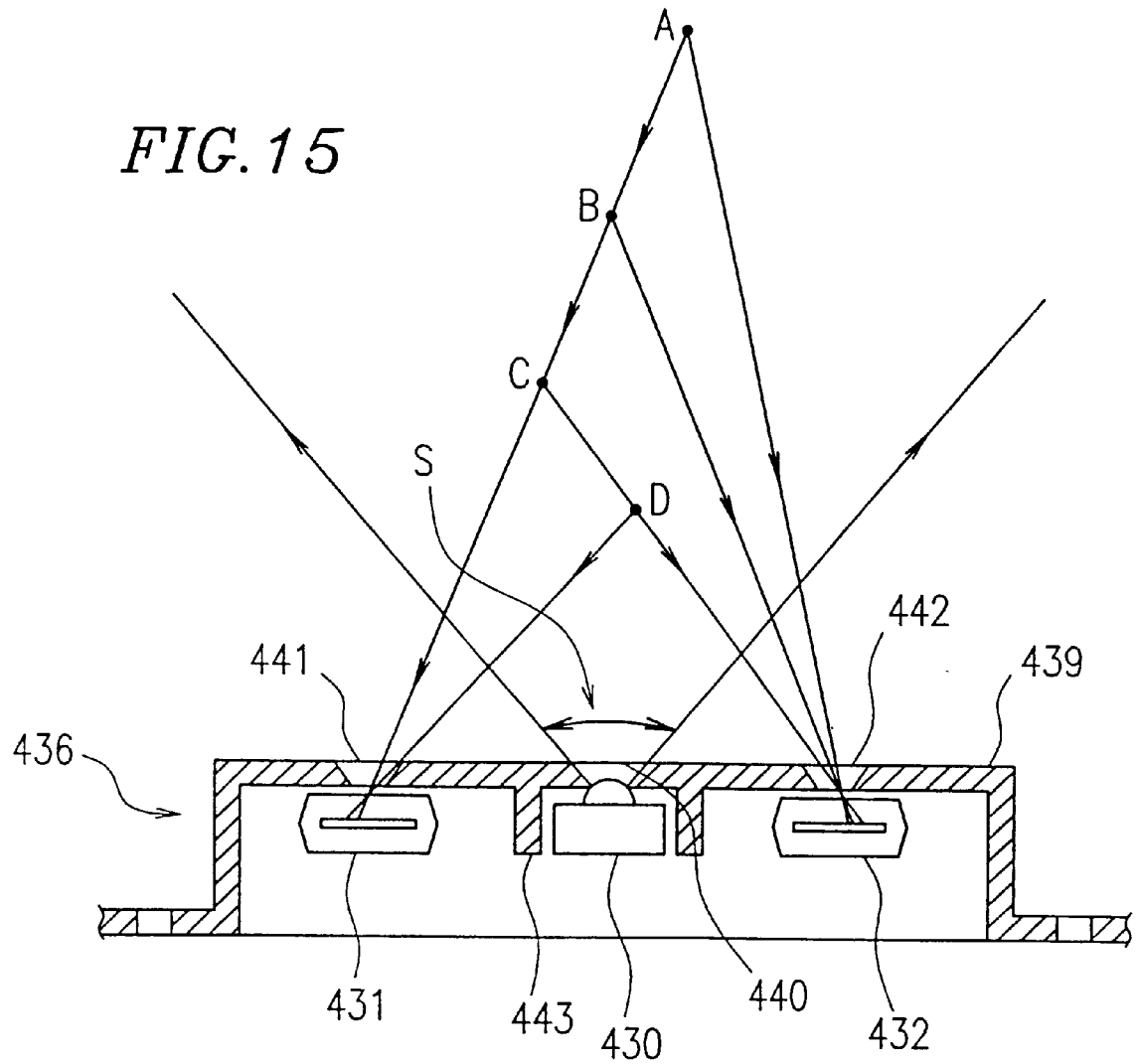
FIG. 15 is a view showing optical paths of light for a positional detection sensor according to the present invention.

Referring to FIGS. 14 and 15, the cursor is shifted on the screen by moving a movable means 455 such as a finger tip or a pen tip within the expanse of the light emitted from the light emitting element 430. With the movable means 455 within an expanse S of the light from the light emitting element 430, the light from the light emitting element 430 is reflected by the movable means 455 and the reflected light is incident on the PSDs 431 and 432. When the movable means 455 is at positions A, B, C, and D, the incident angles of the reflected light to the PSDs 431 and 432 are different from one another. Thus, the position of the movable means 455 can be detected by using the two PSDs 431 and 432.

The detection principle will be described in detail. The PSDs 431 and 432 are positional sensitive detectors of the same type as that described in Example 1. The light incident position can be determined by using these sensors.

Figure 16:
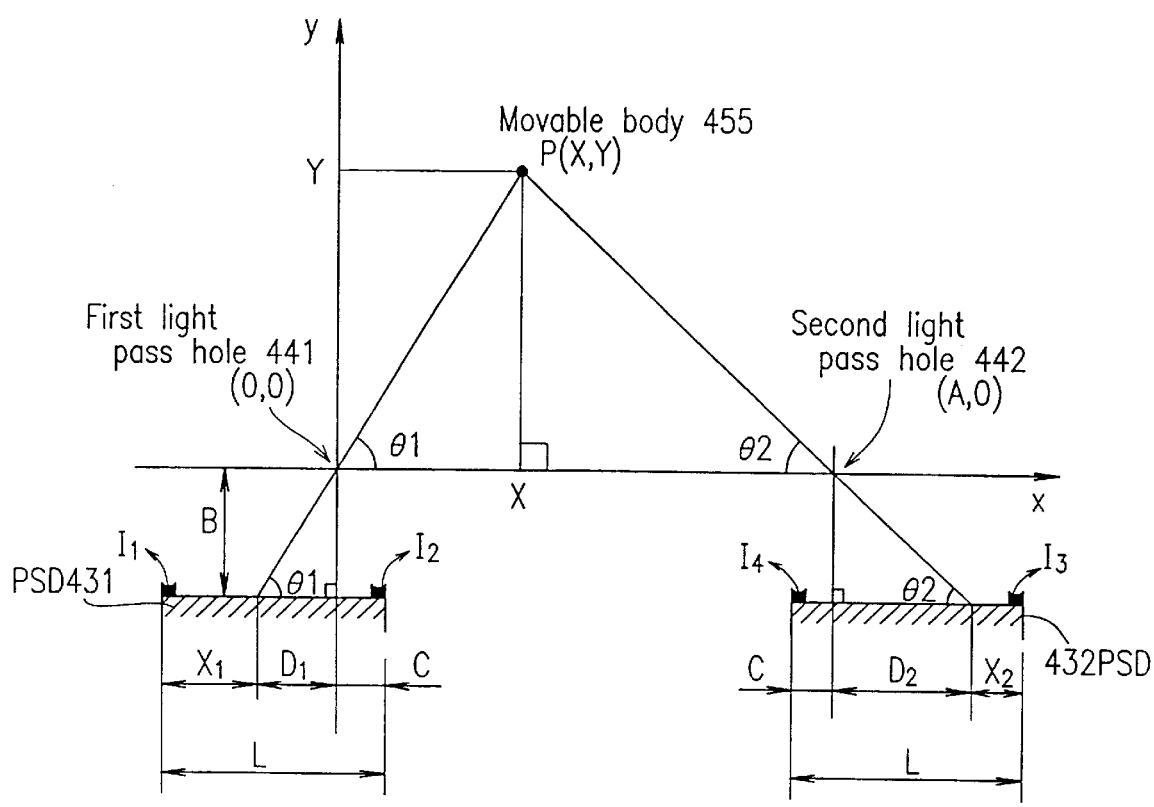
FIG. 16 shows a view for explaining the detection principle of the input device according to the present invention.

Referring to FIG. 16, the following are defined:

point P: position of the movable means 455

(X, Y): coordinate of point P (0, 0): coordinate of the first reflected light pass hole 441

(A, 0): coordinate of the second reflected light pass hole 442

$\theta_1$: angle of light incident on the PSD 431 from point P $\theta_2$: angle of light incident on the PSD 432 from point P B: distance between the reflected light pass holes and the corresponding PSDs C: positions of the PSDs $X_1$, $X_2$: light incident positions on the PSDs 431 and 432

L: length of the light receiving portion of the PSDs $I_1$, $I_2$: output currents of the PSD 431

$I_3$, $I_4$: output currents of the PSD 432

Under the above definitions, the relationship between the output current and the light incident position of the PSD 431 is expressed by:

$$I_1 = I_0 \times (L - X_1)/L \quad (7)$$

$$I_2 = I_0 \times X_1 / L \quad (8)$$

(where $I_1 = I_1 + I_2$)

From formulae (7) and (8), the following is obtained.

$$X_1 = L \times I_2 / (I_1 + I_2) \\ = L / (I_1/I_2 + 1) \quad (9)$$

Similarly, the following is obtained for the PSD 432:

$$X_2 = L \times I_4 / (I_3 + I_4) \\ = L / (I_3/I_4 + 1) \quad (10)$$

Then, the relationship between the light incident angle and the light incident position of the PSD 431 is obtained. Since $D_1 = B/\tan\theta_1$, $$X_1 = L - C - D_1 = L - C - B/\tan\theta_1.$$

Accordingly, $$B/\tan\theta_1 = L - C - X_1$$

$$\tan\theta_1 = B/(L - C - X_1) \quad (11)$$

Similarly, the following is obtained for the PSD 432:

$$\tan\theta_2 = B/(L - C - X_2) \quad (12)$$

The relationship between the coordinate of the movable means 455 and the light incident angle is expressed by:

$$\tan\theta_1 = Y/X \quad (13)$$

$$\tan\theta_2 = Y/(A - X) \quad (14)$$

Y is deleted from Formulae (13) and (14).

$$X \times \tan\theta_1 = (A - X) \times \tan\theta_2$$

$$X = A \times \tan\theta_2 / (\tan\theta_1 + \tan\theta_2) \quad (15)$$

X of Formula (13) is substituted as follows:

$$Y = A \times \tan\theta_1 \times \tan\theta_2 / (\tan\theta_1 + \tan\theta_2) \quad (16)$$

The relationship between the position of the movable means 455 and the light incident positions on the PSD 431 or 432 is expressed as follows by combining Formula (15) with Formulae (11) and (12):

$$X = A \times \frac{B/(L - C - X_2)}{B/(L - C - X_1) + B/(L - C - X_2)} = \quad (17)$$

Similarly, Formula (16) is combined with Formulae (11) and (12) as follows:

$$Y = \frac{A \times B}{2L - 2C - (X_1 + X_2)} \quad (18)$$

In Formulae (17) and (18), A, B, C, and L are constants; $X_1$ and $X_2$ are determined by the current ratios for the PSDs 431 and 432, $I_1/I_2$ and $I_3/I_4$, as expressed in Formulae (9) and (10), respectively. Since the current ratios, $I_1/I_2$ and $I_3/I_4$ can be calculated by the signal processing circuit section 452 shown in FIG. 12, the coordinate of the movable means 455 can be calculated.

In the input device 400 having the above configuration, the movable means 455 such as a finger tip is placed within the expanse S of the light emitted from the light emitting element 430 disposed at the front side of the computer 444. The light emitted from the light emitting element 430 is reflected by the movable means 455. Part of the reflected light passes through the reflected light pass holes 441 and 442 so as to reach the PSDs 431 and 432, respectively. The PSDs 431 and 432 output currents corresponding to the light incident positions thereon to the output circuit 433. The output circuit 433 calculates the current ratios $I_1/I_2$ and $I_3/I_4$, converts the calculated results into digital signals, and outputs the digital signals to the control circuit 450 incorporated in the computer body 444 as the x direction output and the y direction output, respectively.

The control circuit 450 of the computer body 444 always monitors the outputs of the output circuit 433. The control circuit 450 calculates the shift direction and speed of the cursor based on a variation in the coordinate of the movable means 455, so as to shift the cursor on the screen under the calculated conditions. For example, when the movable means 455 moves rightward from the initial position, the cursor shifts rightward. When the movable means 455 moves forward, the cursor shifts downward, while when the former moves backward, the latter shifts upward. When the movable means 455 moves rapidly, the cursor shifts rapidly, while when the former moves slowly, the latter shifts slowly.

Figure 17A:
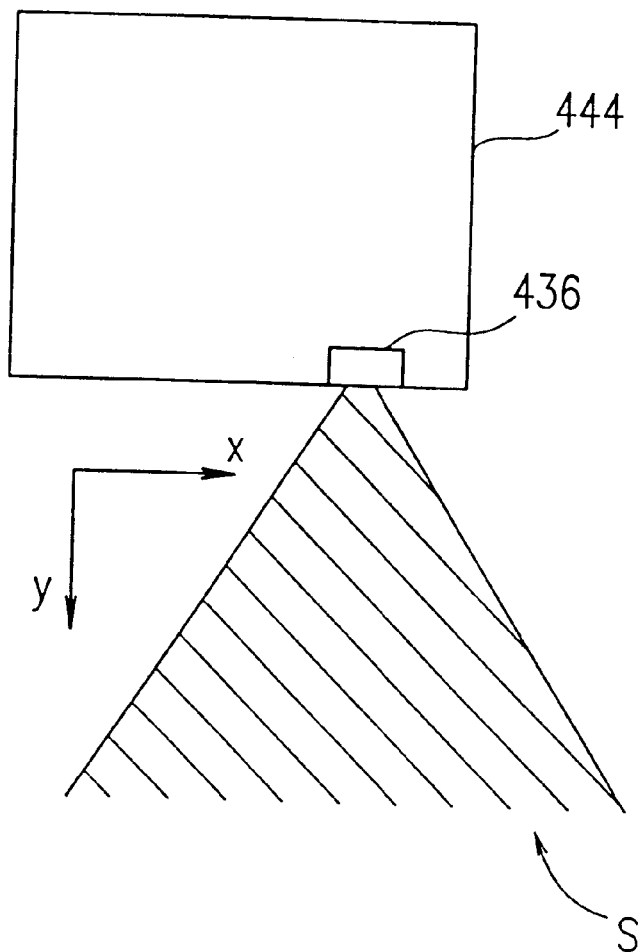
FIGS. 17A and 17B are a plan view and a front view, respectively, showing the detection range of the positional detection sensor according to the present invention.
Figure 17B:
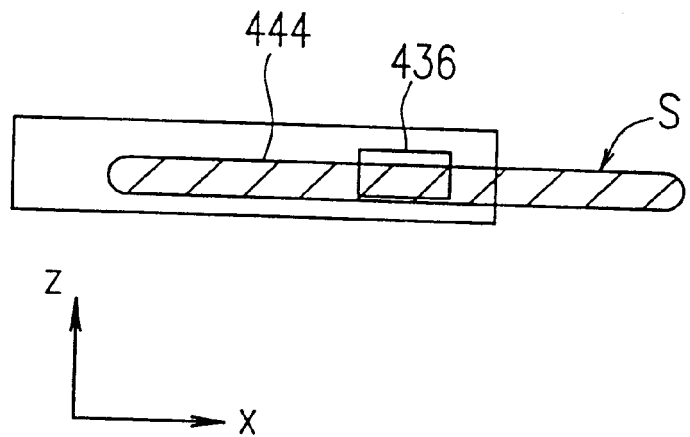

In the above example, only the position of the movable means 455 with respect to the X-Y coordinate was detected. The light from the light emitting element 430, however, also expands in the Z direction as shown in FIG. 17B. If the position in the Z coordinate is additionally detected, the control circuit 450 will be provided with an input function capable of inputting characters, codes, figures, and the like. Characters and the like can be formed on the screen by moving the movable means 455 in the X and Y directions within the expanse S of the light from the light emitting element 430, detecting the start point and the end point of the movement from the outputs of the PSDs 431 and 432, and drawing a line between the start point and the end point. The start point and the end point may be determined in the following manner: A point where the movable means 455 moves upward in the Z direction is defined as the end point, while a point where the movable means 455 moves downward in the Z direction is defined as the start point. By adopting this method, characters and the like can be input only by moving the movable means 455 without key operation.

Incidentally, if an object other than the movable means 455 such as a finger tip is present in front of the input device 400, light reflected by such an object may be incident on the PSDs 431 and 432. This may cause unintended cursor shifting and character drawing on the screen. In order to prevent these problems and enhance the usability of the computer, a switch or a command may be provided for switching between a mode where the input device 400 is used and a mode where it is not used.

Example 4 can be modified and changed. For example, the LED driving circuit section 454 may control the light emitting element 430 to emit light intermittently like a pulse. Thus, a computer with low power consumption can be realized The position of the positional detection sensor 436 is not limited to the side face of the computer body 444. Instead, the positional detection sensor 436 may be disposed on the top surface of the computer body 444. Also, instead of incorporating the light emitting element 430 and the PSDs 431 and 432 in the computer body 444, only two PSDs may be incorporated in the computer body. A light source such as an LED and a lamp may be mounted on the movable means, and light from the light source may be directly incident on the PSDs. Further, for the input of characters and the like, the start point and the end point may be determined by key operation.

As is apparent from the above description, in Example 4, the cursor can be shifted on the screen of the display of the computer body, or characters, codes, figures, and the like can be displayed on the screen based on the output signals from the PSDs obtained when the light emitted from the light source is incident on the PSDs. Accordingly, the input device of the present invention employs a non-contact optical method and no mechanical operation section is included. This input device is therefore excellent in durability and reliability, has a long life, and can be produced at low cost.

Since the light source and the PSDs can be formed integrally, the input device can be made smaller. This reduces the area and volume occupied by the input device in the computer body. Also, since an additional area for input operation is not necessary, the size of the computer can be further reduced. The input device of this example is therefore suitable for portable personal information apparatuses. Because character input operation is possible, a conventional keyboard can be omitted. This further reduces the size of the computer.

EXAMPLE 5

A fifth example of the input device according to the present invention will be described with reference to FIGS. 18 to 24. The input device of Example 5 can input three-dimensional images into a display of computers, wordprocessors, CAD terminals, computer game machines, and the like.

FIGS. 18, 19A, 19B, and 20 schematically show an configuration of an input device 500 of Example 5. The input device 500 includes a reflection type optical sensor 533, an input operation section 534, and an output circuit 535. The reflection type optical sensor 533 includes a light emitting diode (LED) 530 as a light emitting element, and a both-side division type two-dimensional PSD 531 and a one-dimensional PSD 532 as the light receiving elements. The input operation section 534 is disposed above the optical sensor 533 so that it can be tilted and moved vertically (up and down relative to FIG. 18). The output circuit 535 detects the tilt and the vertical position of the operation section 534 from signals output from the PSDs 531 and 532, and outputs the detected results to the computer body as three-dimensional positional information. A shifting section 536 connected to the output circuit 535 shifts a cursor on a display of the computer body three-dimensionally based on the three-dimensional positional information obtained from the output circuit 535 indicating the tilt and the vertical position of the operation section 534. The input device 500 is disposed on a corner of a keyboard 537 of a personal computer and the like so that the operation section 534 protrudes from the keyboard 534.

Figure 19A:
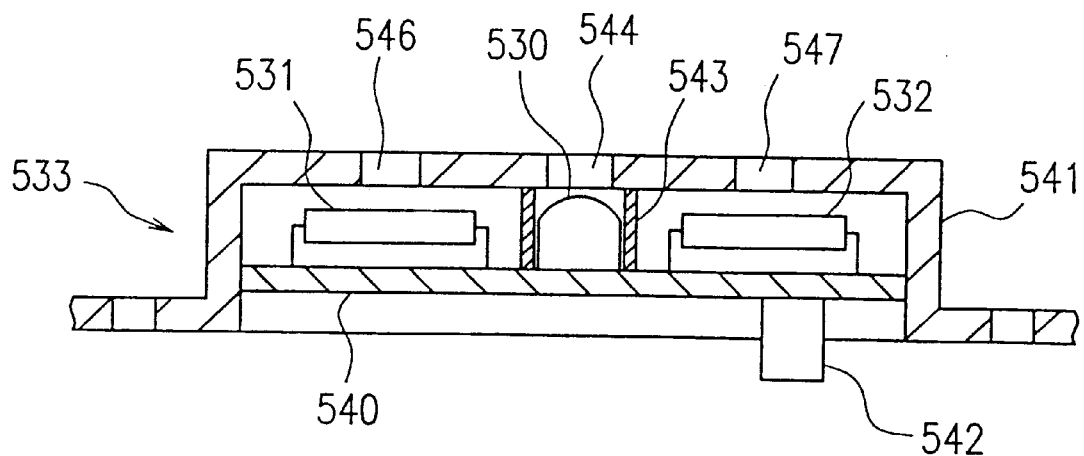
FIGS. 19A and 19B are a sectional view and a plan view, respectively, of an optical sensor according to the present invention.

Referring to FIG. 19A, the optical sensor 533 further includes a printed board 540 and a case 541 made of a light-shading resin covering the printed board 540. The LED 530 and the PSDs 531 and 532 are mounted on the printed board 540 so that the PSDs 531 and 532 are located on both sides of the LED 530. The case 541 is fitted in the keyboard 537 with a screw or the like. Dust build up on the PSDs 531 and 532 is prevented by the case 541. A connector 542 for connecting an internal circuit of the computer body is attached to the printed board 540.

Figure 19B:
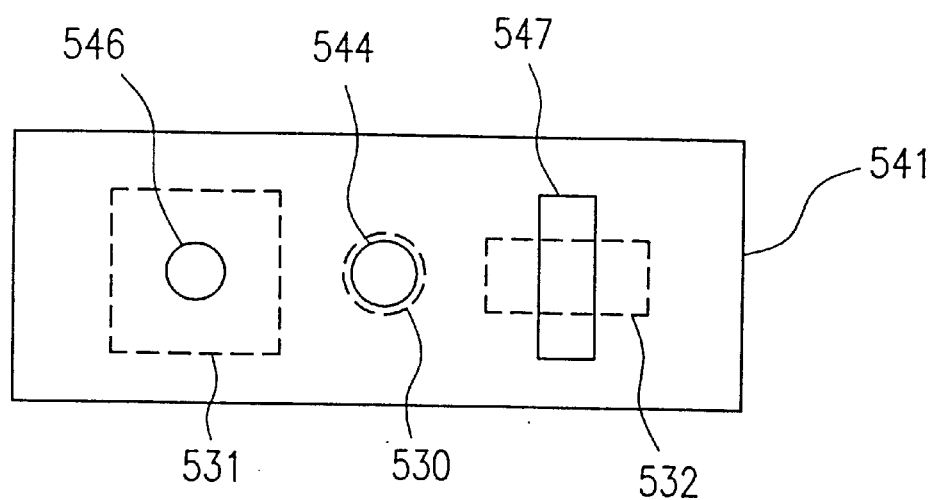

As shown in FIG. 19A, the LED 530 is surrounded by a light-shading wall 543 protruding from the case 541 so that light emitted from the LED 530 will not be directly incident on the PSDs 531 and 532. The top surface of the case 541 has three holes formed therethrough: an emitted light pass hole 544 located above the LED 530 for allowing light emitted from the LED 530 to pass therethrough; a reflected light pass hole 546 located above the two-dimensional PSD 531 for allowing only light reflected by a reflection plate 545 to be described later to be incident on the two-dimensional PSD 531; and a reflected light pass hole 547 located above the one-dimensional PSD 532. As shown in FIG. 19B, the emitted light pass hole 544 and the reflected light pass hole 546 are circular in section, while the reflected light pass hole 547 is rectangular in section elongate in the direction perpendicular to the axis of the one-dimensional PSD 532.

Figure 18:
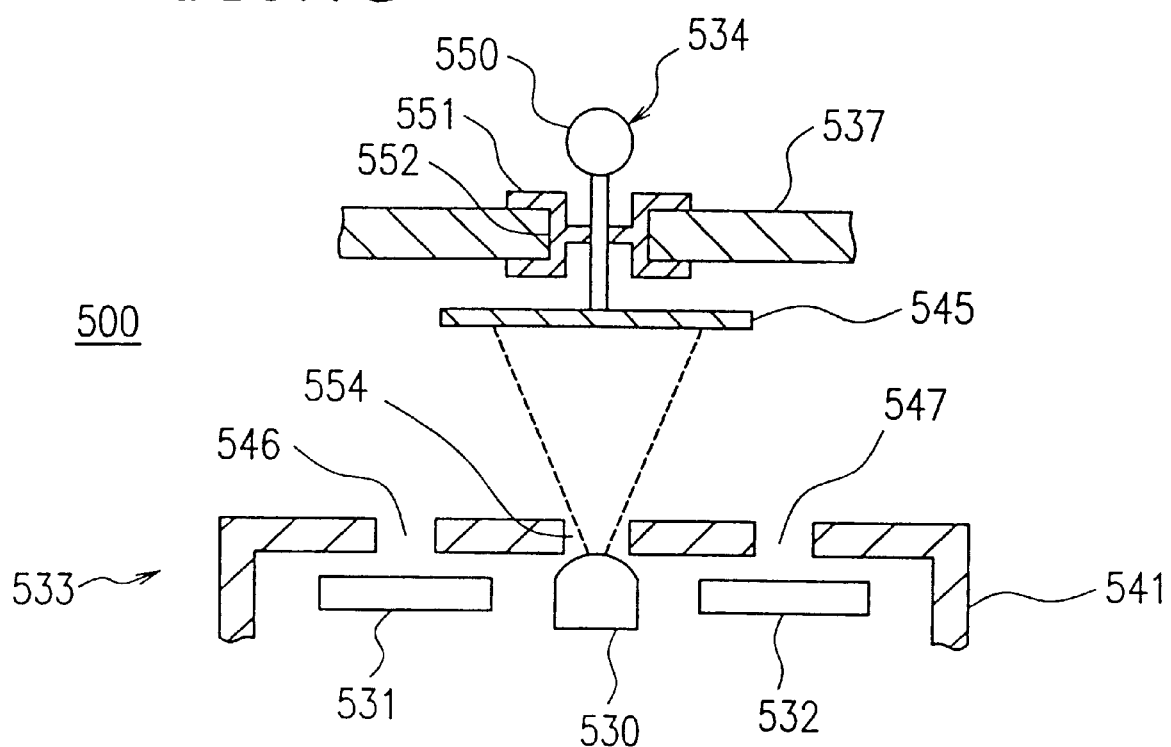
FIG. 18 is a sectional view of a fifth example of the input device according to the present invention.

As shown in FIG. 18, the operation section 534 includes a stick section 550 with a sphere at the top thereof and a mirror-like reflection plate 545 attached integrally to the bottom end of the stick section 550. A rubber ring support 551 is secured to the circumference of the stick section 550. The support 551 is fitted in a hole 552 formed at the surface of a keyboard 537. With this configuration, the operation section 534 can be tilted forward, backward, rightward, and leftward, as well as being moved upward and downward.

Figure 21:
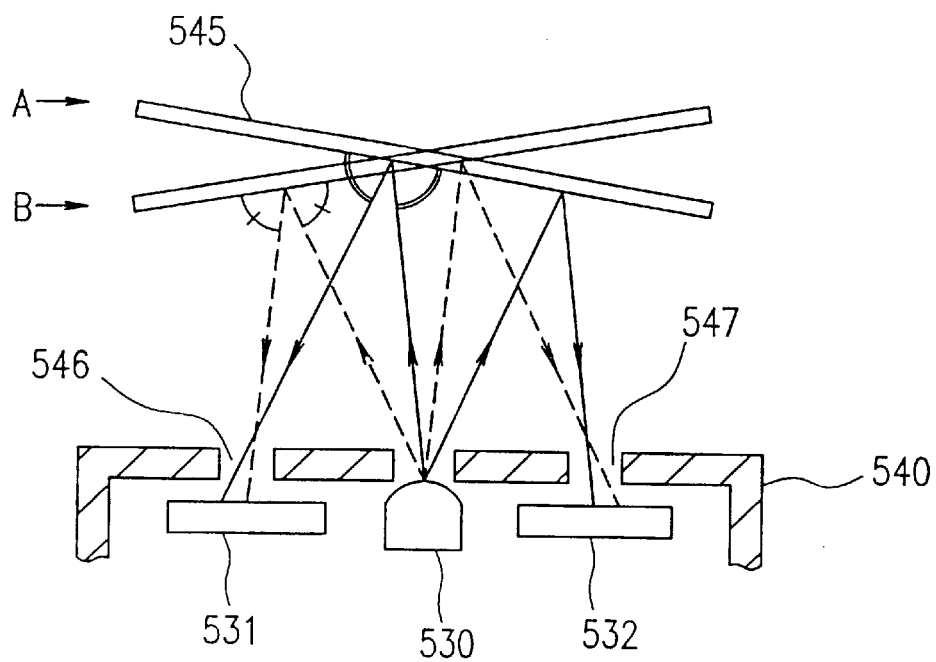
FIG. 21 is a view showing optical paths of light from the light emitting element obtained when an operation section is tilted.

In Example 5, the PSD for detecting the one-dimensional position and the PSD for detecting the two-dimensional position are used. The detection principle is the same as that described in Example 1. Light is emitted from the LED 530 and arrives at the PSDs 531 and 532 after being reflected by the reflection plate 545. The light incident positions on the PSDs 531 and 532 can be determined based on the photoelectric current output from the PSDs 531 and 532. As shown in FIG. 21, the light emitted from the LED 530 has a fixed divergent angle. The law of reflection defines that the angle of incident light and the angle of reflected light to and from the reflection plate 545 are equal, and that the incident light, the reflected light, and the normal at the irradiation point on the mirror surface are in the same plane. By using this law, the angles of light passing through the reflected light pass holes 546 and 547 can be determined according to the tilt and vertical position of the reflection plate 545. Once the angles of light passing through the reflected light pass holes 546 and 547 are determined, the light incident positions on the PSDs 531 and 532 are determined.

For example, when the reflection plate 545 is at a tilt A, the light from the LED 530 is reflected by the reflection plate 545 as shown by solid line in FIG. 21 and is incident on the PSDs 531 and 532. Likewise, when the reflection plate 545 is at a tilt B, the light is reflected by the reflection plate 545 as shown by dotted line and is incident on the PSDs 531 and 532. Thus, the light incident positions vary depending on the tilt of the reflection plate 545.

Figure 22:
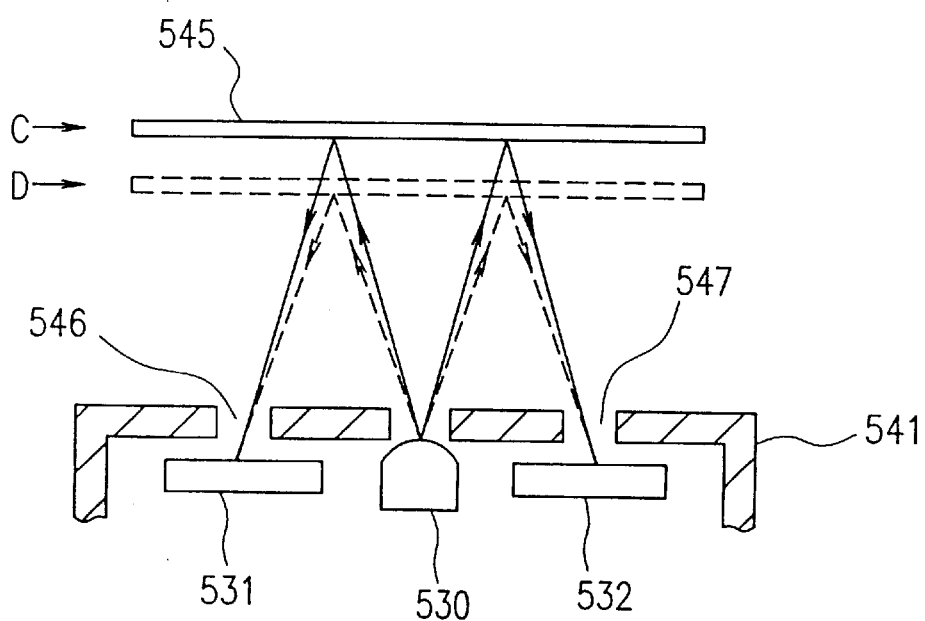
FIG. 22 is a view showing optical paths of light from the light emitting element obtained when an operation section is moved vertically.

Further, the reflection plate 545 moves vertically as the operation section 534 moves vertically. Accordingly, when the reflection plate 545 is at a position C as shown in FIG. 22, the light is reflected by the reflection plate 545 as shown by the solid line and is incident on the PSDs 531 and 532. Likewise, when the reflection plate 545 is at a position D, the light is reflected by the reflection plate 545 as shown by the broken line in FIG. 22 and is incident on the PSDs 531 and 532. Thus, the light incident position on the PSDs also vary depending on the vertical position of reflection plate 545.

Figure 23:
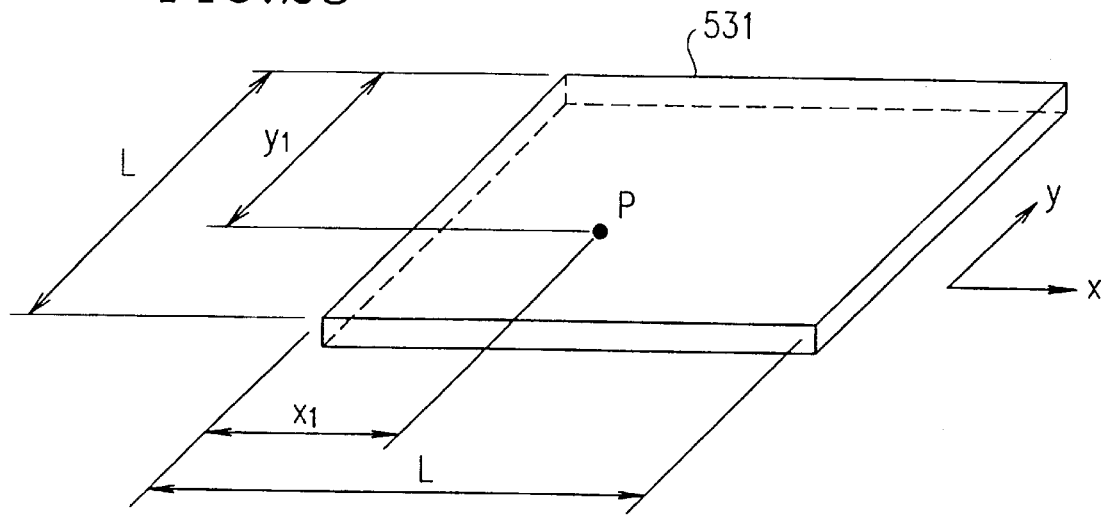
FIG. 23 is a view for explaining the principle of a PSD according to the present invention.

Referring to FIG. 23, assume that light reflected from the reflection plate 545 passes through the reflected light pass hole 546 and is incident on a point P on the two-dimensional PSD 531 having an effective light receiving size of L (mm)×L (mm). Output currents $I_1$ and $I_2$ of the PSD 531 in the x direction are expressed by Formulae (1) and (2) shown in Example 1. Output currents $I_3$ and $I_4$ of the PSD 531 in the y direction are expressed by Formulae (3) and (4) shown in Example 1.

For example, $I_1/I_2$ and $I_3/I_4$ are obtained by the above formulae as follows:

$$I_1/I_2 = X_1/(L-x_1) \tag{19}$$

$$I_3/I_4 = Y_1/(L-y_1) \tag{20}$$

By calculating the output currents of the two-dimensional PSD 531, an output corresponding to the position of light incident on the two-dimensional PSD 531 can be obtained. Likewise, from the output currents $I_5$ and $I_6$, an output corresponding to the position of light incident on the one-dimensional PSD 532, for example, $I_5/I_6$ can be obtained. As a result, three outputs can be obtained from the optical sensor 533.

As described above, the angles of light incident on the PSDs 531 and 532 vary with three parameters, i.e., the tilt of the reflection plate 545 in the x direction, the tilt thereof in the y direction, and the vertical position (position in the z direction) thereof. Incidentally, three output current ratios are obtained from the PSDs 531 and 532. Accordingly, the tilt of the operation section 534 in the x direction, the tilt thereof in the y direction, and the position thereof in the z direction can be obtained uniquely. More specifically, by calculating, for example, $I_1/I_2$, $I_3/I_4$, and $I_5/I_6$ based on the current values output from the PSDs 531 and 532, an x direction output, a y direction output, and a z direction output corresponding to the tilt of the operation section 534 in the x direction, the tilt thereof in the y direction, and the position thereof in the z direction, respectively, can be obtained. The x direction output, the y direction output, and the z direction output can also be obtained by calculating $I_1/(I_1+I_2)$, $I_3/(I_3+I_4)$, and $I_5/(I_5+I_6)$ as described in Example 1, instead of $I_1/I_2$, $I_3/I_4$, and $I_5/I_6$.

Figure 20:
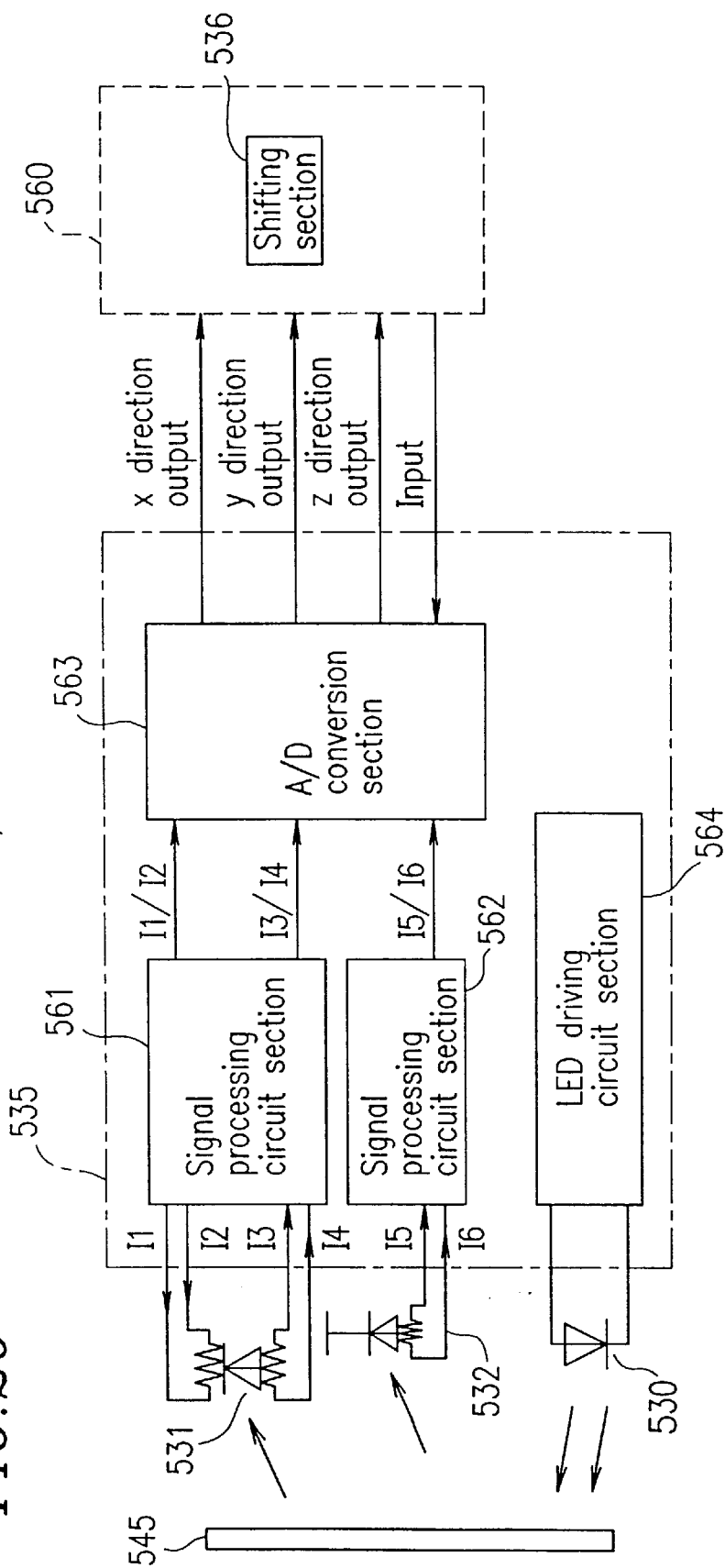
FIG. 20 is a block diagram of the input device according to the present invention.

As shown in FIG. 20, the output circuit 535 of Example 5 is connected to a control circuit 560 incorporated in the computer body. In addition to a CPU, a ROM, a RAM, etc., the control circuit 560 includes the above-described shifting section 536.

The output circuit 535 includes a signal processing circuit sections 561 and 562 and an A/D conversion section 563. The signal processing circuit sections 561 and 562 calculate the values of $I_1/I_2$, $I_3/I_4$, and $I_5/I_6$ based on the output currents from the PSDs 531 and 532. The A/D conversion section 563 converts the above analog values into digital values and outputs them to the control circuit 560 as the x direction output, the y direction output, and the z direction output. The output circuit 535 which is composed of an exclusively assigned IC is mounted in the printed board 540 or in the computer body. The x direction output, the y direction output, and the z direction output are output from three output terminals as parallel data. Alternatively, they may be output from a single output terminal as serial data. The x direction output, the y direction output, and the z direction output may also be output as analog values, which can be received by an A/D port of the control circuit 560.

The output circuit 535 also includes an LED driving circuit section 564 for driving the LED 530. The LED driving circuit section 564 controls the LED 530 so that the LED 530 always emits light as long as the power switch of the computer body is on. Alternatively, the LED 530 may be emitted intermittently like a pulse. In the latter case, the output currents from the PSDs 531 and 532 may be detected in synchronization with the light emission of the LED 530. With this operation, the influence of turbulence such as noise can be eliminated, and thus the reliability can be enhanced.

The shifting section 536 calculates the shift direction and speed of the cursor according to the amounts of tilt and the movement of the operation section 534 obtained from the three-dimensional positional information, i.e., the tilt in the x direction, the tilt in the y direction, and the position in the z direction of the operation section 534, so as to shift the cursor on the screen three-dimensionally.

The cursor shift for the input device 500 with the above configuration will be described with reference to FIGS. 18 and 20.

The stick section 550 of the operation section 534 is tilted in the direction in which the cursor on the screen is desired to be moved. As the stick section 550 moves, the reflection plate 545 moves. Light emitted from the LED 530 is reflected by the reflection plate 545, and only the reflected light which passes through the reflected light pass holes 546 and 547 is incident on the PSDs 531 and 532. The PSDs 531 and 532 output currents with values corresponding to the light incident positions thereon. The output circuit 535 conducts calculation using the outputs from the PSDs 531 and 532, and outputs the calculated results corresponding to the tilts of the operation section 534 in the x and y directions and the vertical position thereof to the control circuit 560 of the computer body as the x direction output, the y direction output, and the z direction output.

In the computer body, the shift direction and speed of the cursor are calculated based on the received three-dimensional positional information, i.e., the x, y, and z direction outputs, so as to shift the cursor on the screen under the calculated conditions. For example, when the operation section 534 is tilted rightward, the cursor shifts rightward on the screen at a shift speed corresponding to the amount of tilt of the operation section 534. As the tilt of the operation section 534 is large, the cursor shifts rapidly. As the tilt of the operation section 534 is small, the cursor shifts slowly. When the operation section 534 is tilted forward or backward, the cursor shifts downward or upward on the screen. When the operation section 534 is tilted obliquely in a backward right direction, the cursor shifts upper rightward on the screen. When the operation section 534 is pressed downward, the cursor shifts backward in the three-dimensional coordinate on the screen. When the operation section 534 is pulled upward, the cursor shifts forward in the three-dimensional coordinate on the screen.

Thus, the three-dimensional positional information can be obtained by the input device employing the non-contact optical method including the optical sensor 533 having the LED 530, the one-dimensional PSD 532, and the two-dimensional PSD 531 and the operation section 534 which can tilt and vertically move. Based on the obtained three-dimensional positional information, the cursor on the screen can be shifted in an arbitrary direction in the three-dimensional coordinates at an arbitrary speed.

Figure 24:
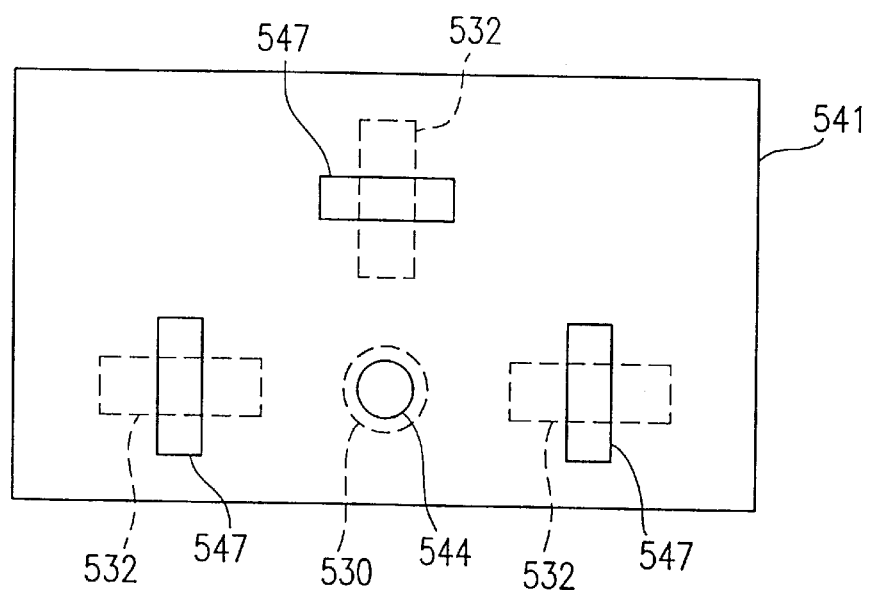
FIG. 24 is a plan view of an optical sensor of an alternative example according to the present invention.

The input device of Example 5 can be modified and changed within the scope of the present invention. For example, a laser diode or a fluorescent display tube may be used as the light emitting element. Two one-dimensional PSDs disposed so that the length directions thereof are perpendicular to each other may be used instead of the two-dimensional PSD 531. In this case, three one-dimensional PSDs are used. FIG. 24 shows an example of the arrangement of three one-dimensional PSDs 532. Two of the PSDs 532 are disposed sandwiching the LED 530 so that the length directions thereof are parallel to the direction of the arrangement of the two PSDs 532. The remaining PSD 532 is disposed so that the length direction thereof is perpendicular to the length directions of the other two PSDs 532. The input device of Example 5 may be disposed somewhere other than the keyboard, which expands the range of the application of the input device.

As is apparent from the above description, the input device of Example 5 uses an optical sensor combining a light emitting element, a one-dimensional PSD, and a two-dimensional PSD, or an optical sensor combining a light emitting element, a one-dimensional PSD, and two one-dimensional PSD disposed in directions crossing each other. With this configuration, the tilt and the vertical position of the operation section when it is tilted and vertically moved can be detected so as to output the detected results as three-dimensional positional information. Accordingly, a cursor or an icon on the screen for a computer and the like can be shifted three-dimensional, i.e., rightward, leftward, upward, downward, forward, and backward. Thus, an input device effectively applicable to the three-dimensional image input operation used for computer graphics and the like can be obtained.

The input device of Example 5 has a simple structure employing the non-contact optical method and having no mechanical operation portion as in Examples 1 to 4. Malfunction due to dust entering from the outside is avoided. Accordingly, the reliability and durability of the device is improved, and the longer life can be achieved. Further, since the operation section and the optical sensor can be integrally formed, the input device can be mounted on the outer surface of the computer body. Thus, since the mounting position is not limited and only a small space is required, the device of this example can be applied to a wider range of apparatuses including small-type computer related apparatuses.

EXAMPLE 6

A sixth example of the input device according to the present invention will be described with reference to FIGS. 25 to 42.

Figure 25:
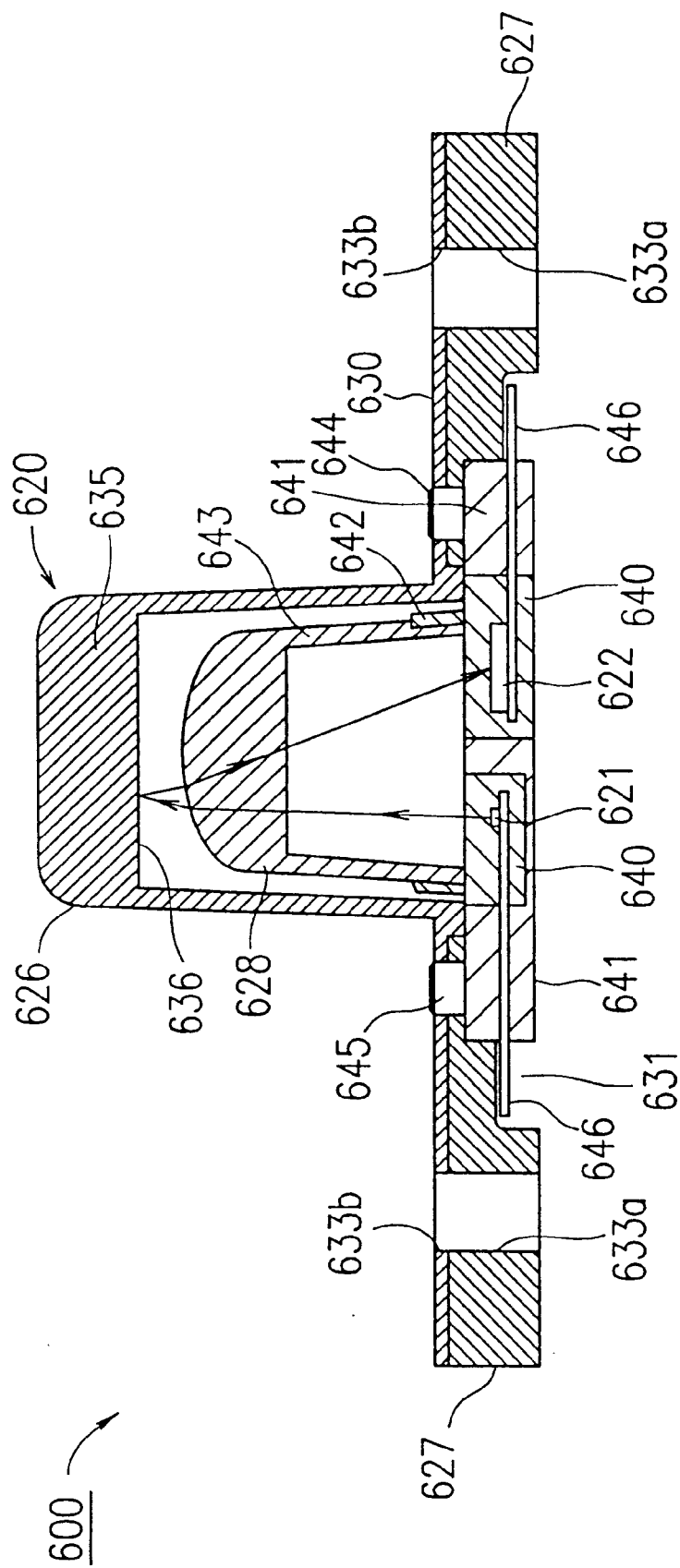
FIG. 25 is a sectional view of a sixth example of the input device according to the present invention.
Figure 26A:
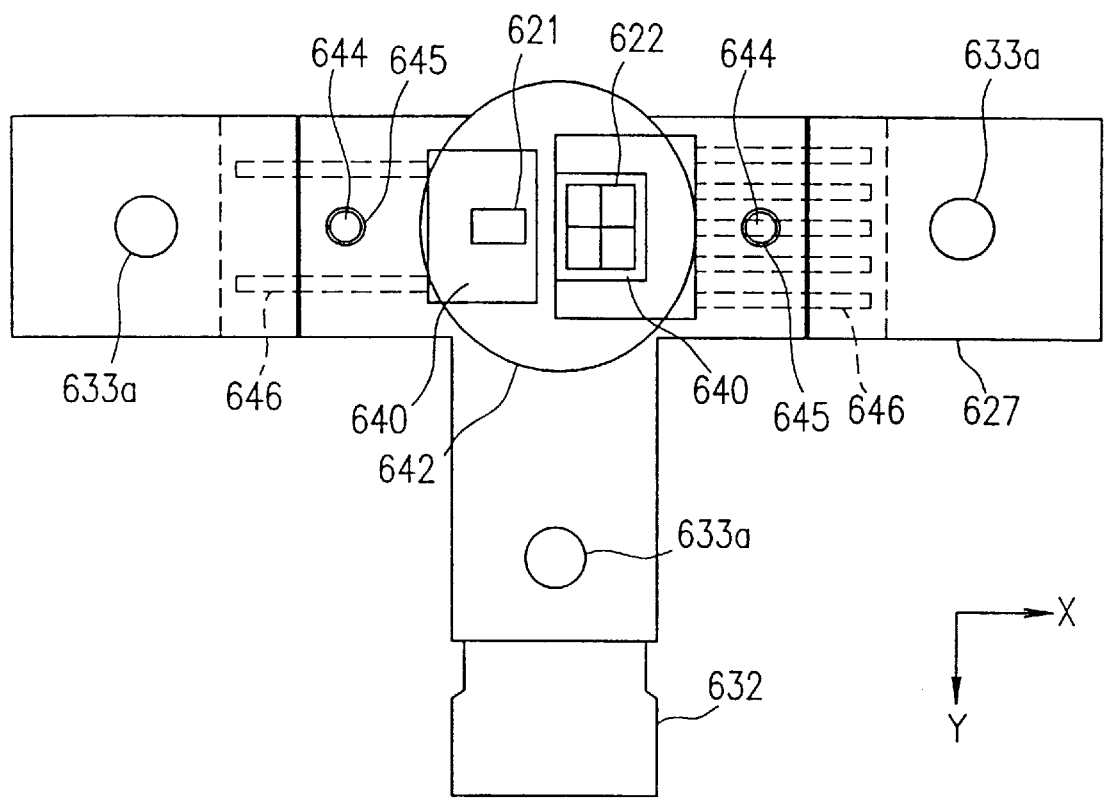
FIGS. 26A and 26B are a top view and a side view, respectively, showing the inside of the input device according to the present invention.
Figure 26B:
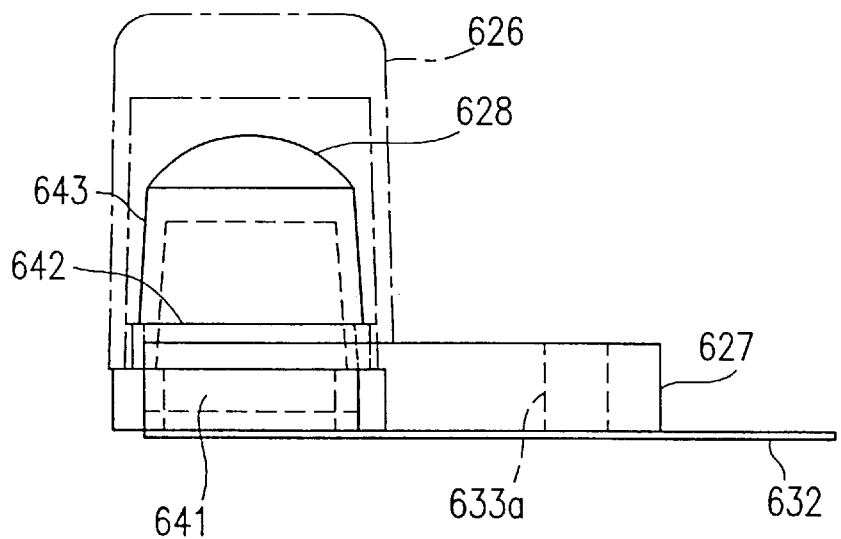
Figure 27:
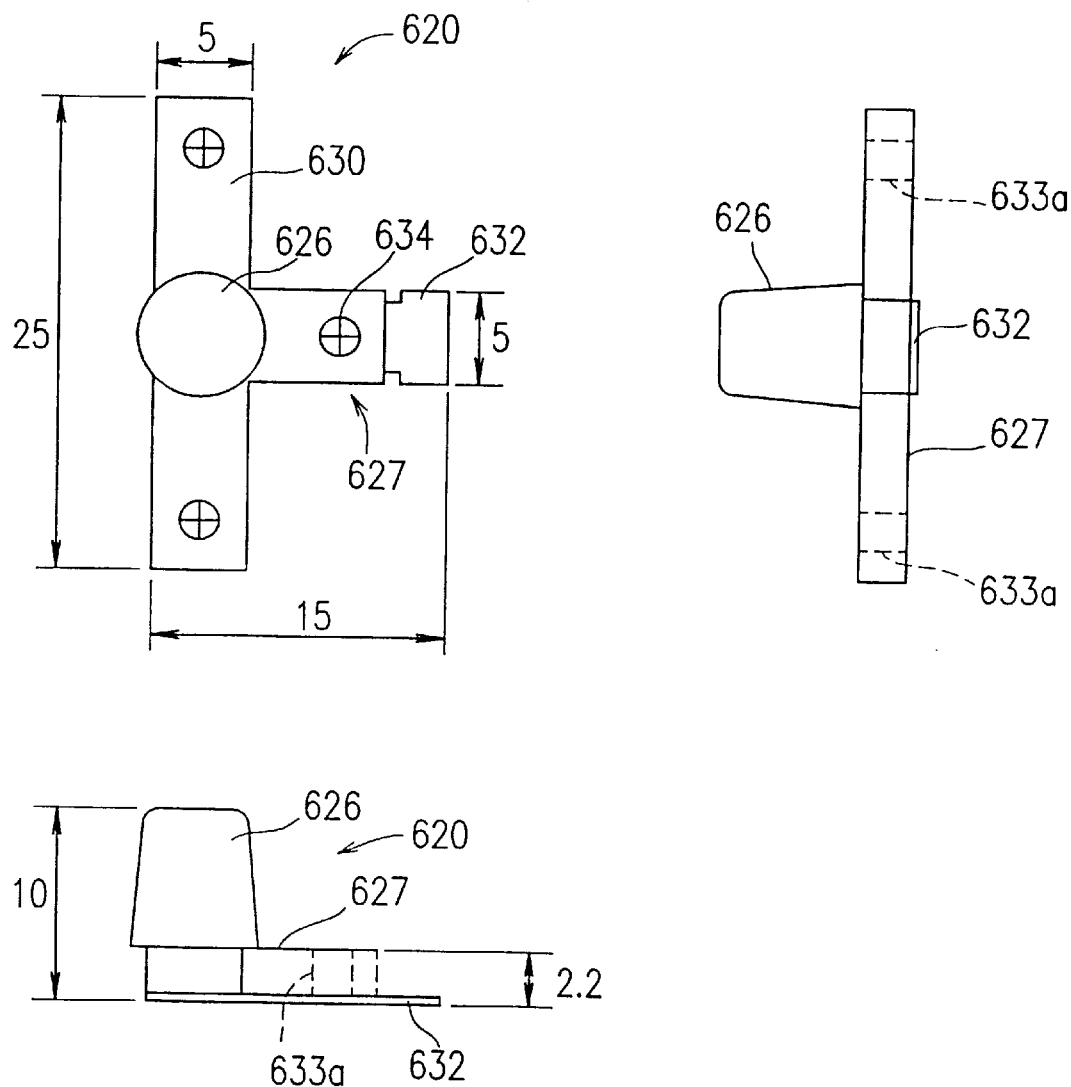
FIG. 27 shows the profile of the input device according to the present invention.
Figure 28:
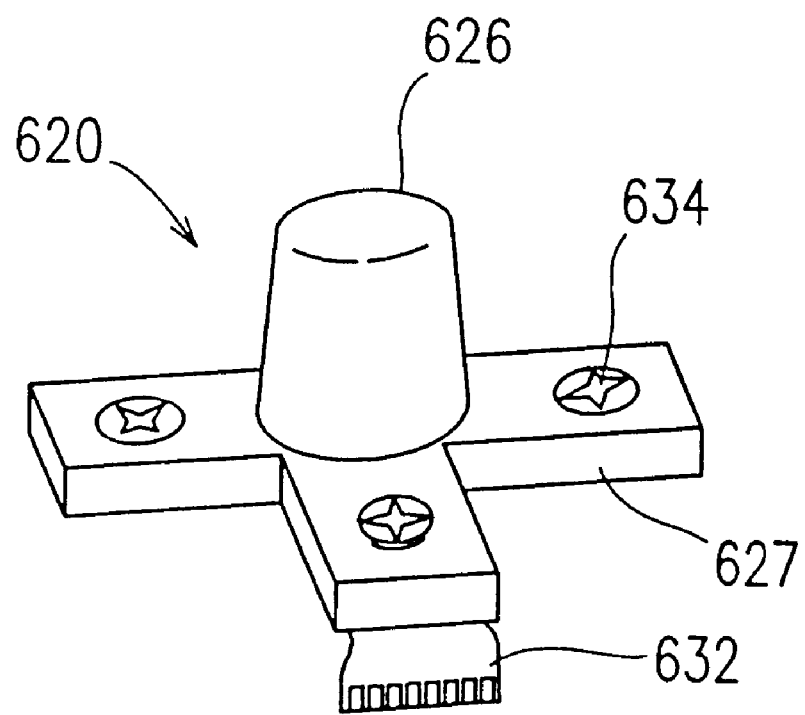
FIG. 28 is a perspective view of the input device according to the present invention.
Figure 29:
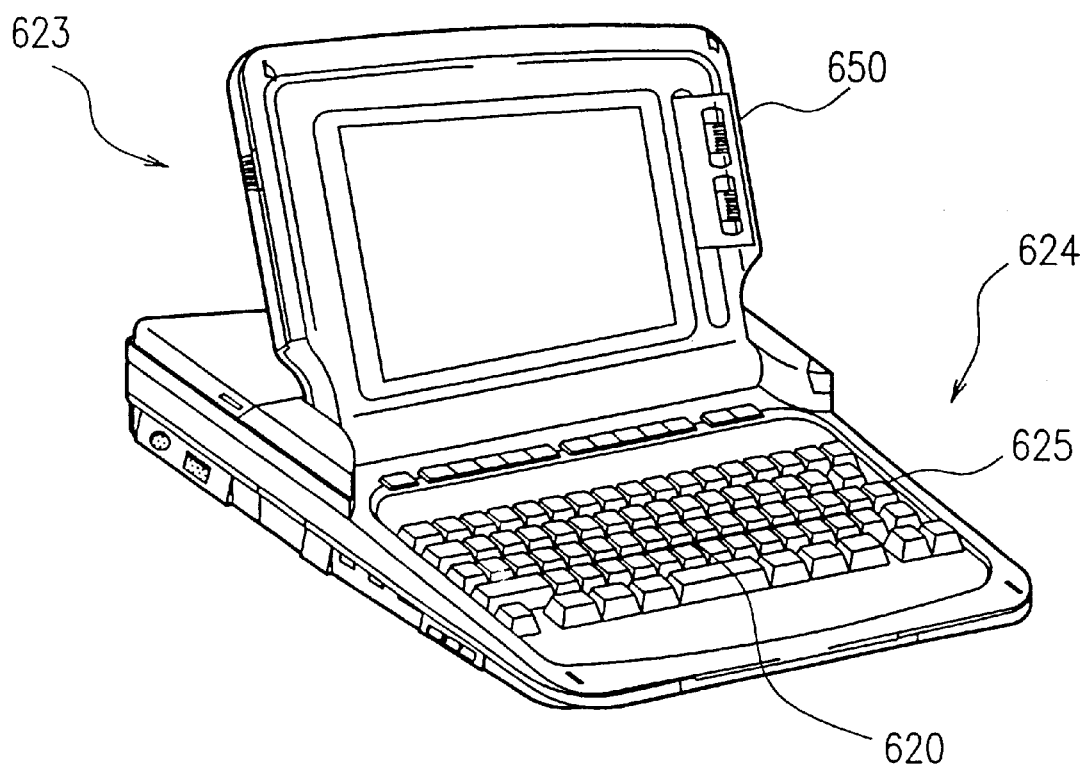
FIG. 29 is a perspective view of an apparatus provided with the input device according to the present invention.
Figure 30A:
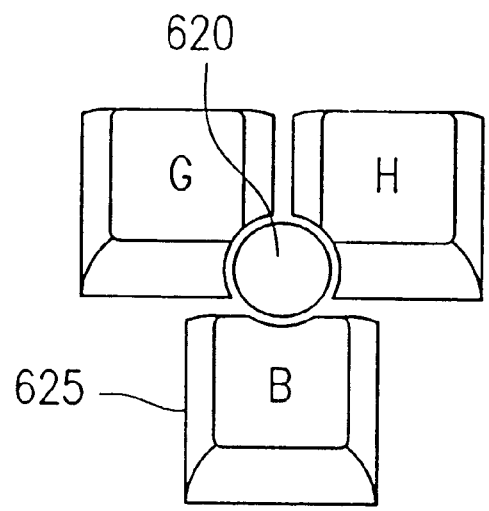
FIGS. 30A and 30B are a top view and a side view, respectively, showing the position of the input device on a keyboard according to the present invention.
Figure 30B:
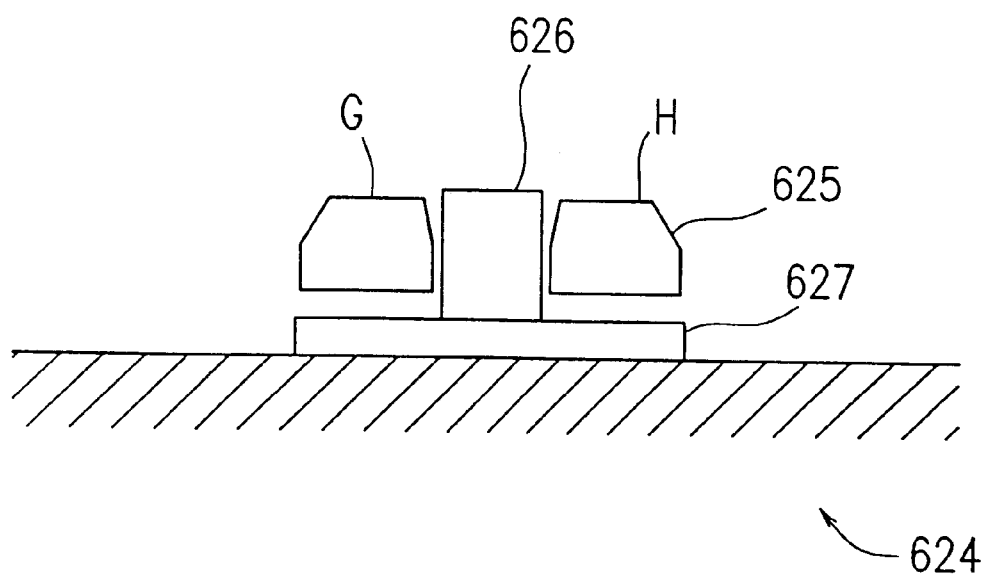

Referring to FIGS. 25 to 28, an input device 600 of Example 6 integrally includes a movable body 620 which is displaced upon receipt of a load in a two-dimensional direction, a light emitting element 621, and a light receiving element 622. An image of the light emitting element 621, which moves in association with the displacement of the movable body 620, is formed on the light receiving element 622. The input device 600 is of a convex shape having a T-shaped profile when viewed from above as shown in FIGS. 26A and 26B. The sizes are as shown in FIG. 27 (unit: mm). As shown in FIGS. 29, 30A, and 30B, the input device 600 is disposed in a space surrounded by G, H, and B keys 625 of a keyboard 624 of an apparatus 623 such as a personal computer, a wordprocessor, or the like so that it protrudes about 1 mm above the top of the keys 625.

The movable body 620 includes a movable section 626 which is displaced by the operation of the user and a fixing section 627 for fixing the movable section 626 to the keyboard 624. The movable section 626 and the fixing section 627 are integrally formed. The light emitting element 621, the light receiving element 622, and a converging lens 628 for forming the image of the light emitting element 621 on the light receiving element 622 are integrally formed as a reflection type tilt sensor, which is mounted on the fixing section 627 so as to face the movable section 626.

The movable section 626 is cylindrical with the top surface closed. Legs 630 (e.g., FIG. 27) extend in the opposite directions along the X axis from the bottom rim of the cylindrical section. The T-shaped fixing section 627 has a concave portion 631 (FIG. 25) at the bottom thereof for receiving the tilt sensor. The legs 630 attach to the top surface of the X-axis portions of the fixing section 627. The Y-axis portion of the fixing section 627 includes a substrate 632 at the bottom for securing the electrical connection with the outside circuitry. Through holes 633a and 633b are formed through the fixing section 627 and the legs 630, respectively, so as to secure the movable body 620 to the keyboard 624 by screwing screws 634 through the through holes 633a and 633b.

Because the movable body 620 needs to be capable of being displaced or tilted, the movable section 626 is molded with an elastic resin, while the fixing section 627 is molded with a rigid resin. For the rigid resin, thermoplastic materials with a hardness of 98 or more (measured according to the testing method of JIS K6301) and an elastic modulus of 2000 kg/cm$^2$ or more (measured according to the testing method of ASTM D790), for example, PC (polycarbonate), ABS (acrylonitrile-butadiene-styrene), and denatured PPO (poly(phenylene oxide)), are mainly used. For the elastic resin, thermo-plastic materials with a hardness of 70 to 98 (measured according to the testing method of JIS K6301) and an elastic modulus of 100 to 2000 kg/cm$^2$ (measured according to the testing method of ASTM D790), for example, polyester elastomers, urethane, and rubber resins, are mainly used.

The movable section 626 and the fixing section 627 are integrally formed by two-color molding in consideration of the precision and durability. Alternatively, insert molding or fixing with screws or hooks may be used in consideration of difficulties accompanying the molding structure and the total cost. With the above two-layer structure having the elastic and rigid portions, the movable body 620 can be smoothly displaced when a load is applied thereto. This improves the performance of the input device (pointing device).

Figure 31A:
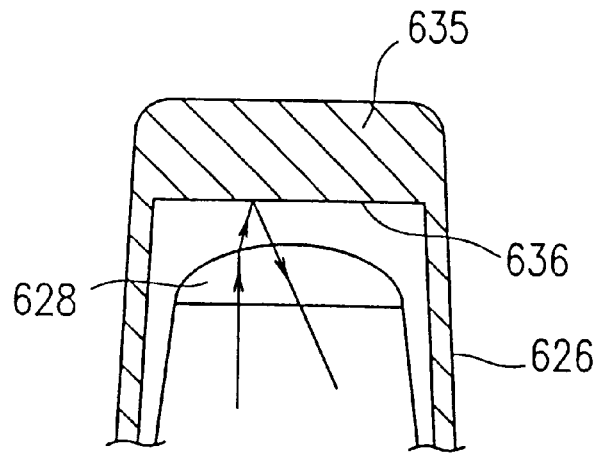
FIGS. 31A, 31B, and 31C show views of a movable body where the reflection surface is flat, molded with a rigid resin, and curved, respectively.
Figure 31B:
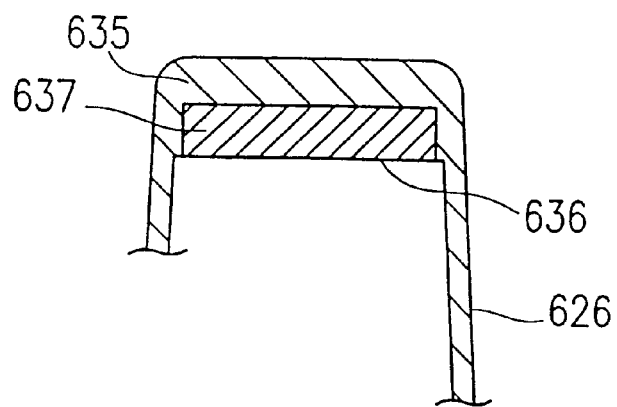
Figure 31C:
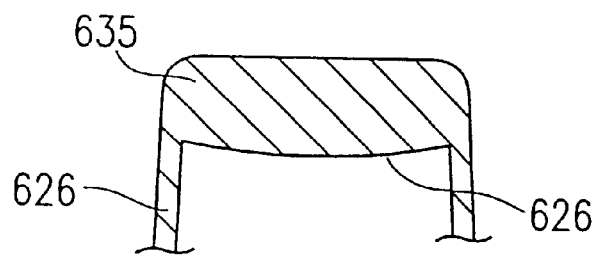

The inner bottom surface of a top portion 635 of the movable section 626 facing the tilt sensor, which has a diameter of about 5 mm, is used as a reflection surface 636 for the angular detection by the tilt sensor by use of regular reflection of light as shown in FIG. 31A. The reflection surface 636 is made flat and mirror-finished, galvanized, or evaporated. Alternatively, as shown in FIG. 31B, a flat plate 637 is integrally formed on the inner bottom surface of the top portion 635 of the movable section 626 by two-color molding or insert molding with a resin used for the fixing section 627 or other rigid resin. The flat plate 637 may be surface-treated so as to obtain the reflection surface 636. The surface treatment is difficult for a soft surface made of an elastic resin, for example. According to the alternative method, however, the surface treatment can be easily conducted because a rigid resin is used for the flat plate 637. Furthermore, the reflection surface face 636 which is generally flat may be curved as shown in FIG. 31C so as to converge light onto the light receiving element 622 effectively according to the displacement or tilt of the movable portion 626. Thus, by obtaining the reflection surface 636 by the surface treatment, light emitted from the light emitting element 621 can be effectively used, so as to increase the output of the tilt sensor and obtain sharp images. As a result, the detection characteristic of the sensor improves.

Figure 32:
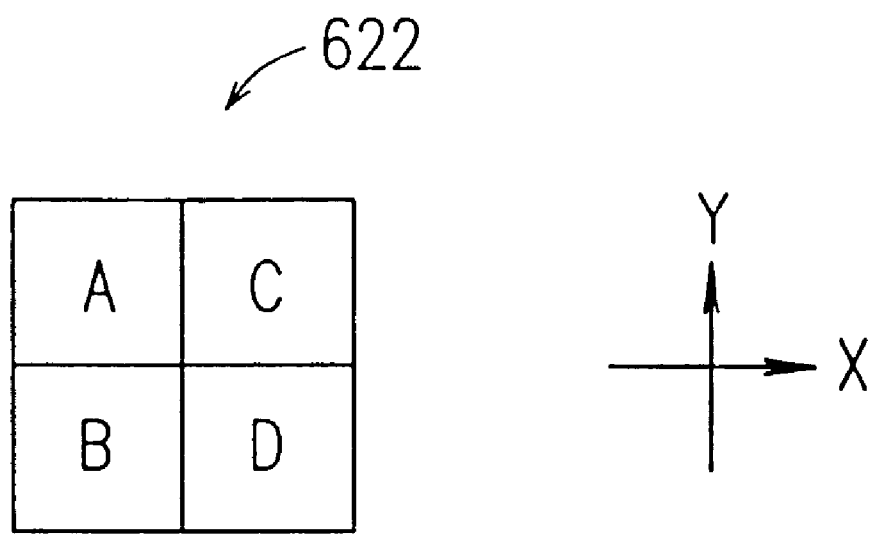
FIG. 32 shows an arrangement of a quartered photodiode according to the present invention.

The tilt sensor is produced in the following manner: A light emitting diode (LED) as the light emitting element 621 and a multi-divided (quartered) photodiode as the light receiving element 622 are enclosed with a translucent epoxy resin and the like separately, so as to form primary molded portions 640 as shown in FIGS. 25 and 26A. Then, a secondary molded portion 641 which includes the primary molded portions 640 is formed using light-shading epoxy resin or the like in such a manner that the light emitting side of the light emitting element 621 and the light receiving surface of the light receiving element 622 are not covered with the portion 641. The lens 628 is disposed above the light emitting element 621 and the light receiving element 622, and cylindrical support legs 643 extending from the lens 628 are fitted in a ring-shaped lens frame formed on the primary molded portions 640 and the secondary molded portion 641. Thus, the tilt sensor is formed integrally as shown in FIGS. 25 and 26B. In order to prevent an influence of turbulence on the light receiving element 622, a visible light cutting agent may be added to a resin material for the lens 628 before the molding of the lens 628. Quartered portions A, B, C, and D of the photodiode as the light receiving element 622 are arranged with respect to the X axis and Y axis as shown in FIG. 32.

A pair of circular protrusions 644 are formed on the secondary molded portion 641 as shown in FIGS. 25 and 26A. The tilt sensor is mounted on the concave portion 631 of the fixing section 627, and the protrusions 644 are fitted in through holes 645 formed in the fixing section 27 and the movable section 626. Thus, the tilt sensor is secured in the movable body 620 and the input device (pointing device) 600 with an integral structure is completed. Leads 646 of the light emitting element 621 and the light receiving element 622 are connected to the substrate 632 via a flexible printed board or the like.

Figure 33:
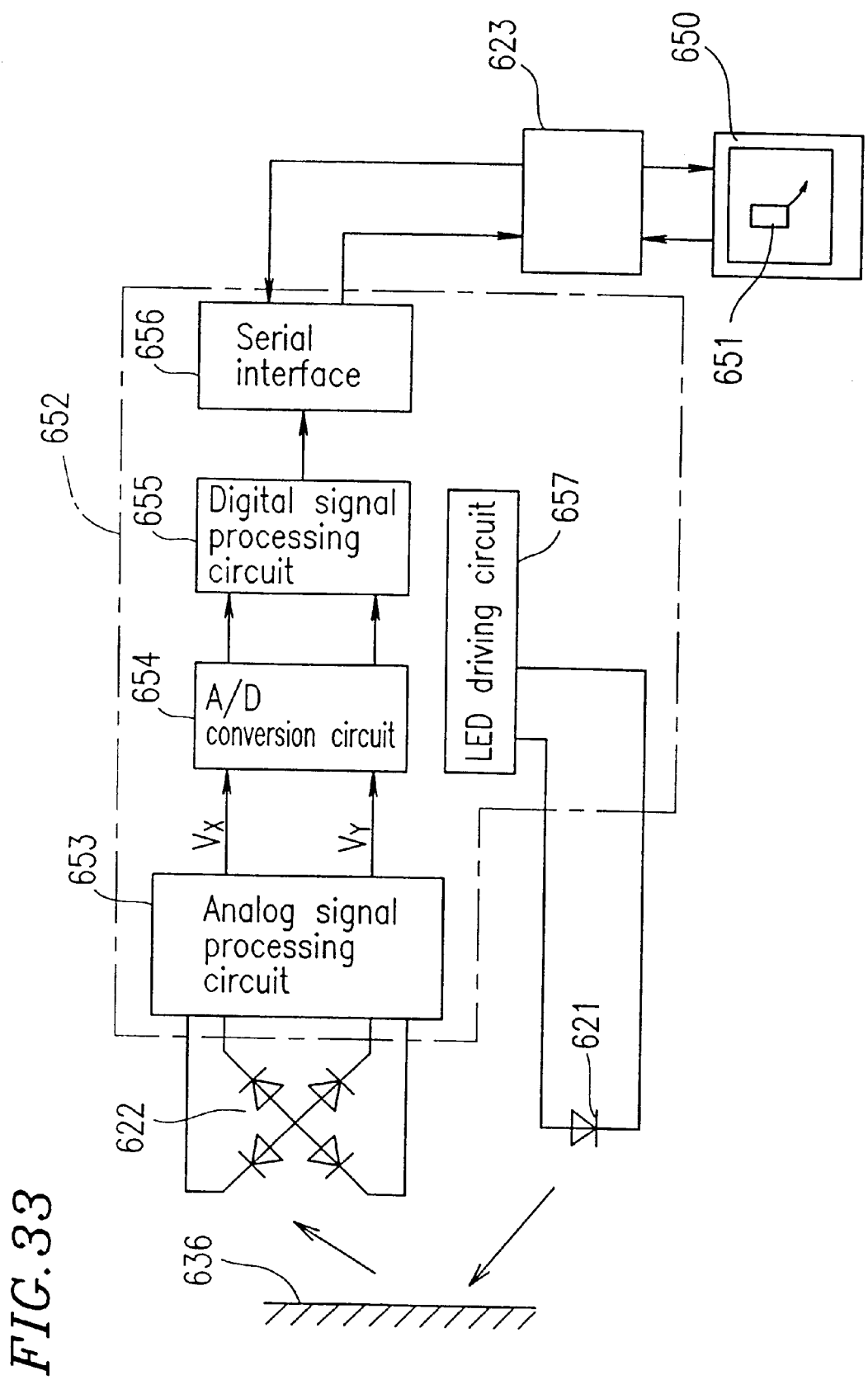
FIG. 33 is a block diagram of the input device according to the present invention.

Referring to FIG. 33, the input device 600 further includes a control circuit 652, which detects the displacement of the movable body 620 based on the output of the light receiving element 622, and outputs the detected results as information for shifting a cursor 651 or an icon on a display 650 of a computer or the like. The control circuit 652 includes, in addition to a microcomputer or a control IC, an analog signal processing circuit 653, an A/D conversion circuit 654, a digital signal processing circuit 655, a serial interface 656, and a driving circuit 657 for driving the light emitting element 621. The analog signal processing circuit 653 conducts signal processing for output currents from the light receiving element 622 and calculates X-axis and Y-axis direction output signals as analog values. The A/D conversion circuit 654 converts the analog values output from the analog signal processing circuit 653 into digital values. The digital signal processing circuit 655 converts the digital signals into signals representing shift information including the shift direction and shift amount of the cursor. The serial interface 656 allows the control circuit 652 to connect with the apparatus 623 such as a computer. The analog signal processing circuit 653 may be formed together with the light receiving element 622 on a same chip.

Figure 34:
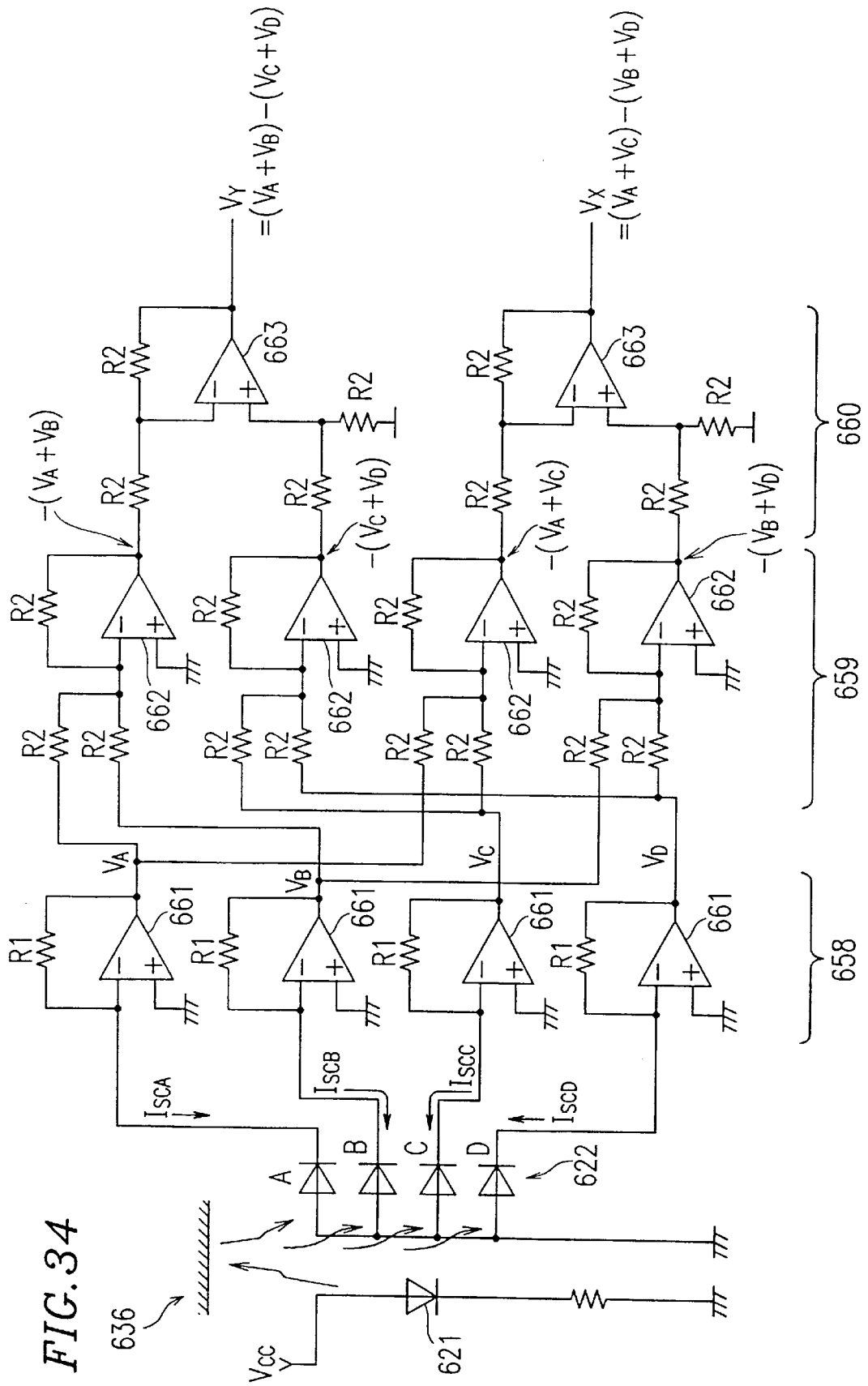
FIG. 34 shows a configuration of a signal processing circuit according to the present invention.

The configuration of the analog signal processing circuit 653 will be described in FIG. 34. The analog signal processing circuit 653 includes a voltage conversion section 658 for converting the output currents from the light receiving element 622 into voltages, an addition section 659 for adding the output voltages of respective sets of two of the quartered portions A, B, C, and D of the photodiode, and a subtraction section 660 for calculating the X-axis and Y-axis direction outputs from the added output voltages. The voltage conversion section 658 includes one operational amplifier 661 and one resistor R1 corresponding to each of the quartered portions A, B, C, and D of the photodiode. The addition section 659 includes four operational amplifiers 662 and resistors R2. The subtraction section 660 includes two operational amplifiers 663 and resistors R2.

The digital signal processing circuit 655 calculates the direction and amount of the load applied to the top portion of the movable section 626 by synthesizing vectors of the X-axis and Y-axis direction outputs, and determines the shift direction and speed of the cursor 651 based on the calculated results. Alternatively, in place of the above operation, a simple method using software carried out by the apparatus such as the computer may be conducted after the A/D conversion. For example, the vectors of the X-axis and Y-axis direction outputs may be divided by respective required division numbers. All of these divided ones are combined to form a matrix so as to determine the two-dimensional direction and size.

Next, the detection principle and the input processing of the input device 600 of Example 6 will be described.

Figure 35:
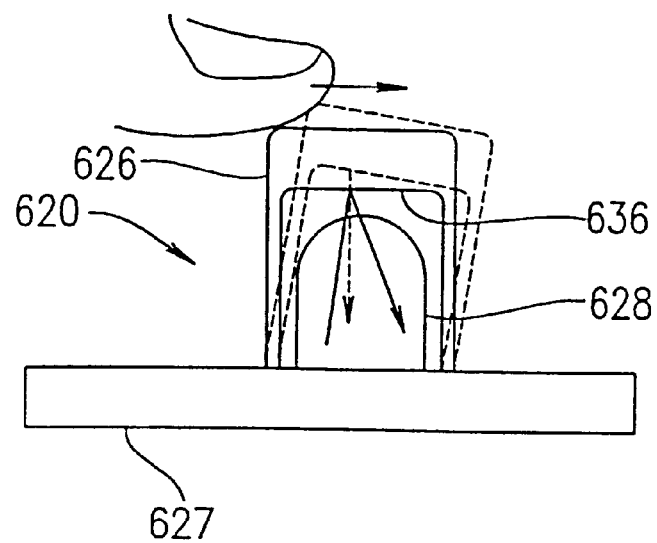
FIG. 35 is a view showing the displacement of the input device according to the present invention.

As shown in FIG. 35, when the top portion 635 of the movable body 620 is tilted in a two-dimensional direction with a finger, all of the movable section 626 except for the legs 630 attached to the fixing section 627 is displaced. As a result, the movable section 626 is tilted a little, so as to change the angle between the reflection surface 636 and the optical axis of the tilt sensor. Light emitted from the light emitting element 621 is reflected by the reflection surface 636 of the movable section 626 after passing through the lens 628 and is then converged on the light receiving element 622 after passing through the lens 628 again. At this time, the images of the light emitting element 621 formed on the light receiving element 622 before and after the displacement of the movable section 626 are located at different positions.

Figure 36:
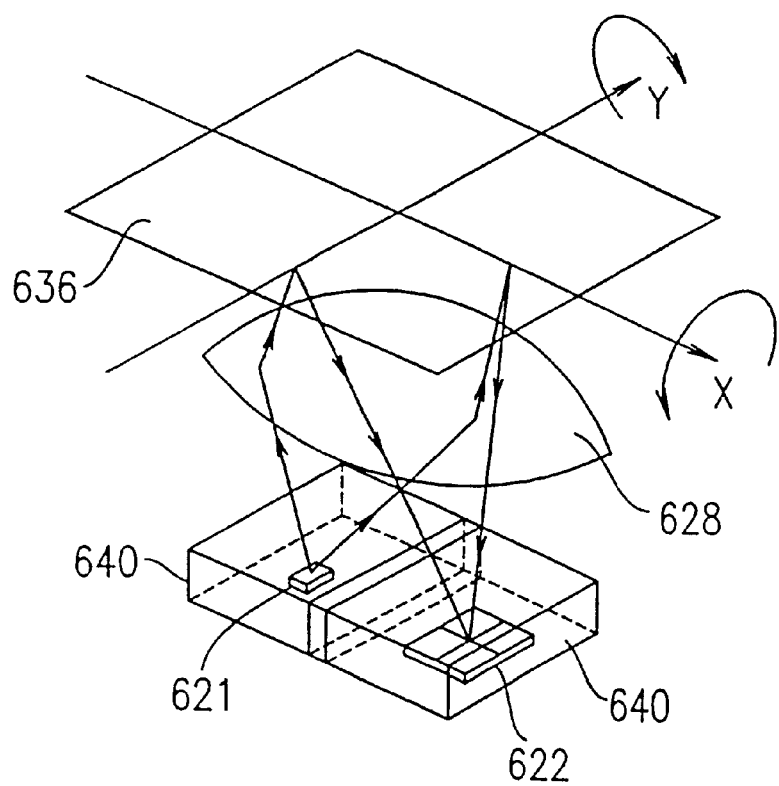
FIG. 36 is a view showing optical paths of the input device according to the present invention.
Figure 37A:
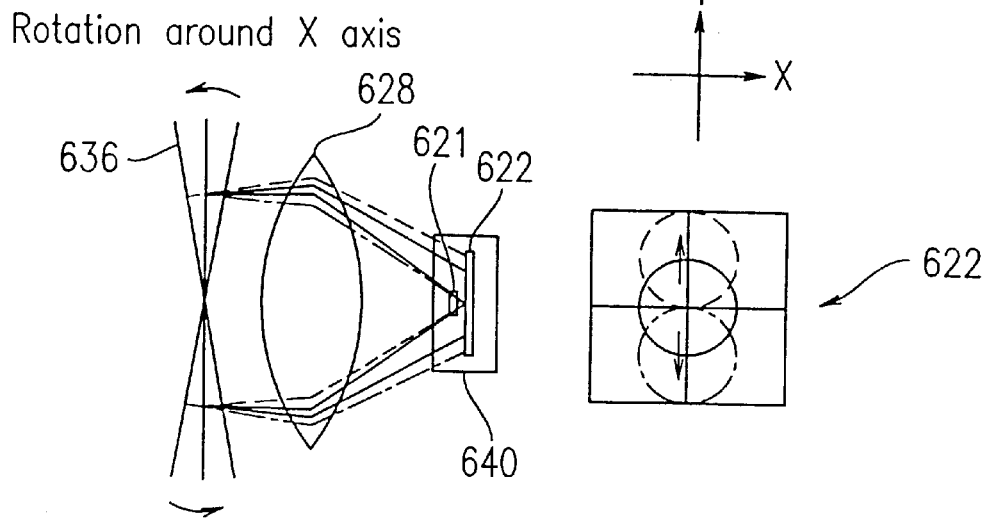
FIGS. 37A and 37B are views showing the shift of a light image when the displacement is around the X axis and the Y axis, respectively.
Figure 37B:
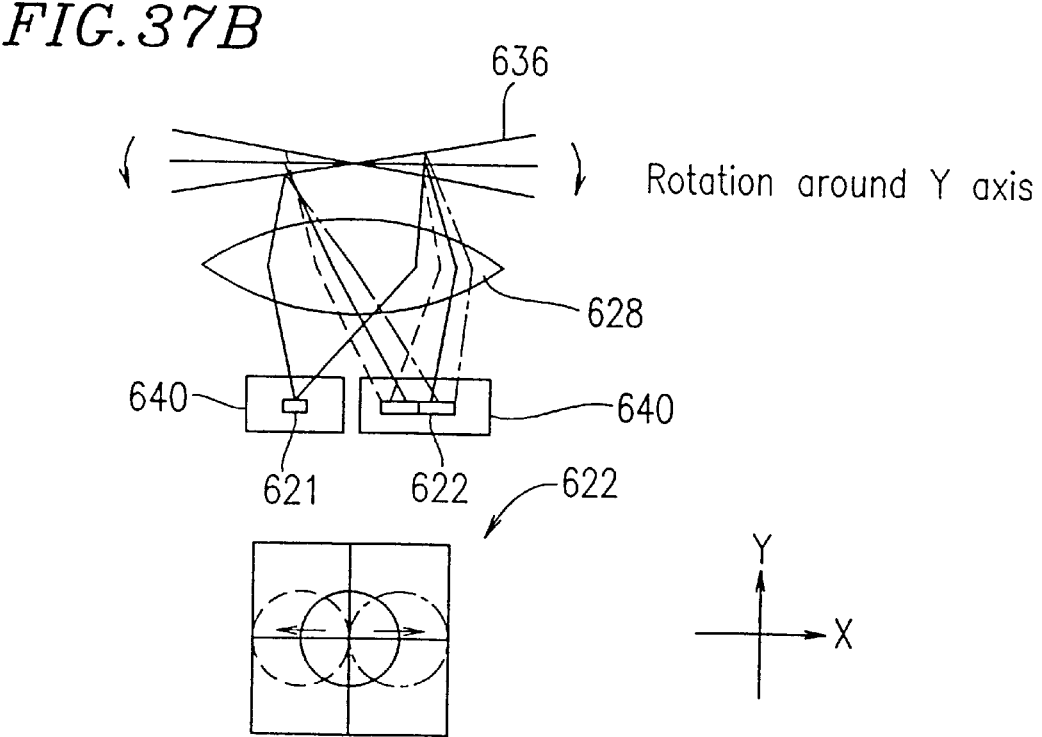

As shown in FIG. 36, the displacement of the reflection surface 636 caused by the displacement of the movable section 626 is represented by the rotations around an axis along which the light emitting element 621 and the light receiving element 622 are in line, i.e., the X axis, and the Y axis perpendicular to the X axis. Accordingly, the direction of the load applied to the top portion 635 of the movable section 626 by the user can be represented by two directions of rotations around the X axis and the Y axis for conducting the input processing. For example, the light image on the light receiving element 622 shifts in the Y-axis direction by the rotation around the X axis shown in FIG. 37A. Likewise, the light image on the light receiving element 622 shifts in the X-axis direction by the rotation around the Y axis shown in FIG. 37B.

The quartered portions A, B, C, and D of the light receiving element 622 respectively output currents $I_{SCA}$, $I_{SCB}$, $I_{SCC}$, and $I_{SCD}$. The output currents of the light receiving element 622 are supplied to the analog signal processing circuit 653, and are converted into voltages by the voltage conversion section 658 to obtain $V_A=R1 \times I_{SCA}$, $V_B=R1 \times I_{SCB}$, $V_C=R1 \times I_{SCC}$, $V_D=R1 \times I_{SCD}$. Then, since the light image on the light receiving element 622 shifts in the Y-axis direction for the rotation around the X axis due to the tilt of the reflection surface 636, the photodiode is divided into two sets, i.e., a set of the quartered portions A and C and a set of the quartered portions B and D, and the output voltages of each set are added. Likewise, for the rotation around the Y axis, the photodiode is divided into two sets, i.e., a set of the quartered portions A and B and a set of the quartered portions C and D, and the output voltages of each set are added. As a result, as the outputs from the addition section 659, $-(V_A+V_C)$ and $-(V_B+V_D)$ are obtained for the rotation around the X axis, while $-(V_A+V_B)$ and $-(V_C+V_D)$ are obtained for the rotation around the Y axis. As the outputs from the subtraction section 660, $V_X=(V_A+V_C)-(V_B+V_D)$ is obtained as the vector of the X-axis direction output, while $V_Y=(V_A+V_B)-(V_C+V_D)$ is obtained as the vector of the Y-axis direction output.

Figure 38:
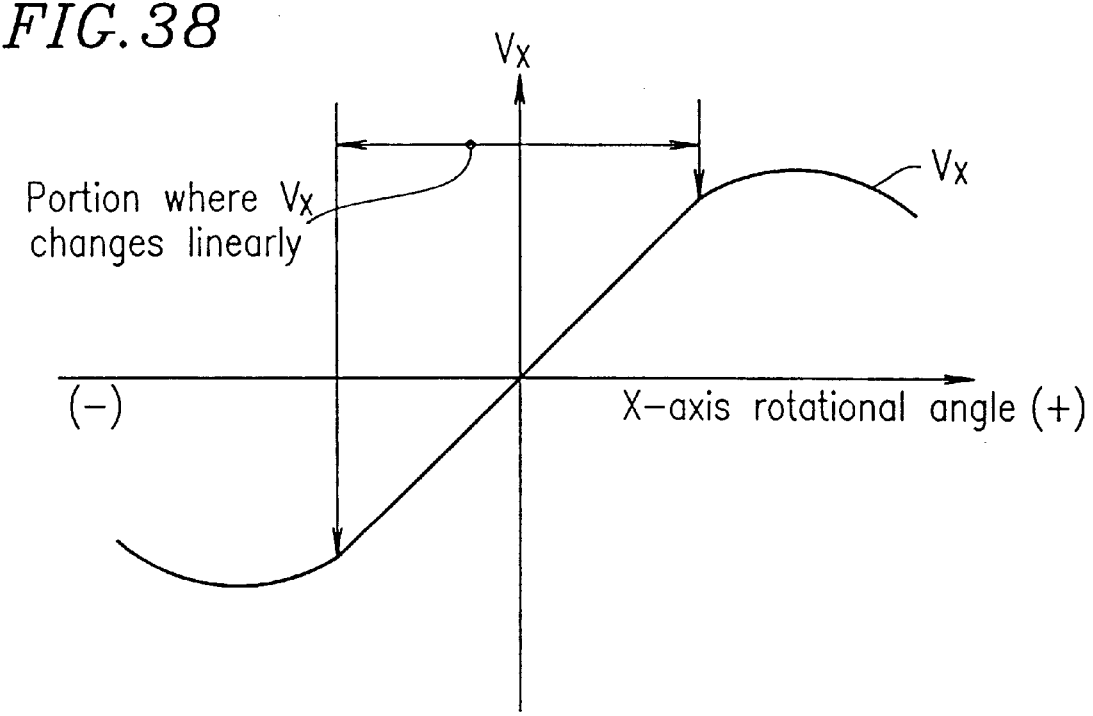
FIG. 38 shows the relationship between the X-axis direction output and the rotational angle.
Figure 39:
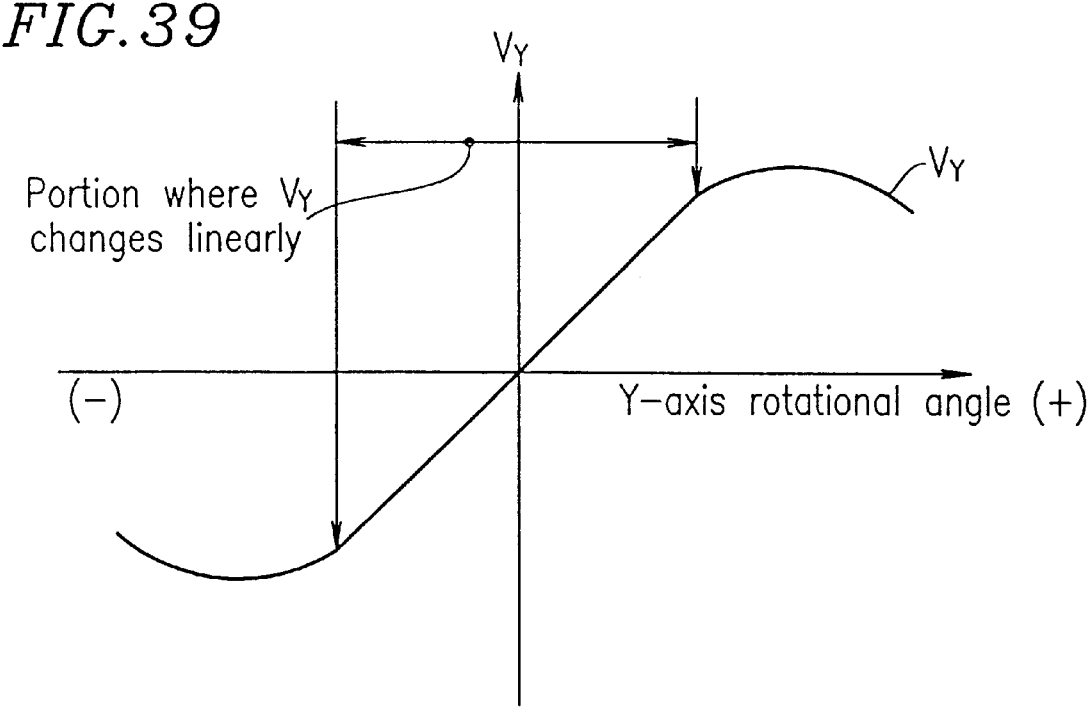
FIG. 39 shows the relationship between the Y-axis direction output and the rotational angle.

The relationship between the rotational angle around the X axis and $V_X$ is represented by a S-shaped curve having a linear portion where $V_X$ changes linearly as shown in FIG. 38. Likewise, the relationship between the rotational angle around the Y axis and $V_Y$ is represented by a S-shaped curve having a linear portion where $V_Y$ changes linearly as shown in FIG. 39. Accordingly, $V_X$ is uniquely determined with respect to the rotational angle around the X axis within the linear portion of $V_X$, while $V_Y$ is uniquely determined with respect to the rotational angle around the Y axis within the linear portion of $V_Y$.

Incidentally, the reason why the output currents of the sets of the quartered portions A and C and B and D are added respectively for the rotation around the X axis, and the output currents of the sets of the quartered portions A and B and C and D are added respectively for the rotation around the Y axis in the calculations of $V_X$ and $V_Y$ is to enlarge the light receiving area which can be effectively used for the shift of the light image. This addition is also effective for absorbing a variation of the light axis due to a variation of actual assembly.

Figure 40:
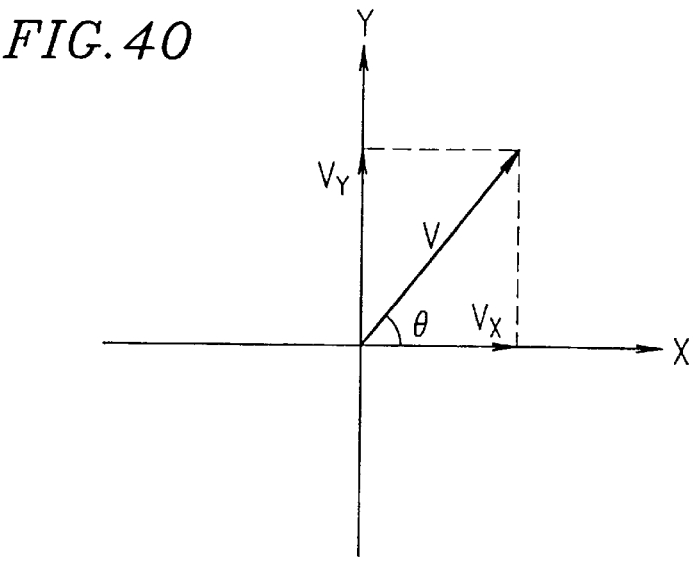
FIG. 40 shows a vector of the X-axis and Y-axis direction outputs.

Once $V_X$ and $V_Y$ are obtained by the analog signal processing circuit 653, the direction and magnitude of the load applied to the movable body 620 are obtained by synthesizing the vectors in the two directions, as shown in FIG. 40.

$$\theta = \tan^{-1}(V_Y/V_X) \quad (21)$$

$$V = V_X/\cos\theta = V_Y/\sin\theta \quad (22)$$
$$= V_X/\cos(\tan^{-1}(V_Y/V_X))$$
$$= V_Y/\sin(\tan^{-1}(V_Y/V_X))$$

where $\theta$ is the direction and V is the magnitude.

Thus, once $V_X$ and $V_Y$ are obtained, the direction $\theta$ and the magnitude V are determined. The shift direction and speed of the cursor 651 are then determined based on the determined $\theta$ and V. As a result, when the movable body 620 is operated, an output corresponding to the direction and magnitude of the operation is obtained. The cursor 651 can be shifted on the display 650 in a desired position by a desired distance according to this output. In other words, when a large load is applied to the movable body 620 in a given direction, the cursor 651 shifts in the direction rapidly. When a small load is applied to the movable body 620 in a given direction, the cursor 651 shifts in the direction slowly. When the finger leaves the movable body 620, the cursor 651 stops shifting.

Figure 41:
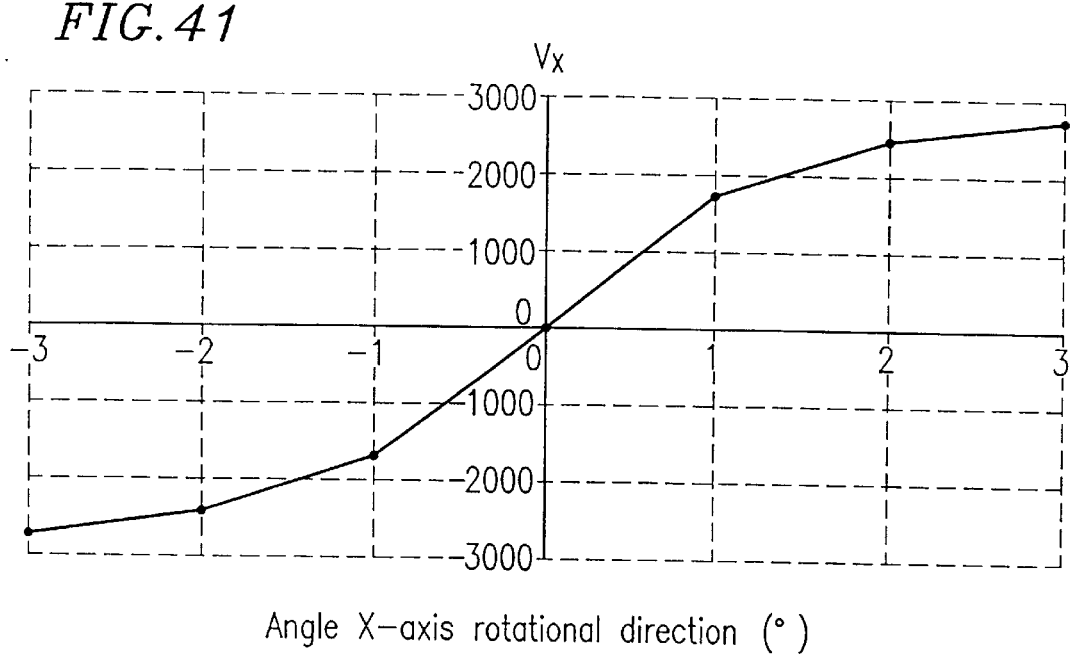
FIG. 41 shows the simulation results of the relationship between the X-axis direction output and the rotational angle.
Figure 42:
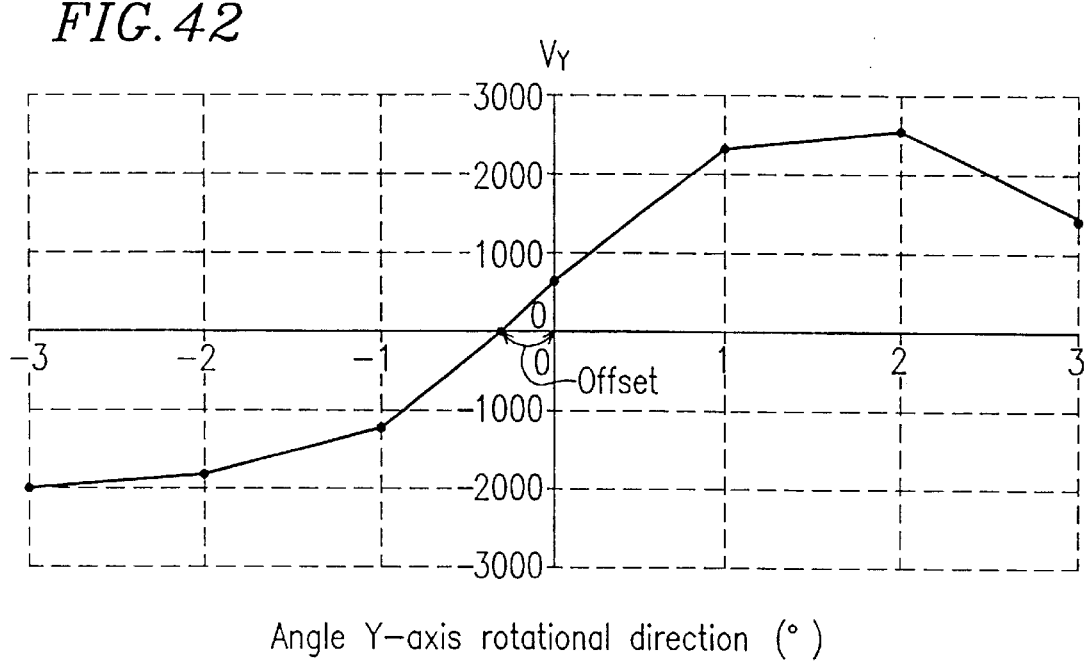
FIG. 42 shows the simulation results of the relationship between the Y-axis direction output and the rotational angle.

FIGS. 41 and 42 show the results of the optical simulation using light ray tracing method conducted to confirm that $V_X$ and $V_Y$ obtained by the input device 600 of Example 6 show linear changes with respect to the X-axis rotational angle and the Y-axis rotational angle, respectively. In this optical simulation, 120 light rays were emitted from the light emitting element 621 as a point light source within the range of a certain solid angle $\Delta\omega$. The refraction index of a resin used, the curvature of the lens 628, and the like were input into a computer, and the simulation was conducted for each light ray according to the reflection and refraction principles. The intensities of light rays finally reaching the light receiving element 622 were then evaluated for the 120 light rays.

In the above technique, the intensity of each of the original light rays is assumed to be 100, and total 120 light rays were emitted (total intensity: 120×100=12000). Using the intensities of the light rays reaching the quartered photodiode as the light receiving element 622, $V_X=(A+C)-(B+D)$ and $V_Y=(A+B)-(C+D)$ were calculated. The calculated values $V_X$ and $V_Y$ were graphed with the rotational angle as the abscissa. These results of the simulation also show the S-shaped curves of $V_X$ and $V_Y$ with respect to the rotational angle. Thus, it is confirmed that Formulae (21) and (22) for the direction $\theta$ and the magnitude V are effective by using the range where $V_X$ or $V_Y$ shows the linear change as the range for the input device (pointing device) 600. Incidentally, the offset in the Y-axis rotational direction in this simulation is caused because the positional relationship between the light emitting element 621 and the light receiving element 622 in the Y-axis direction is deviated from the optimal position. The optimal position can be obtained by repeating the simulation.

As described above, the input device (pointing device) is made small by having the structure of the tilt sensor and the movable body housing the tilt sensor. With this structure, the input device can be disposed in a space surrounded by keys of the keyboard, saving the space of the apparatus such as a computer. Also, the input device of Example 6 employs a non-contact optical method and includes no mechanical portion. Accordingly, high reliability and durability can be obtained. Further, since any two-dimensional displacement in all directions can be detected in an analog fashion, the input processing can be easily conducted. Accordingly, a simple program is enough for the input processing, and thus an input device with a low total cost can be provided.

The input device 600 is not always in operation necessarily. Accordingly, the light emitting element 621 may be driven to emit light intermittently. In this case, the output current from the light receiving element 622 may be detected in synchronization with the timing of the emission. This not only reduces the power consumption, but also eliminates an influence of turbulence such as noise, thereby enhancing the reliability of the device.

EXAMPLE 7

A seventh example of the input device according to the present invention will be described with reference to FIGS. 43 to 45B.

Figure 43:
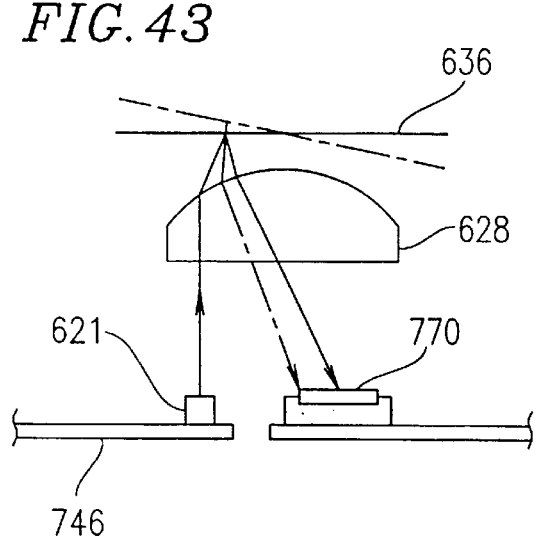
FIG. 43 schematically shows a configuration of a seventh example of the input device according to the present invention.
Figure 44A:
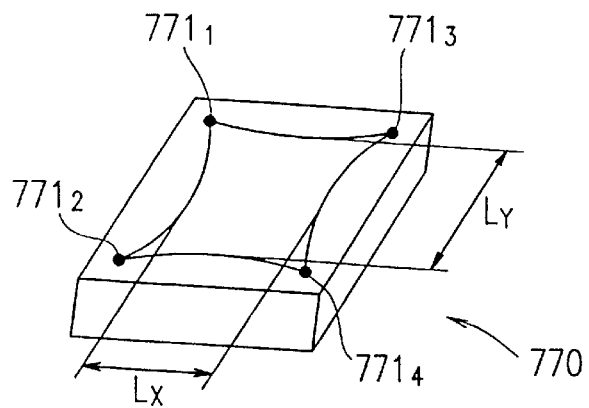
FIGS. 44A and 44B are a perspective view and a sectional view, respectively, of an improved one-side division type PSD according to the present invention.
Figure 44B:
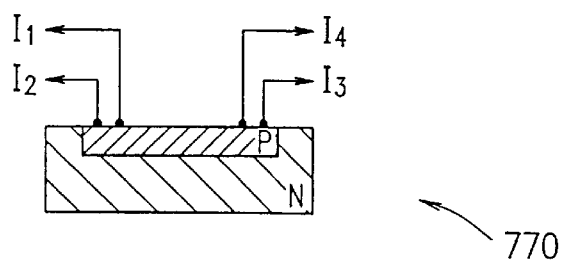

As shown in FIGS. 43, 44A, and 44B, an input device 700 of Example 7 uses a two-dimensional PSD 770 instead of the quartered photodiode used in Example 6. The PSD 770 is of an improved one-side division type and includes an enclosure and a semiconductor layer enclosed therein. The semiconductor layer has a P-N junction for converting light, which is incident on the semiconductor layer through a window formed at the top surface of the enclosure, into electric signals. The enclosure has terminals for outputting the electric signals. Four electrodes $771_1$, $771_2$, $771_3$, and $771_4$ are formed on the top surface as shown in FIG. 44A, and a common electrode is formed on the bottom surface. The other structure of the tilt sensor and the structures of other components are the same as those of Example 6.

Light emitted from a light emitting element 621 and reflected by a reflection surface of a movable body 620 is converged by a lens 628 on the PSD 770. Light incident on the PSD 770 causes charges to be generated at the light incident position P in proportion to the light energy. The charges are then output from the electrodes $771_1$, $771_2$, $771_3$, and $771_4$ as currents. The light incident position can be determined based on the output currents from the electrodes $771_1$, $771_2$, $771_3$, and $771_4$.

Figure 45A:
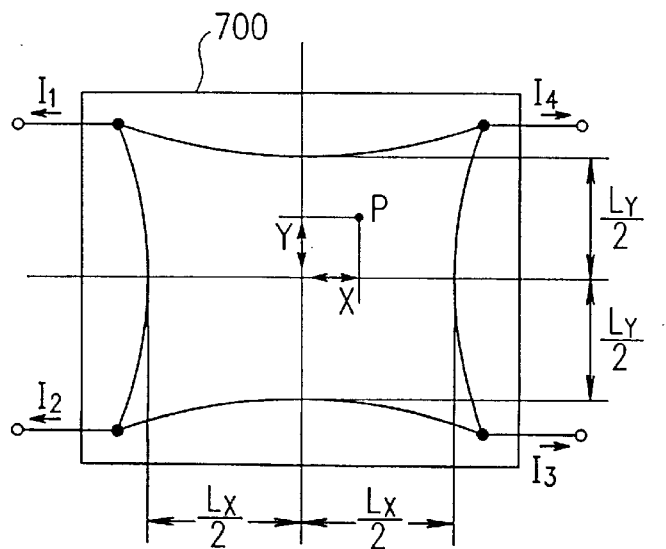
FIGS. 45A and 45B are a view for explaining the positional detection method of the improved one-side division type PSD, and a view showing a vector of the X-axis and Y-axis direction outputs, respectively.

Referring to FIG. 45A, the relationships between the position P of the light spot formed on the PSD 770 and the currents obtained from the electrodes $771_1$, $771_2$, $771_3$, and $771_4$ are expressed by:

$$I_1+I_2=I_0(\tfrac{1}{2}-X/L_X) \quad (23)$$

$$I_3+I_4=I_0(\tfrac{1}{2}+X/L_X) \quad (24)$$

$$I_2+I_3=I_0(\tfrac{1}{2}-Y/L_Y) \quad (25)$$

$$I_1+I_4=I_0(\tfrac{1}{2}+Y/L_Y) \quad (26)$$

where $I_0$ is the total current ($I_0=I_1+I_2+I_3+I_4$), $I_1$ is the current at the electrode $771_1$, $I_2$ is the current at the electrode $771_2$, $I_3$ is the current at the electrode $771_3$, $I_4$ is the current at the electrode $771_4$, $L_X$ is the length of the light receiving surface in the X-axis direction, $L_Y$ is the length of the light receiving surface in the Y-axis direction, X is the X coordinate of the light incident position when the origin of the coordinate is the center of the light receiving surface, and Y is the Y coordinate of the light incident position when the origin of the coordinate is at the center of the light receiving surface.

Then, the incident position in the X-axis direction is expressed by:

$$(I_1+I_2)/(I_1+I_2+I_3+I_4)=\tfrac{1}{2}-X/L_X \quad (27)$$

or $$\{(I_3+I_4)-(I_1+I_2)\}/(I_1+I_2+I_3+I_4)=2X/L_X \quad (28)$$

The incident position in the Y-axis direction is expressed by:

$$(I_2+I_3)/(I_1+I_2+I_3+I_4)=\tfrac{1}{2}Y/L_Y \quad (29)$$

or $$\{(I_1+I_4)-(I_2+I_3)\}/(I_1+I_2+I_3+I_4)=2Y/L_Y \quad (30)$$

Figure 45B:
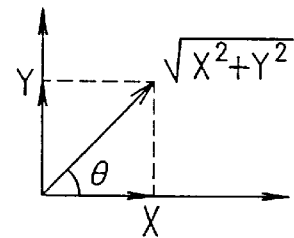

As described above, the vector in the X-axis and Y-axis directions can be obtained, and the magnitude $\sqrt{(X^2+Y^2)}$ and the direction θ can be obtained as shown in FIG. 45B. Accordingly, the PSD 770 is also effective for the shift control of a cursor, and thus the same functions and effects as those of Example 6 are obtained.

EXAMPLE 8

An eighth example of the input device according to the present invention will be described with reference to FIGS. 46A to 49C.

Figure 46A:
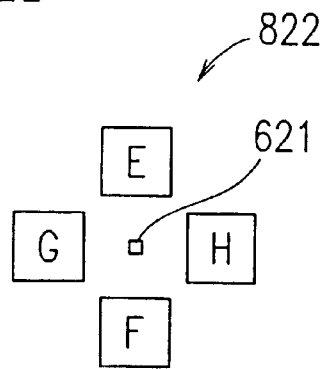
FIGS. 46A and 46B show an arrangement of a light receiving element and optical paths, respectively, of an eighth example of the input device according to the present invention.
Figure 46B:
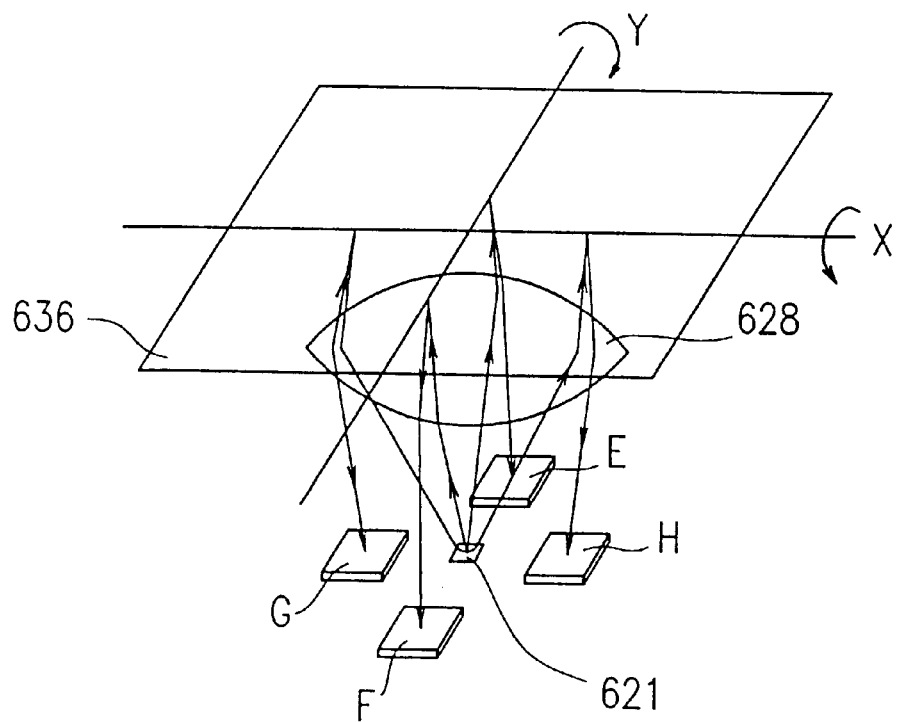

In Example 8, as shown in FIGS. 46A and 46B, four photodiodes E, F, G, and H are used as light receiving elements 822 and disposed along the X axis and the Y axis with respect to an LED as a light emitting element 621 so as to surround the light emitting element 621. The light emitting elements 621 and the photodiodes E, F, G, and H are covered with a holder (not shown), and each has a lead terminal, and is embedded in a mold of a translucent resin. The light emitting element 621 is optically isolated from the photodiodes E, F, G, and H so that light is not directly incident on the photodiodes. A lens 628 is disposed above the holder. Thus, a tilt sensor is completed.

Figure 47:
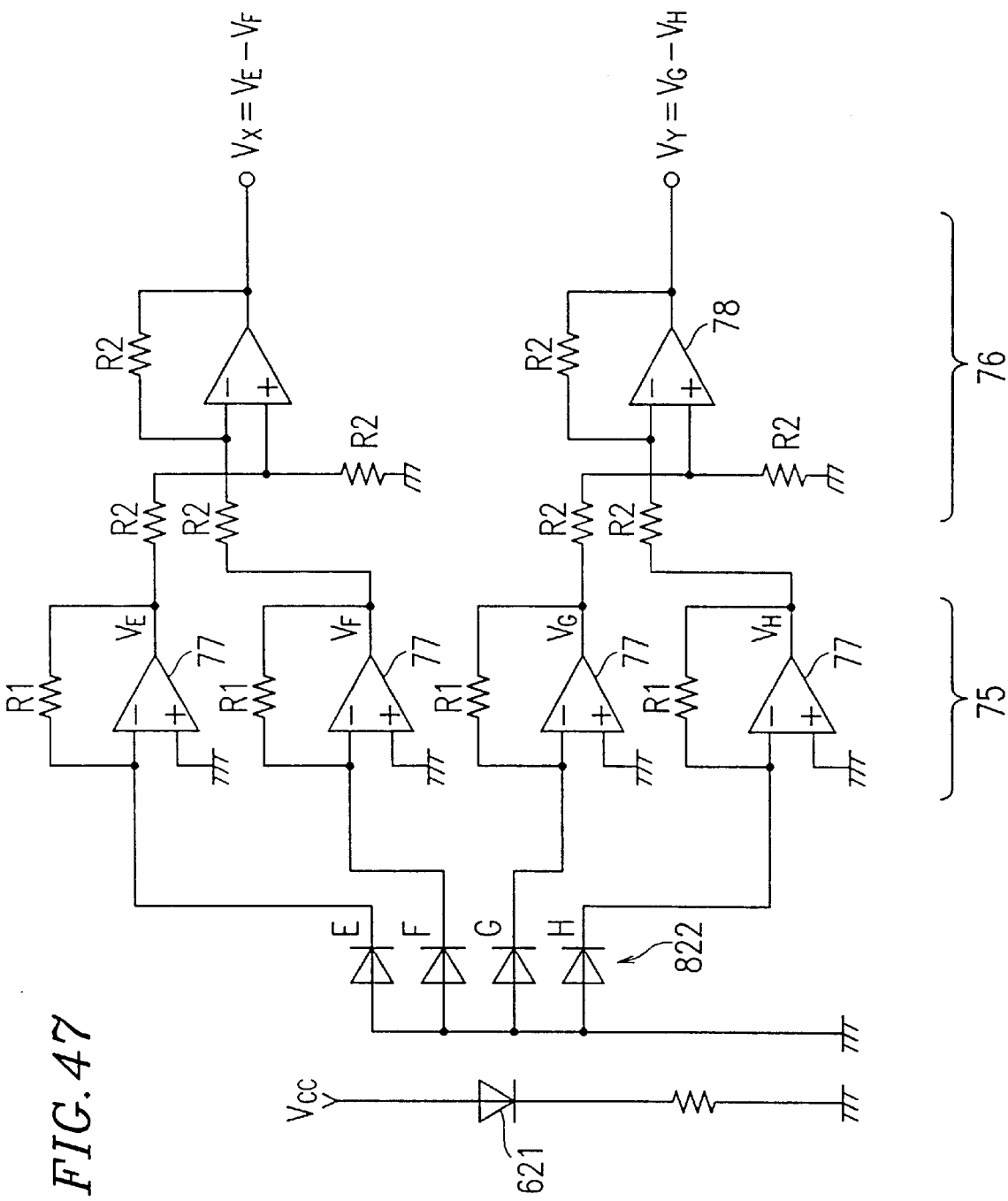
FIG. 47 shows a configuration of a signal processing circuit according to the present invention.

The other components of the input device of Example 8 are the same as those of Example 6, except for the analog signal processing circuit. Referring to FIG. 47, the analog signal processing circuit of this example includes a voltage conversion section 75 for converting output currents from the photodiodes E, F, G, and H into voltages and a subtraction section 76 for calculating the X-axis direction output and the Y-axis direction output by calculating the differences between the photodiodes E and F and between the photodiodes G and H. The voltage conversion section 75 includes an operational amplifier 77 and a resistor R1 for each of the photodiodes E, F, G, and H. The subtraction section 876 includes two operational amplifiers 78 and resistors R2.

The operation of the input device with the above configuration will now be described. When a top portion 635 of a movable body 620 is tilted in a two-dimensional direction with a finger, a movable section 626 of the movable body 620 is displaced. As a result, light images formed on the photodiodes E, F, G, and H before and after the displacement of the movable section 626 are located at different positions. In other words, the displacement of a reflection surface caused by the displacement of the movable section 626 is represented by the rotations around an axis along which the light emitting element 621 and the light receiving elements 822 are in line, i.e., the X axis, and the Y axis perpendicular to the X axis.

For example, the light images on the photodiodes E, F, G, and H move in the Y-axis direction by the rotation around the X axis shown in FIG. 48A. Likewise, the light images on the photodiodes E, F, G, and H move in the X-axis direction by the rotation around the Y axis shown in FIG. 48B. The output currents from the photodiodes E, F, G, and H vary depending on the position of the light image. For the X-axis direction, the vector of output $V_X=V_E-V_F$ is obtained from the difference between the voltage based on the output currents of the photodiodes E and F. For the Y-axis direction, the vector of output $V_Y=V_G-V_H$ is obtained from the difference between the voltage based on the output currents of the photodiodes G and H.

Figure 49A:
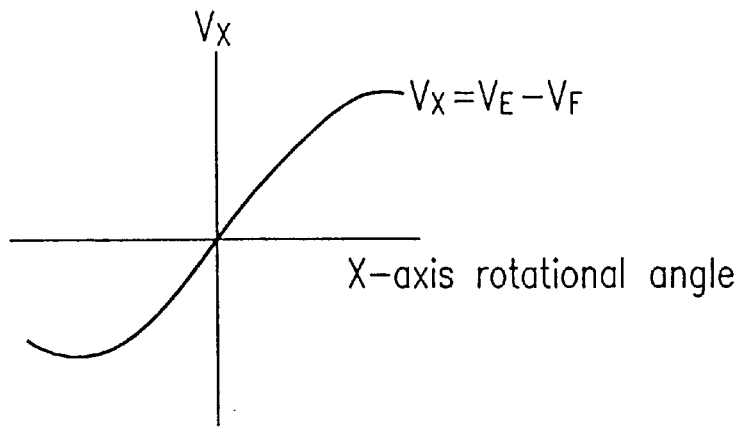
FIGS. 49A, 49B, and 49C show the relationship between the X-axis direction output and the rotational angle, the relationship between the Y-axis direction output and the rotational angle, and a vector of the X-axis and Y-axis direction outputs, respectively.
Figure 49B:
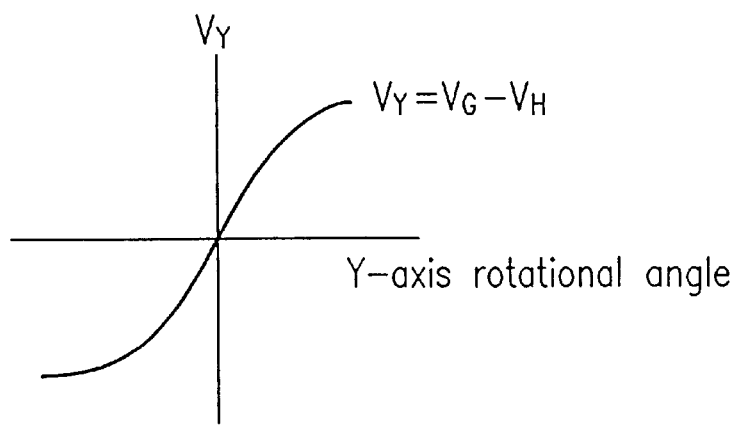
Figure 49C:
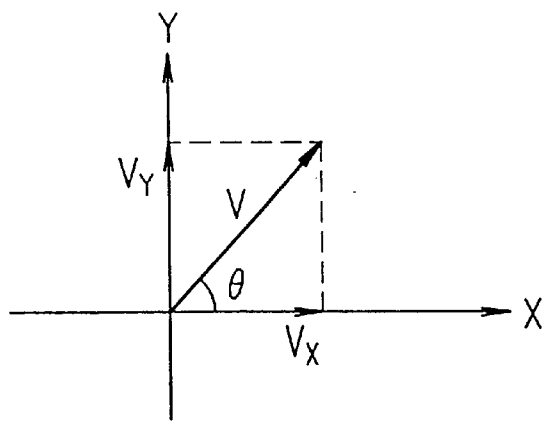

The relationship between the rotational angle around the X axis and $V_X$ is represented by an S-shaped curve having a linear portion where $V_X$ changes linearly with respect to the rotational angle, as shown in FIG. 49 A. Likewise, the relationship between the rotational angle around the Y axis and $V_Y$ is represented by a S-shaped curve having a linear portion where $V_Y$ changes linearly with respect to the rotational angle, as shown in FIG. 49B. Accordingly, $V_X$ is uniquely determined with respect to the rotational angle around the X axis within the linear portion of $V_X$, while $V_Y$ is uniquely determined with respect to the rotational angle around the Y axis within the linear portion of $V_Y$. Once the outputs $V_X$ and $V_Y$ are obtained by the analog signal processing circuit, a digital signal processing circuit 655 (see FIG. 33) calculates a direction θ and a magnitude V of the load applied to the movable body 620 by synthesizing the vectors in the two directions, as shown in FIG. 49C. Thus, since the direction θ and the magnitude V can be obtained as described above, the shift direction and speed of a cursor 651 can be determined based on the values of θ and V, so as to shift the cursor 651 on a display 650 in a desired position by a desired length. Accordingly, the same functions and effects as those of Example 6 can be obtained.

EXAMPLE 9

In Examples 6 to 8, the tilt sensor is composed of the light emitting element, the light receiving element(s), and the lens. Since an LED is used as the light emitting element and light emitted by the LED diverges, the lens is required to converge the light. This increases the number of components. An input device 900 of Example 9 uses a tilt sensor with a simple structure having no lens. As shown in FIG. 50, a hologram lens 980 is formed on the bottom surface of a top portion of a movable section 626 of a movable body 620.

Other structures are the same as those of Example 6, and the same functions and effects are obtained.

The hologram lens 980 serves as both the reflection plate and the lens. Light emitted from an LED as a light emitting element 621 diverges and reaches the hologram lens 980. After being reflected by the hologram lens 980, the light is then converged toward a light receiving element 622 so as to be incident on the light receiving element 622. Thus, a lens can be omitted from the input device 900. Accordingly, the tilt sensor can be made smaller, and thus, the input device itself can be made smaller.

FIG. 51 shows an input device 900a where a laser diode 981 is used as the light emitting element in place of the LED. The laser diode converges light, not diverges, so that no lens is necessary. The only requirement is the formation of a reflection surface 636 on the movable body 620. Thus, the structure of the input device can be further simplified. The remaining structures of the input device 900 a are the same as those of Example 6, and the same functions and effects can be obtained.

Example 10

A tenth example of the input device according to the present invention will be described with reference to FIGS. 52 to 54.

Figure 52:
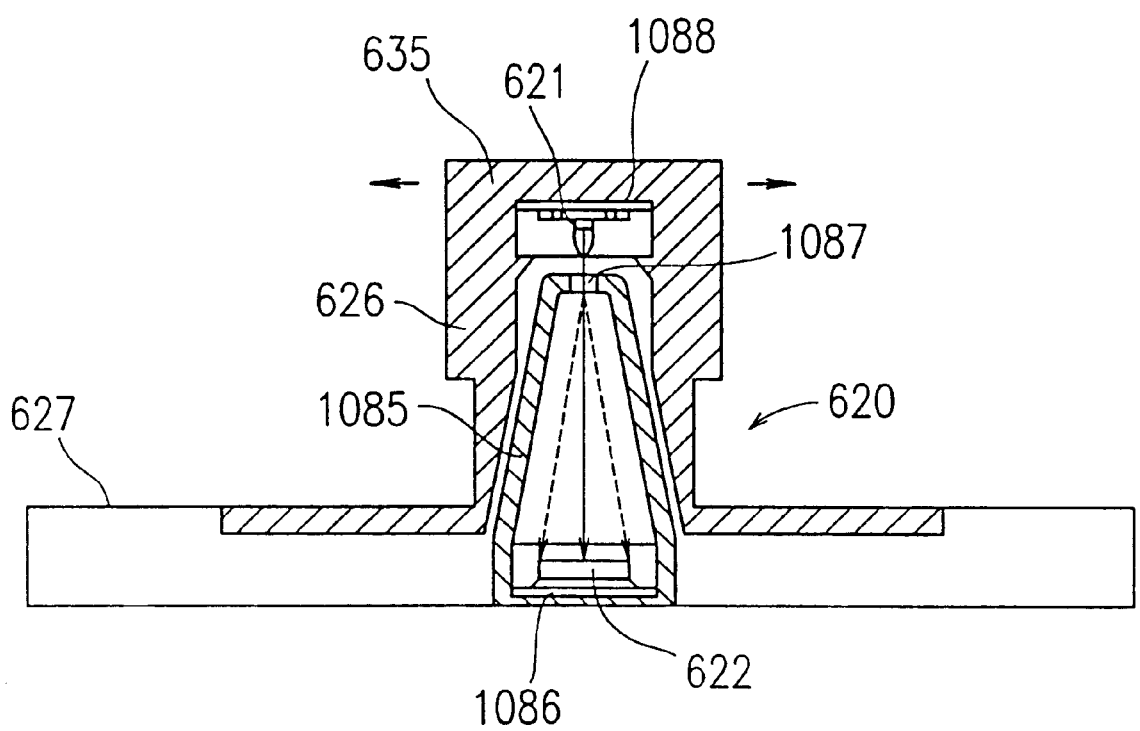
FIG. 52 is a schematic sectional view of a tenth example of the input device according to the present invention.

In Example 10, as shown in FIG. 52, a light emitting element 621 is disposed in a movable section 626 of a movable body 620, while a light receiving element 622 is disposed so as to face the light emitting element 621. The light receiving element 622 is mounted on a substrate 1086 and covered with a holder 1085 molded with a light-shading resin. The substrate 1086 is attached to the inner bottom surface of the holder 1085. The holder 1085 is secured to a fixing section 627, and has a circular pinhole 1087 at the top surface thereof for allowing light to pass therethrough. The light emitting element 621 is mounted on a substrate 1088 secured to the bottom surface of a top portion 635 of the movable section 626 located above the holder 1085. Accordingly, as the movable section 626 is displaced, the light emitting element 621 is displaced. In Example 10, an LED is used as the light emitting element 621, and a quartered photodiode is used as the light receiving element 622. The structure of the movable body 620 is the same as that of Example 6.

Figure 53A:
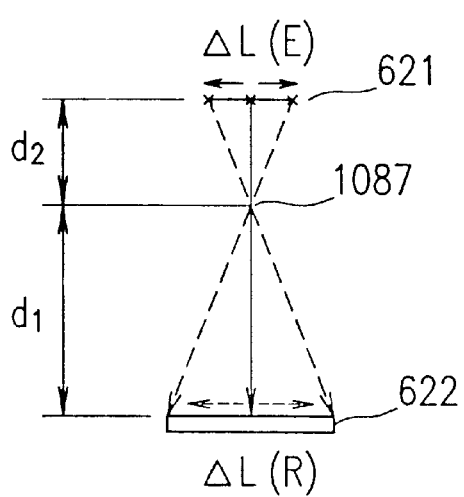
FIGS. 53A and 53B are a view for explaining the detection principle and a view showing the displacement of a light image on a light receiving element, respectively.
Figure 53B:
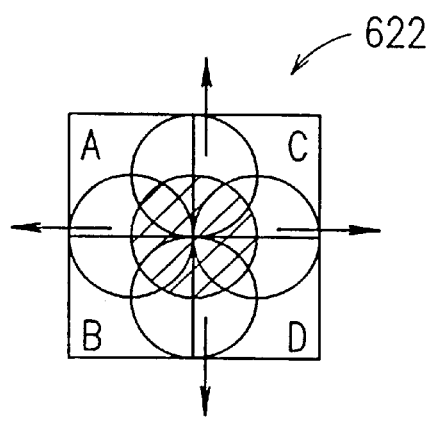

With the above structure, light emitted from the light emitting element 621 passes through the pinhole 1087 to reach the light receiving element 622. As shown in FIG. 53A, the light emitting element 621 is displaced in association with the displacement of the movable section 626, with the same amount of displacement as that of the latter. Thus, as shown in FIG. 53B, the light image of the light emitting element 621 moves on the light receiving element 622. At this time, the direction of the displacement of the movable section 626 and the direction of the displacement of the light image are the opposite to each other, i.e., different by 180°. The displacement of the light image is adjustable by changing the positional relationship among the light emitting element 621, the light receiving element 622, and the pinhole 1087. The displacement amount ΔL(R) of the light image on the light receiving element 622 is expressed by:

$$\Delta L(R) = \Delta L(E) \times d_1 / d_2 \qquad (31)$$

where ΔL(E) is the displacement amount of the light emitting element 621, $d_1$ is the distance between the top surface of the holder 1085 and the light receiving element 622, and $d_2$ is the distance between the top surface of the holder 1085 and the light emitting element 621.

Thus, the output currents of quartered portions A, B, C, and D of the photodiode corresponding to the displacement of the movable section 626 can be obtained. Thereafter, according to the signal processing method described in Example 7, the vectors of the X-axis direction output and the Y-axis direction output are calculated, and the direction and amount of operation of the movable body 620 are calculated, so as to control the shift of a cursor 651. The above structure eliminates the necessity of arranging the light emitting element 621 and the light receiving element 622 in line. In other words, since only a space for either one of the light emitting element 621 and the light receiving element 622 is enough, the movable body 620 can be made slim, and thus the input device (pointing device) can be made smaller.

Figure 54:
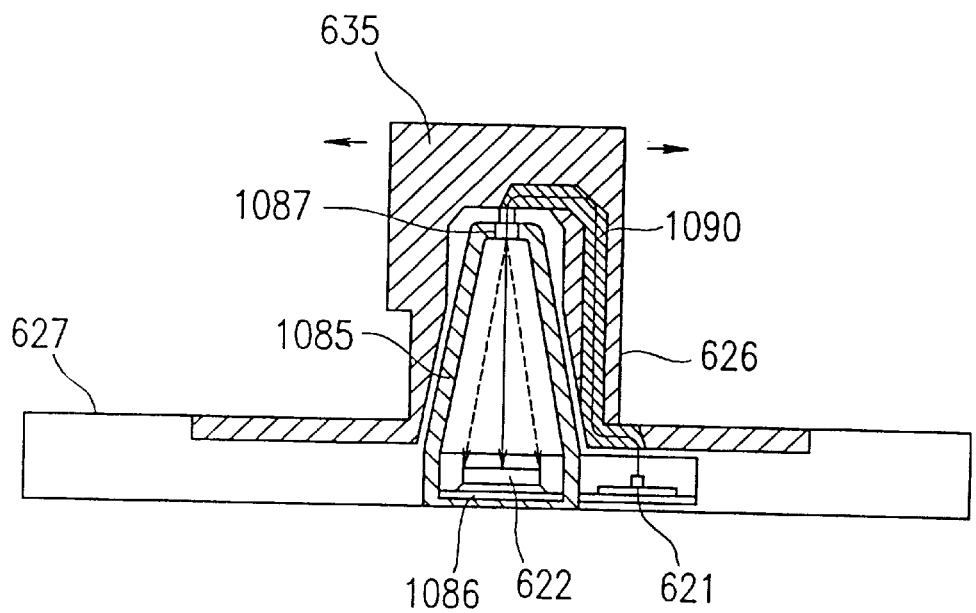
FIG. 54 is a schematic sectional view of an input device where a light emitting element and a light receiving element face each other according to the present invention.

Instead of disposing the light emitting element 621 in the movable section 626, as shown in FIG. 54, the light emitting element 621 may be disposed in the fixing section 627 and an optical guide 1090 for guiding light from the light emitting element 621 to the top portion 635 of the movable section 626 may be disposed in the movable section 626. The optical guide 1090 can be formed by embedding an optical fiber made of a synthetic resin in the movable section 626 at the time of the molding of the movable section 626, or by forming a portion made of a translucent resin integrally with the movable section 626 by molding. In these alternative cases, the height, as well as the width, of the movable body 620 can be made smaller. Thus, a small-size input device (pointing device) can be provided.

EXAMPLE 11

Figure 55:
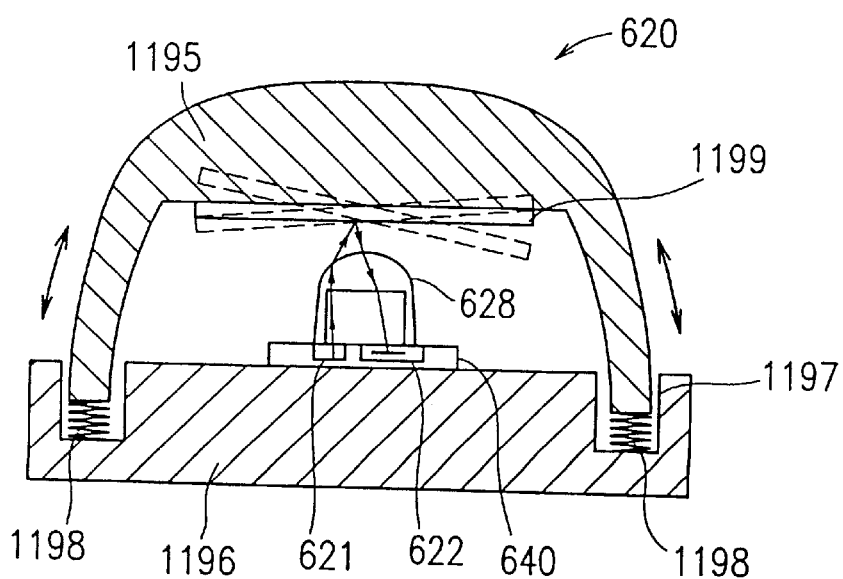
FIG. 55 is a schematic sectional view of an eleventh example of the input device according to the present invention.
Figure 56:
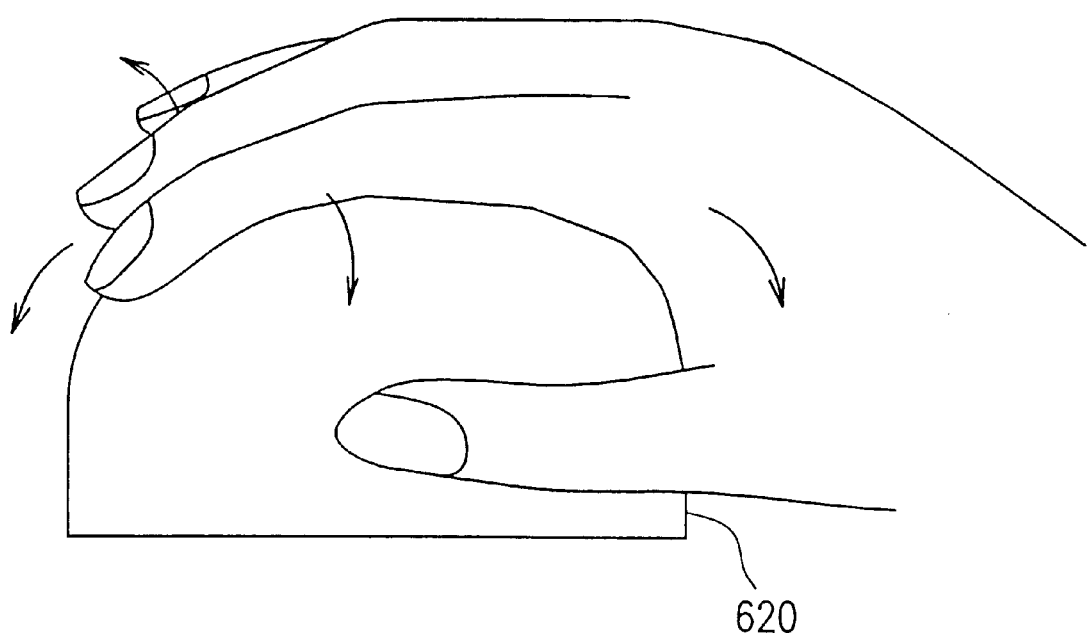
FIG. 56 shows the operation of the input device according to the present invention.

An eleventh example of the input device according to the present invention will be described with reference to FIGS. 55 and 56.

In Example 11, a movable body 620 is not attached to a main body of an apparatus 623 such as the computer. The movable body 620 includes a dome-shaped movable section 1195 and a fixing section 1196 which elastically supports the movable section 1195 so that the movable section 1195 can tilt upon the operation by the user. The movable body 620 which has a size of a palm and a mouse-like shape is connected to the apparatus 623 such as a computer via a connector. A tilt sensor composed of a light emitting element 621, a light receiving element 622, and a lens 628 formed integrally is mounted on the center of the top surface of the fixing section 1196. The movable section 1195 is disposed to cover the tilt sensor. The movable section 1195 has a shape of an inverted cup, the bottom edge of which is inserted in a groove 1197 formed at the periphery of the top surface of the fixing section 1196. An elastic material 1198 such as a spring and a rubber is placed between the movable section 1195 and the fixing section 1196 so that the movable section 1195 can be tilted. The surface of the movable section 1195 facing the tilt sensor is flat and surface-finished so as to form a reflection surface 1199. The structure of the tilt sensor and the input processing method are the same as those described in Example 6. The shape of the movable section is not limited to the mouse-like shape, but a polygonal shape with a size of a palm can also be used.

The movable body 620 with the above structure is thus placed on an arbitrary position. The user holds the movable section 1195 with the palm of his or her hand in contact with the movable section 1195. By moving the palm forward, backward, rightward, and leftward in a two-dimensional direction, the movable section 1195 tilts, and thus the reflection surface 1199 tilts, which makes it possible for the tilt sensor-to detect the displacement of the movable section 1195. Thus, since the movable body 620 can be operated with the palm of the user's hand, the same operability as that of the mouse can be provided. In this example, unlike the conventional mouse, it is not necessary to move the movable body 620 on a plane. Instead, the movable body 20 can be operated at a position where it is placed without moving. This reduces the space required for the movable body 620, and thus makes it possible to pursue the usability without having an influence of the conditions of the place where the movable body 620 is placed. Further, unlike the mouse, the movable body 620 does not have a mechanical operation portion. Thus, the movable body 620 of this example is superior in the cost and reliability to the conventional pointing devices such as the mouse.

The input devices of Examples 6 to 11 can be modified and changed within the scope of the present invention. For example, in the above examples, the movable section 626 and the fixing section 627 of the movable body 620 are molded with different materials. However, it is possible to mold the movable section 626 and the fixing section 627 with the same material satisfying the conditions of the hardness and the elastic modulus both for the rigid portion and the elastic portion. This reduces the material cost. Alternatively, the fixing section 627 may be an elastic portion, while the movable section 626 may be a rigid portion. In order to displace the movable section 620, only the portion of the movable section 626 which stands from the fixing section 627 is required to be elastic. Accordingly, only this portion may be made of an elastic resin. In Example 10, the positions of the light emitting element 621 and the light receiving element 622 may be in reverse.

The input device (pointing device) may also be placed somewhere other than on the keyboard as in the above examples, and used as a substitute of a joystick or a mouse of a computer game machine or for a navigation system requiring switching and directional instruction. It is also possible to use the input device for the communications with the computer body via a connector as in the case of the mouse.

As is apparent from the above description, the input device of the present invention can be made smaller by forming the movable section and the detector integrally. Such a small device can be placed in a space between keys of the keyboard. This reduces a space required for the apparatus such as a computer. By employing the non-contact optical method not requiring a mechanical operation portion, an input device with uniform detection precision and high reliability can be provided. Also, an input device where the input processing is easy and the total cost is small can be realized.

Either the movable section or the fixing section is made rigid while the other section is made elastic by using the same or different materials. It is ensured, therefore, that the movable body is displaced upon a load applied to the movable body so as to effect the input as desired.

The surface of the movable body facing the light receiving element is surface-finished as the reflection surface. Using this reflection surface, light from the light emitting element can be effectively used, increasing the output of the detector and providing sharp images. Thus, the detection characteristics can be improved.

Either the light emitting element or the light receiving element may be disposed on the movable section, while the other is disposed to face the movable section. With this structure, the area where the elements are disposed can be reduced compared with the case where the light emitting element and the light receiving element are arranged in line, allowing for reducing a space required.

The movable body may have a size suitable for the operation with the palm of the user's hand and be placed separately from the apparatus such as the computer. This type of the input device has a good operability because the size is appropriate, and is advantageous in reducing a space required for the apparatus because it is separately disposed. Further, because such an input device is not required to be moved, it can be placed at an arbitrary place, and thus the usability can be enhanced.

Because the optical detection method is employed for detecting the displacement, the processing of output signals in software is easy. Thus, total cost reduction is realized.

EXAMPLE 12

A twelfth example of the input device will be described with reference to FIGS. 57 to 83.

Figure 57:
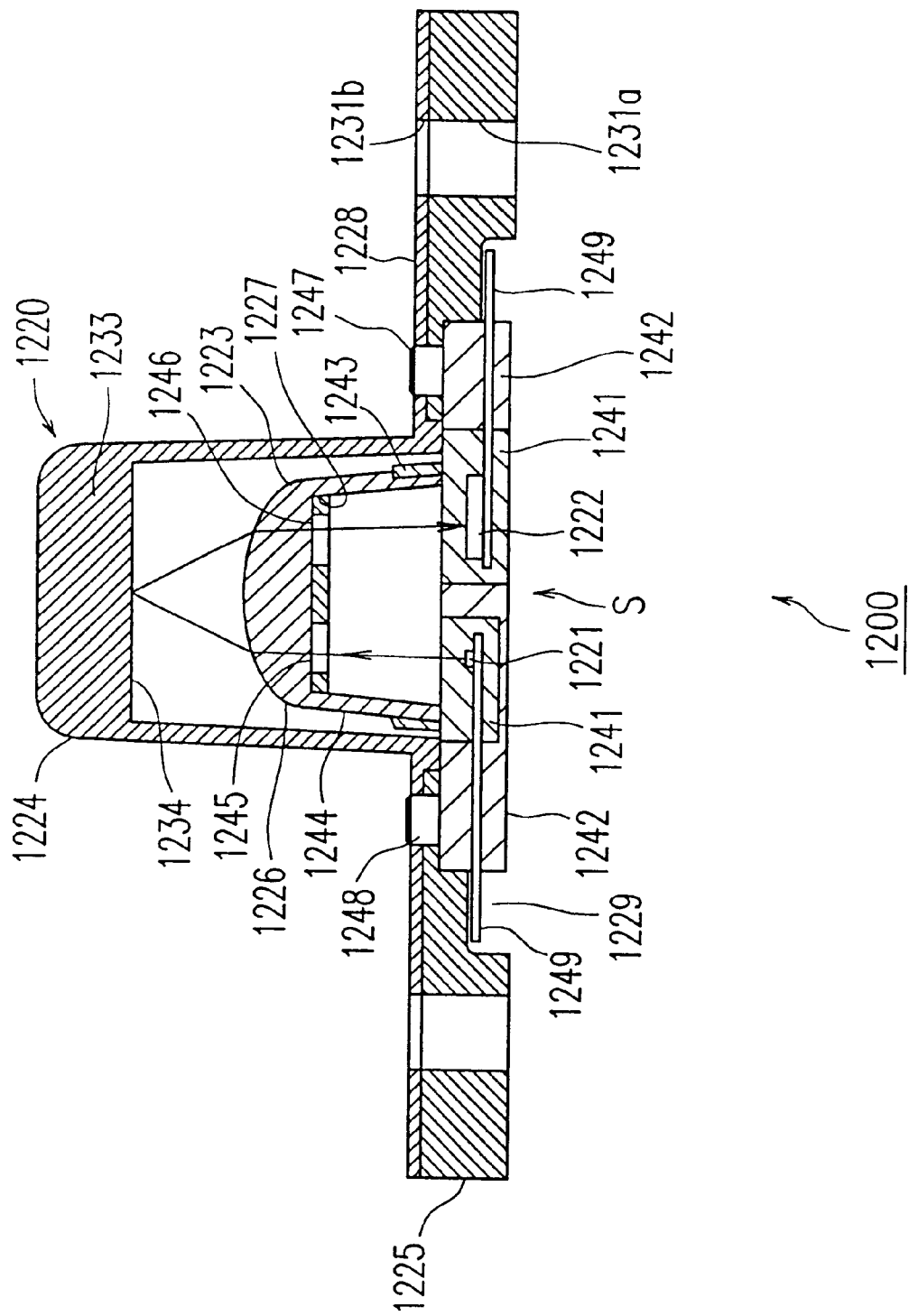
FIG. 57 is a sectional view of a twelfth example of the input device according to the present invention.
Figure 58A:
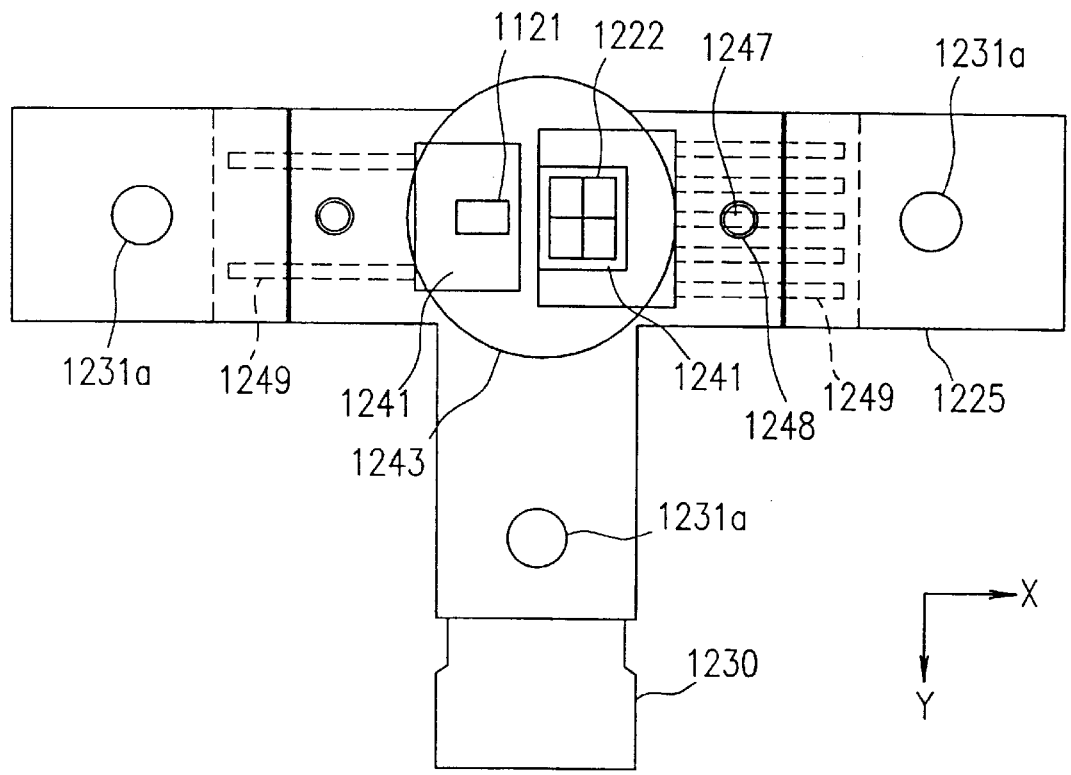
FIGS. 58A and 58B are a top view and a side view of the inside of the input device according to the present invention.

An input device 1200 of Example 12 allows for three-dimensional input operation. Referring to FIG. 57 to 59, the input device 1200 includes a movable body 1220, a light emitting element 1221, a light receiving element 1222, and an optical section 1223. The movable body 1220 is displaced three-dimensionally by receiving a load in a three-dimensional direction. The light receiving element 1222 is optically coupled with the light emitting element 1221 by the optical section 1223 and receives a light image which shifts in association with the displacement of the movable body 1220. The optical section 1223 regulates light emitted from the light emitting element 1221 toward the light receiving element 1222. The input device 1200 is of a convex shape having a T-shaped profile when viewed from above. The sizes are as follows: the maximum length is 25 mm, the maximum width is 15 mm, and the height is 10 mm. The input device 1200 is disposed in a space surrounded by G, H, and B keys of a keyboard for an apparatus such as a personal computer, a wordprocessor, or the like so that it protrudes about 1 mm above the top of the keys.

The movable body 1220 is composed of a movable section 1224 which is displaced by the operation of the user and a fixing section 1225 for fixing the movable section 1224 to the keyboard. The movable section 1224 and the fixing section 1225 are integrally formed. The light emitting element 1221, the light receiving element 1222, and an optical section 1223 are integrally formed as a reflection type optical sensor S, which is mounted on the fixing section 1225 so as to face the movable section 1224. The optical section 1223 includes a converging lens 1226 and a light shader 1227 which regulates the optical path from the light emitting element 1221 and also reflects the light so as to allow only part of the light to pass therethrough.

The movable section 1224 is cylindrical with the top surface closed. Legs 1228 extend in the X-axis opposite directions from the bottom rim of the cylindrical section. The T-shaped fixing section 1225 has a concave portion 1229 at the bottom thereof for receiving the optical sensor S. The legs 1228 of the movable section 1224 attach to the top surface of the X-axis portions of the fixing section 1225. The Y-axis portion of the fixing section 1225 includes a substrate 1230 at the bottom thereof for securing the electrical connection with outside. Through holes 1231*a* and 1231*b* are formed through the fixing section 1225 and the legs 1228 of the movable section 1224, respectively, so as to secure the movable body 1220 to the keyboard by screwing screws 1232 through the through holes 1231*a* and 1231*b*.

Because the movable body 1220 needs to be capable of being displaced in the three-dimensional directions of the X axis, Y axis, and Z axis, the movable section 1224 is molded with an elastic material, while the fixing section 1225 is molded with a rigid material. For the rigid material, thermoplastic materials with a hardness of 98 or more (measured according to the testing method of JIS K6301) and an elastic modulus of 2000 kg/cm$^2$ or more (measured according to the testing method of ASTM D790), for example, PC (polycarbonate), ABS (acrylonitrile-butadiene-styrene), and denatured PPO (poly(phenylene oxide)), are mainly used. For the elastic material, thermoplastic materials with a hardness of 70 to 98 (measured according to the testing method of JIS K6301) and an elastic modulus of 100 to 2000 kg/cm$^2$ (measured according to the testing method of ASTM D790), for example, polyester elastomers, urethane, and rubber resins, are mainly used.

Figure 60B:
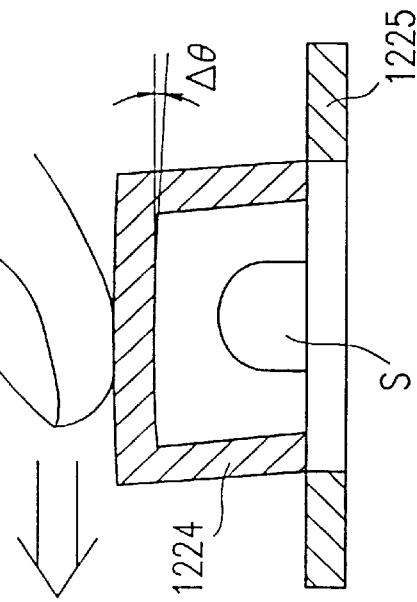
FIGS. 60A, 60B, and 60C show the displacement of a movable body when no load is applied, when load is applied in a two-dimensional direction, and when load is applied in the Z-axis direction, respectively.
Figure 60A:
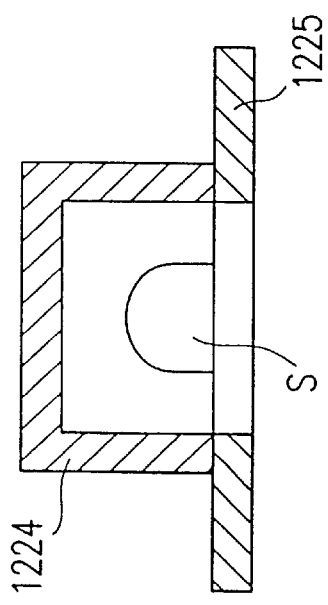
Figure 60C:
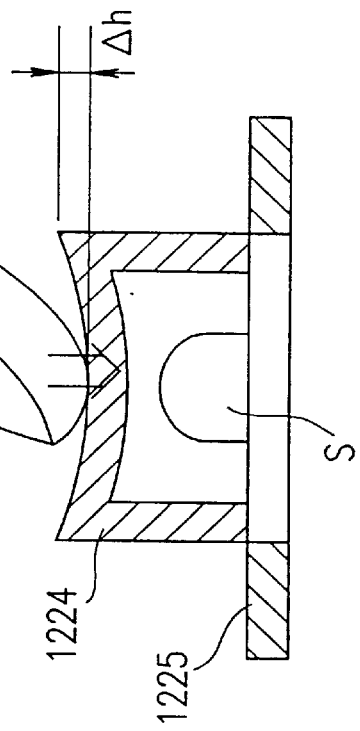

The movable section 1224 and the fixing section 1225 are integrally formed by two-color molding in consideration of the precision and durability. Alternatively, insert molding or fixing with screws or hooks may be used in consideration of difficulties accompanying the molding structure and the total cost. With the above two-layer structure having the elastic and rigid portions, the movable body 1220 can be smoothly displaced when a load is applied thereto in the X-axis and Y-axis directions two-dimensionally and in the Z-axis direction three-dimensionally. This improves the performance of the pointing device allowing for the three-dimensional input. The two-dimensional displacement is represented by the rotations, or tilt, around the X axis and Y axis by Δθ as shown in FIG. 60B. The three-dimensional displacement is represented by the lowering in the Z-axis direction by Ah as shown in FIG. 60C.

The inner bottom surface of a top portion 1233 of the movable section 1224 facing the optical sensor S, which has a diameter of about 5 mm, is used as a reflection surface 1234 for the angular detection by the optical sensor S by use of regular reflection of light. The reflection surface 1234 is made flat and mirror-finished, galvanized, or evaporated. Accordingly, the angle of the reflection surface 1234 changes for the two-dimensional displacement, while the distance between the reflection surface 1234 and the optical sensor S changes for the displacement in the Z-axis direction.

Figure 61:
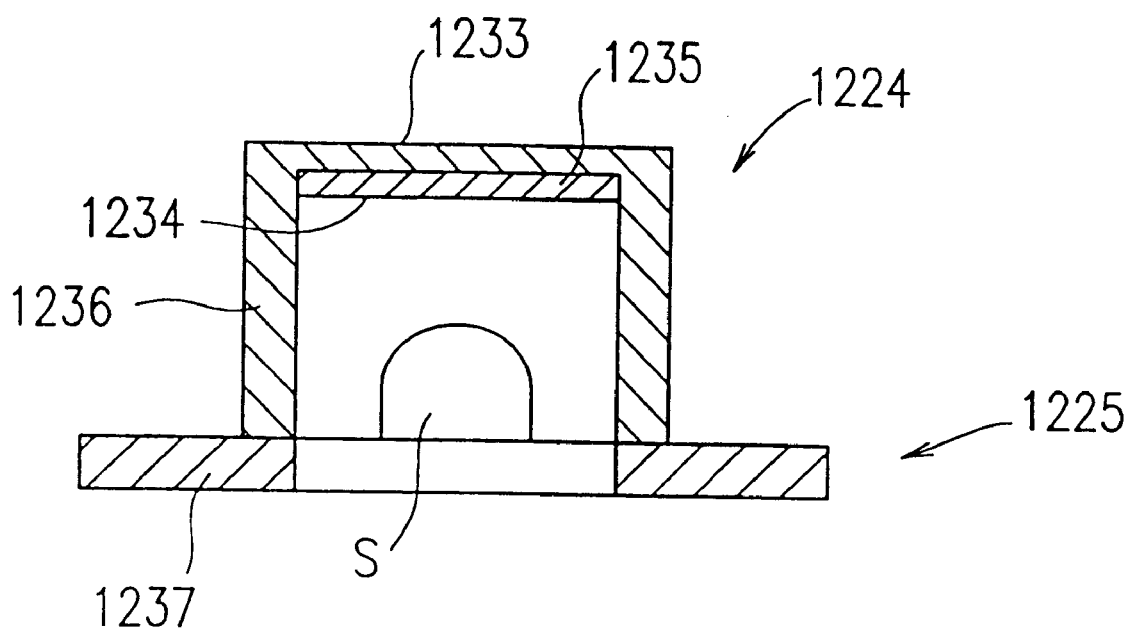
FIG. 61 shows a movable body where the reflection surface is formed of a rigid material according to the present invention.

An alternative example of the reflection surface 1234 is shown in FIG. 61. A flat plate 1235 is formed on the inner bottom surface of the top portion 1233 of the movable section 1224 by two-color molding or insert molding with a resin used for the fixing section 1225 or other rigid resin. The flat plate 1235 is surface-treated so as to obtain the reflection surface 1234. The surface treatment is difficult for a soft surface such as an elastic resin. According to the alternative method, however, the surface treatment can be easily conducted to obtain a high flatness because a rigid resin is used for the flat plate 1235. The flat plate even reinforces the movable section 1224. Furthermore, the reflection surface 1234 which is generally flat may be curved so as to converge light onto the light receiving element 1222 effectively according to the displacement or tilt of the movable portion 1224. Thus, by obtaining the reflection surface 1234 by the surface treatment, light emitted from the light emitting element 1221 can be effectively used, thereby to increase the output of the optical sensor S and to obtain sharp images. As a result, the detection characteristic of the sensor improves.

Figure 62A:
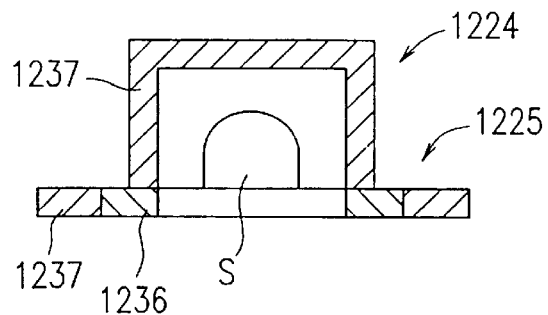
FIGS. 62A to 62E show alternative movable bodies having different elastic structures according to the-present invention.
Figure 62B:
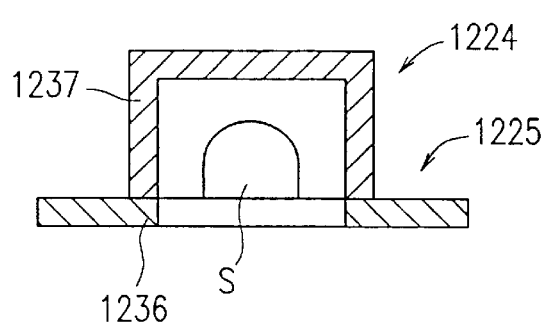
Figure 62C:
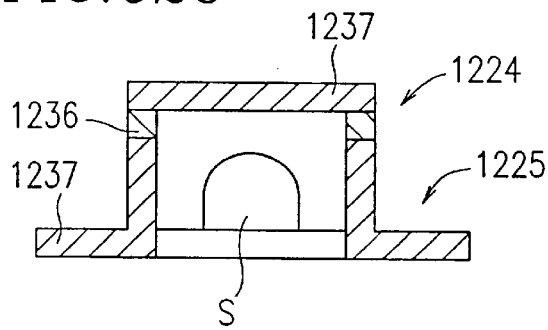
Figure 62D:
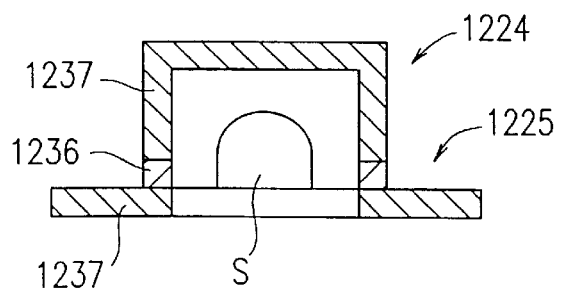
Figure 62E:
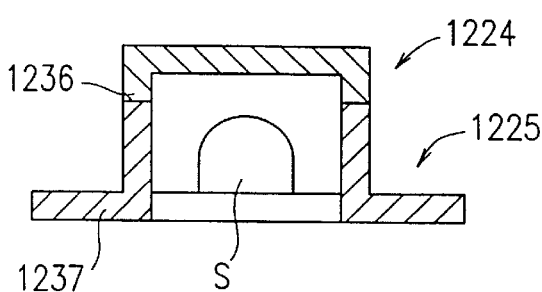

The structure of the movable body 1220 is not limited to that described above, but any structures where part of the movable body 1220 is elastic as shown in FIG. 62A to 62E and 63A to 63D are acceptable as the movable body 1220. In FIGS. 62A to 62E and 63A to 63D, elastic portions 1236 are shown by right-downward oblique lines, while rigid portions 1237 are shown by left-downward oblique lines. In FIG. 62A, the portion of the fixing section 1225 coupling with the movable section 1224 constitutes the elastic portion 1236, while the remaining of the fixing section 1225 and the movable section 1224 constitute the rigid portion 1237. In this case, the entire movable section 1224 is displaced three-dimensionally. In FIG. 62B, the movable section 1224 constitutes the rigid portion 1237, while the fixing section 1225 constitutes the elastic portion 1236. In this case, the entire movable section 1224 is displaced three-dimensionally with a large tilt. In FIG. 62C, part of the upper portion of the movable section 1224 constitutes the elastic portion 1236, while the remaining of the movable section 1224 and the fixing section 1225 constitute the rigid portion 1237. In this case, only the upper portion of the movable section 1224 is displaced by a small amount. In FIG. 62D, part of the lower portion of the movable section 1224 constitutes the elastic portion 1236, while the remaining of the movable section 1224 and the fixing section 1225 constitute the rigid portion 1237. In this case, the upper portion of the movable section 1224 is displaced with a smaller tilt. In FIG. 62E, the upper half of the movable is section 1224 constitutes the elastic section 1236, while the remaining of the movable section 1224 and the fixing section 1225 constitute the rigid portion 1237. In this case, only the upper half of the movable section 1224 is displaced with a smaller tilt.

Figure 63A:
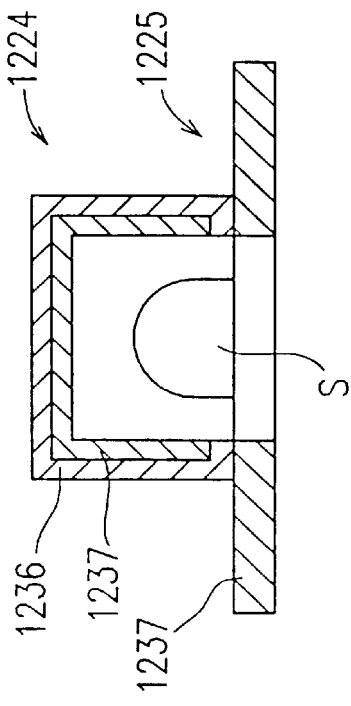
FIGS. 63A to 63D show alternative movable bodies having different elastic structures according to the present invention.
Figure 63B:
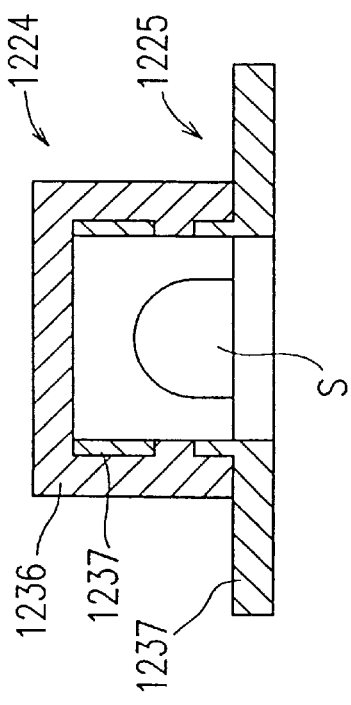
Figure 63C:
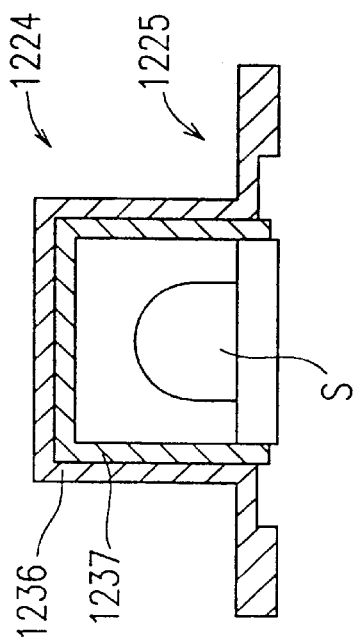
Figure 63D:
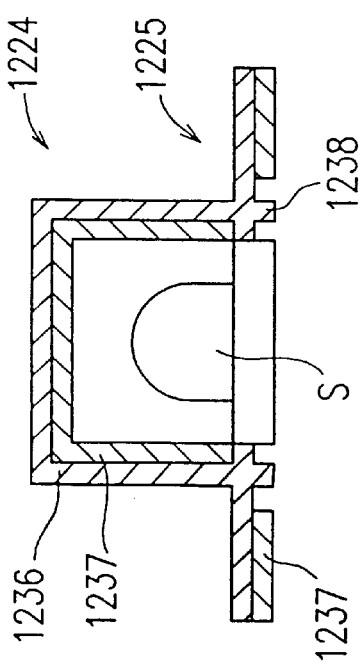

In FIG. 63A, the inner circumference of the movable section 1224 constitutes the rigid portion 1237 except for a portion thereof which constitutes the elastic portion 1236 together with the remaining of the movable section 1224. The fixing section 1225 constitutes the rigid portion 1237. In this case, the movable section 1224 is displaced with a smaller tilt. In FIG. 63B, the inner portion of the movable section 1224 constitutes the rigid portion 1237 except for the bottom portion thereof, which constitutes the elastic portion 1236 together with the remaining of the movable section 1224. The fixing section 1225 constitutes the rigid portion 1237. In this case, the entire movable section 1224 is displaced with a small amount. In FIG. 63C, the inner portion of the movable section 1224 and the bottom ends of the fixing section 1225 constitute the rigid portion 1237, while the remaining of the movable section 1224 and the remaining of the fixing section 1225 integrally constitute the elastic portion 1236. Protrusions 1238 for preventing the falling of the movable section 1224 are formed on the bottom of the fixing section 1225. In this case, the entire movable section 1224 is displaced with a large tilt, though the displacement in the Z-axis direction is small because the protrusions 1238 regulate the displacement. In FIG. 63D, the inner portion of the movable section 1224 constitutes the rigid portion 1237, while the remaining of the movable section 1224 and the fixing section 1225 integrally constitute the elastic portion 1236. The coupling portion of the fixing section 1225 with the movable section 1224 is thinned. In this case, the entire moving section 1224 is displaced with a smaller tilt, though the displacement in the Z-axis direction is large. Thus, the movable bodies shown in FIGS. 63A to 63D not only have an elastic structure, but also have a function of a limiter of the displacement (tilt).

Figure 64:
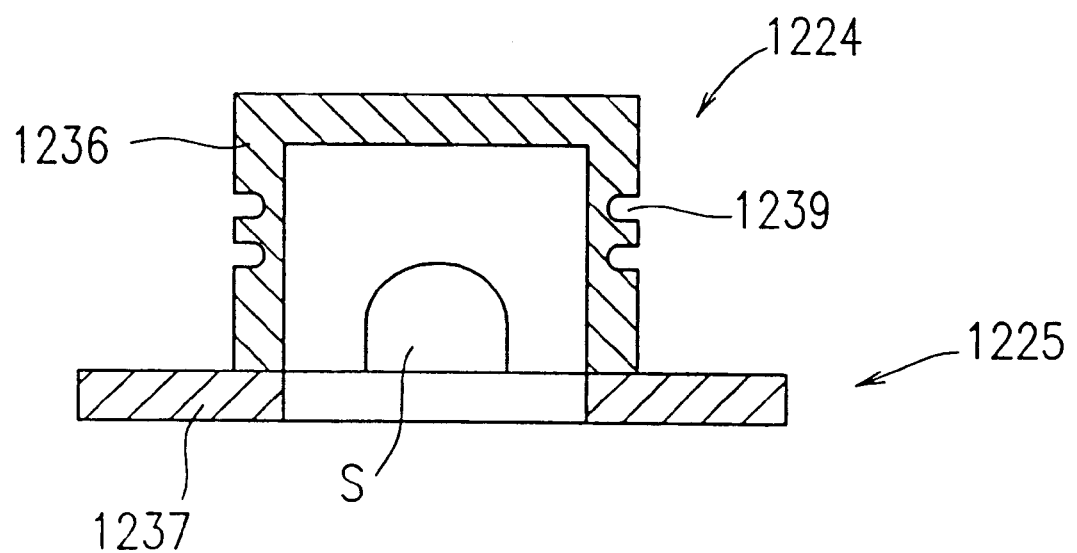
FIG. 64 shows a movable body having an elasticity provided by the shape of the movable section according to the present invention.
Figure 65A:
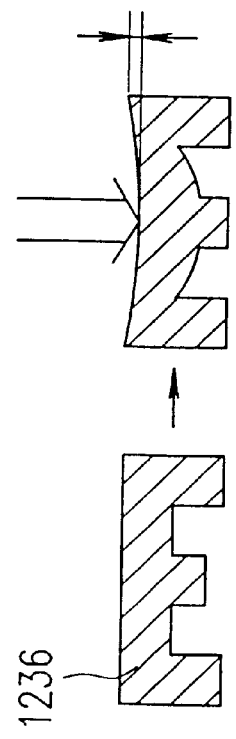
Figure 65D:
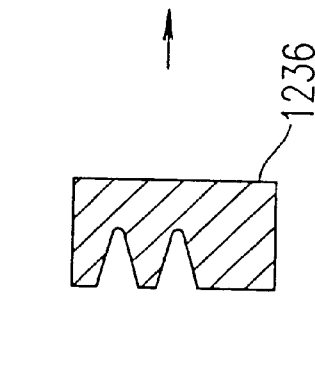
Figure 65A:
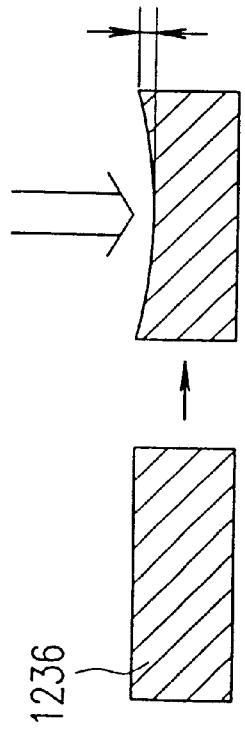
Figure 65B:
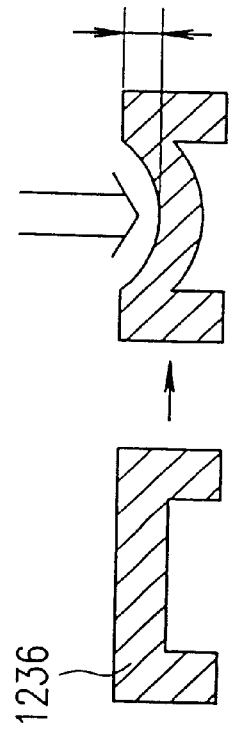
Figure 66:
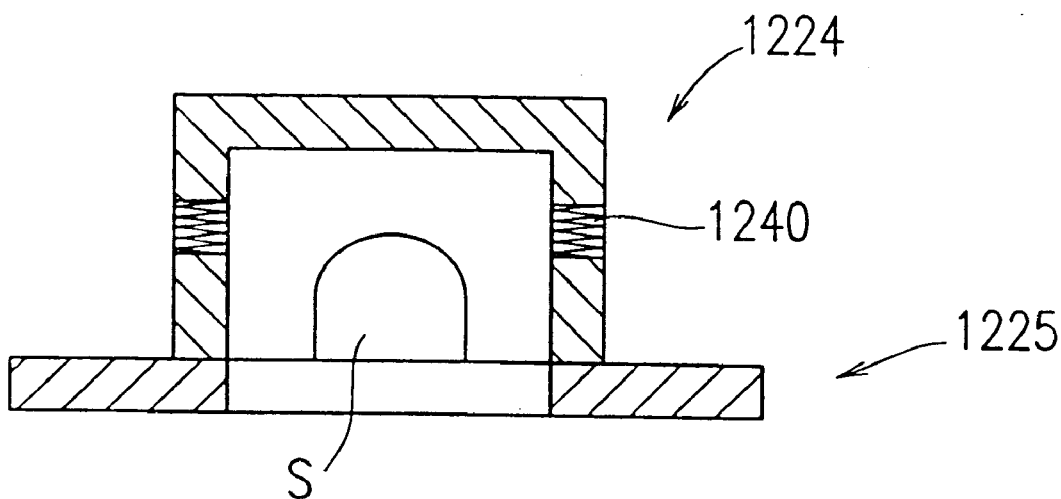
FIG. 66 shows a movable body provided with an elastic structure having a spring according to the present invention.

The elastic structure can be provided not only by the selection of materials of the movable section 1224 and the fixing section 1225, but also by the selection of the shape thereof. For example, as shown in FIG. 64, the movable section 1224 can be displaced largely by forming cuts 1239 around the outer circumference thereof. FIGS. 65A to 65D show examples of sections of the elastic portion 1236 to be formed as a portion of the movable section 1224. FIGS. 65A to 65D show a rectangular shape, an inverted U shape, an inverted U shape having a protrusion at the center, and an inverted E shape, respectively. Further, as shown in FIG. 66, the movable section 1224 may be divided into two portions vertically, and springs 1240 may be disposed therebetween.

Figure 67:
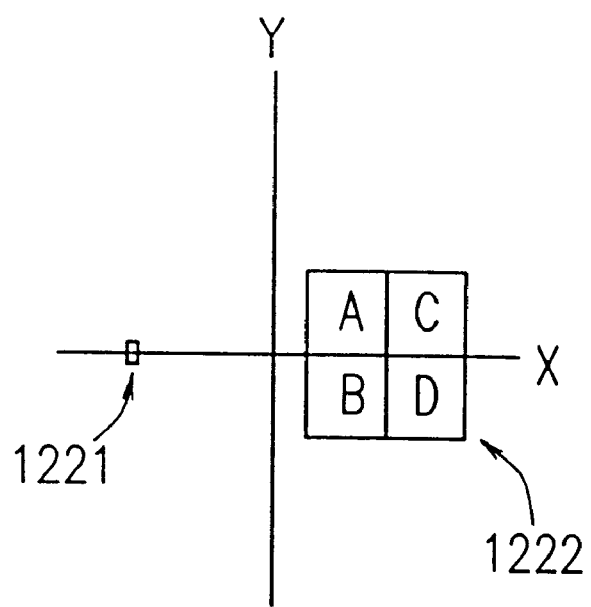
FIG. 67 shows an arrangement of a quartered photodiode according to the present invention.

The optical sensor S is produced in the following manner: A light emitting diode (LED) as the light emitting element 1221 and a multi-divided (quartered) photodiode as the light receiving element 1222 are enclosed with a translucent epoxy resin and the like separately, so as to form primary molded portions 1241. Then, a secondary molded portion 1242 which includes the primary molded portions 1241 is formed using a light-shading epoxy resin and the like. As shown in FIG. 57, the lens 1226 is disposed above the light emitting element 1221 and the light receiving element 1222, and cylindrical support legs 1244 extending from the lens 1226 are movably fitted in a ring-shaped lens frame 1243 formed on the primary molded portions 1241 and the secondary molded portion 1242. Thus, the optical sensor is formed integrally. Quartered portions A, B, C, and D of the photodiode as the light receiving element 1222 are arranged with respect to the X axis and Y axis as shown in FIG. 67.

Figure 68A:
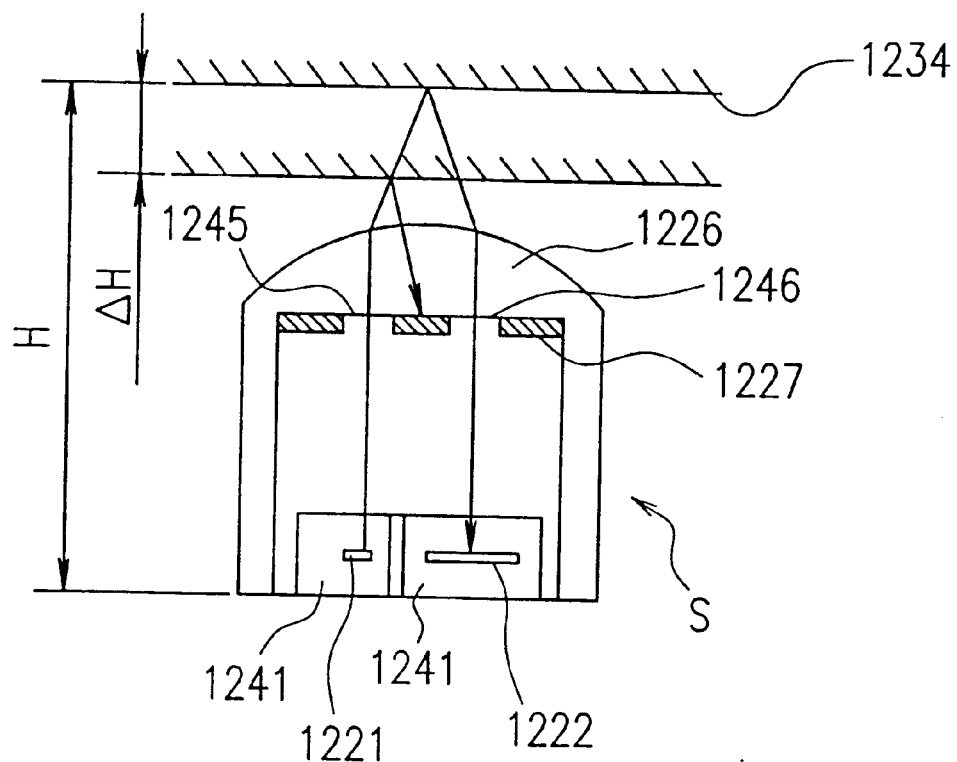
FIGS. 68A and 68B are a view showing a restriction of optical paths by a light shader, and a plan view of the light shader, respectively, according to the present invention.
Figure 68B:
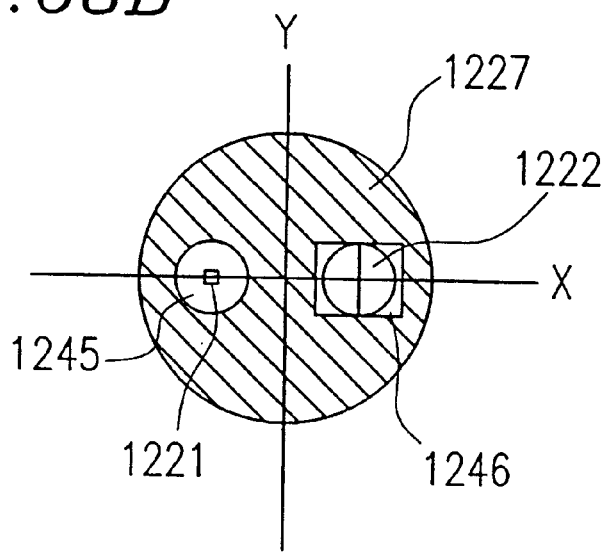

The light shader 1227 (FIGS. 68A and 68B) is obtained by forming a thin film of a light shading material on the bottom surface of the lens 1226 facing the light emitting element 1221 and the light receiving element 1222 by sputtering, evaporation, attachment, or the like, or by forming integrally with the lens 1226 of a light shading resin. As shown in FIGS. 68A and 68B, the light shader 1227 has a circular light emitting window 1245 formed at a position located above the light emitting element 1221 for allowing light from the light emitting element 1221 to pass therethrough, and a square light receiving window 1246 formed at a position located above the light receiving element 1222 for allowing light reflected toward the light receiving element 1222 to pass therethrough. These windows are formed along the X axis to be symmetrical with respect to the center axis of the lens 1226. The light shader 1227 may be disposed on the top surface of the lens 1226, or anywhere between the lens 1226 and the combination of the light emitting element 1221 and the light receiving element 1222. The light shader 1227 is used for the light receiving element 1222 in order to allow only light reflected from the movable section 1224 to be incident on the light receiving element 1222. Thus, the light shader 1227 can be formed only above the light receiving element 1222 and may not necessarily be formed above the light emitting element 1221.

Figure 58B:
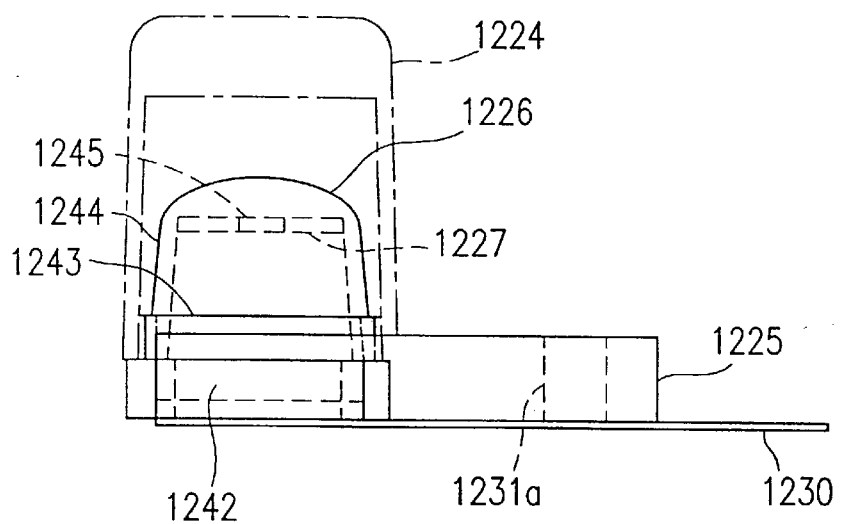
Figure 59:
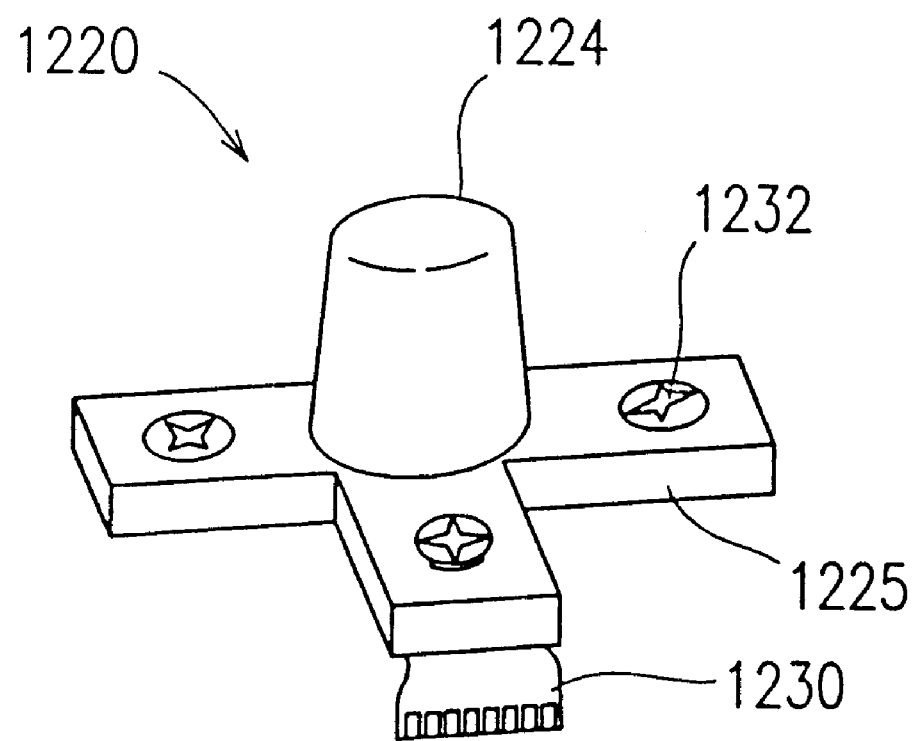
FIG. 59 is a perspective view of the input device according to the present invention.

As shown in FIGS. 57 and 58B, a pair of circular protrusions 1247 are formed on the secondary molded portion 1242. The optical sensor S is mounted on the concave portion 1229 of the fixing section 1225, and the protrusions 1247 are fitted in through holes 1248 formed in the fixing section 1225 and the movable section 1224. In this way, the optical sensor S is secured in the movable body 1220 so as to complete the input device (pointing device) with an integral structure. Leads 1249 of the light emitting element 1221 and the light receiving element 1222 are connected to the substrate 1230 via a flexible printed board and the like.

Figure 69:
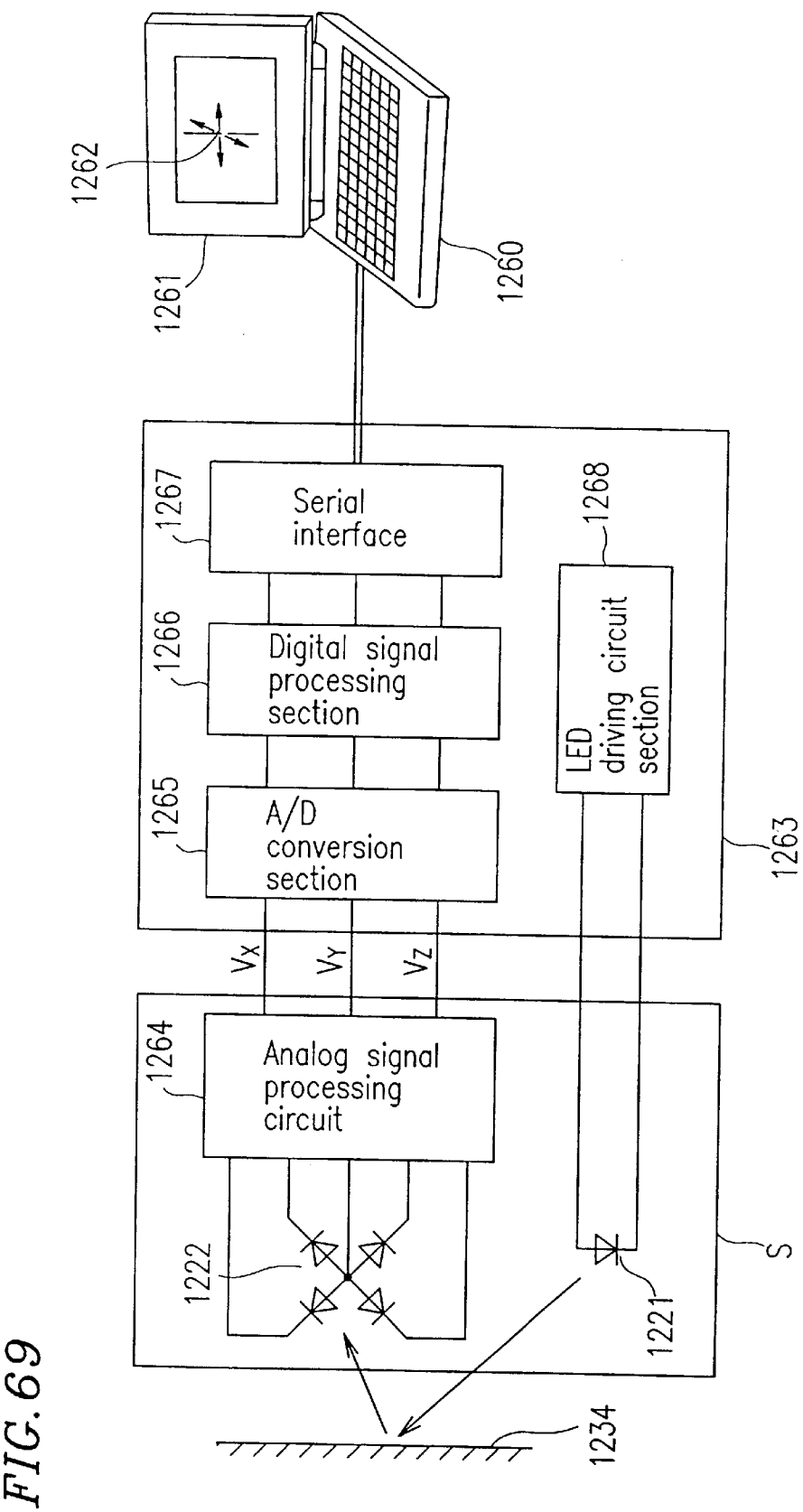
FIG. 69 is a block diagram of the input device according to the present invention.

The input device of this example is provided with a control circuit 1263 as shown in FIG. 69, which detects a displacement of the movable body 1220 operated by the user through the outputs of the light receiving element 1222 and outputs the detected results as information for shifting a cursor 1262 or an icon on a display 1261 of an apparatus 1260 such as a computer. The control circuit 1263 includes a microcomputer or a control IC. The optical sensor S includes an integrally-formed analog signal processing circuit 1264, which conducts signal processing of the output currents from the light receiving element 1222 so as to calculate the X-axis, Y-axis, and Z-axis direction outputs. The control circuit 1263 includes an A/D conversion section 1265, a digital signal processing section 1266, a serial interface 1267, and a driving circuit section 1268 for driving the light emitting element 1221. The A/D conversion section 1265 converts the analog values of the X-axis, Y-axis, and Z-axis direction outputs from the analog signal processing circuit 1264 into digital values. The digital signal processing section 1266 converts the digital signals into signals representing shift information including the shift direction and amount of the cursor. The serial interface 1267 allows the connection with the apparatus 1260 such as a computer.

Figure 70:
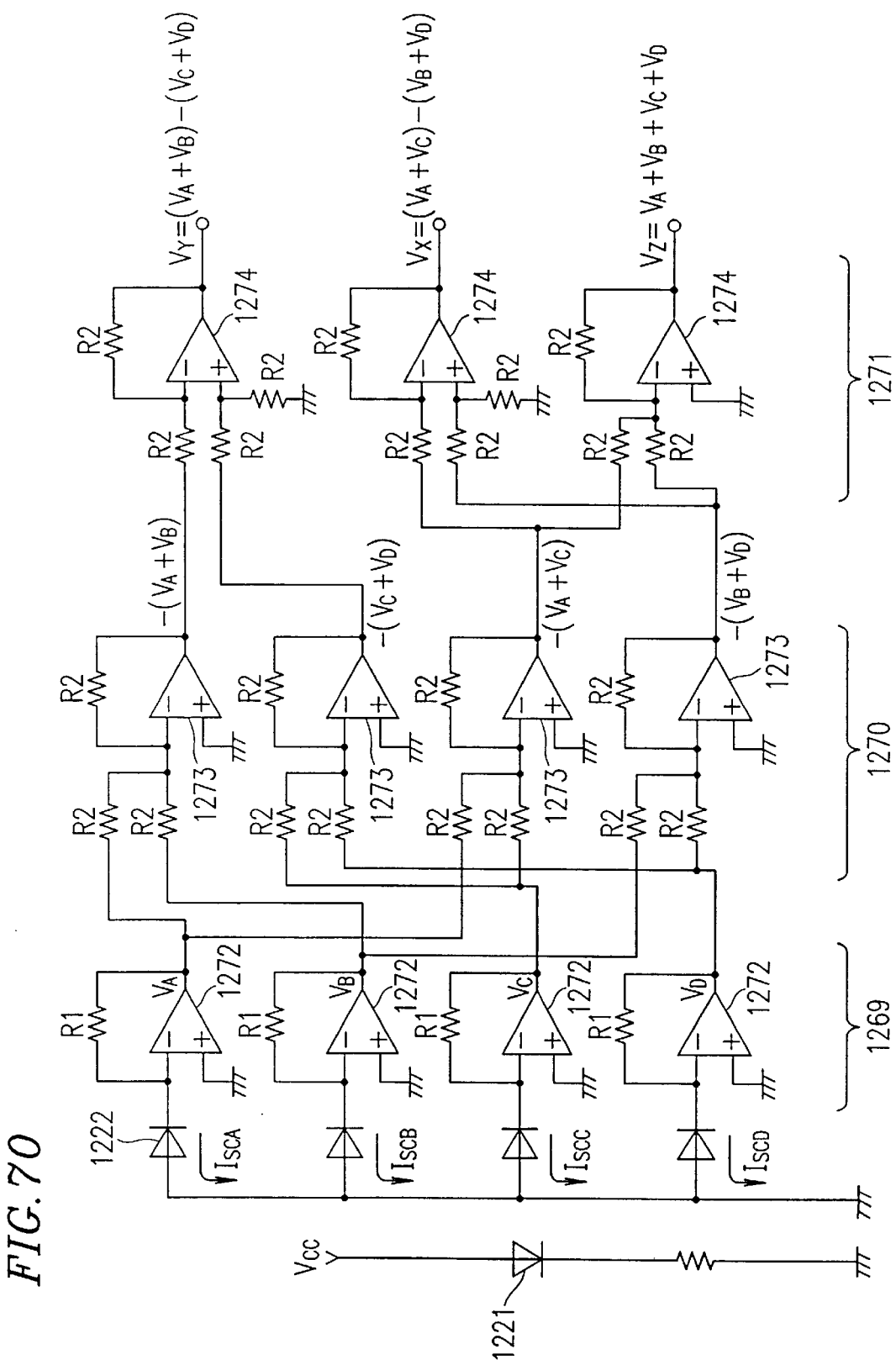
FIG. 70 shows a configuration of an analog signal processing circuit section according to the present invention.

A configuration of the analog signal processing circuit 1264 is shown in FIG. 70. The analog signal processing circuit 1264 includes a voltage conversion section 1269 for converting the output currents from the light receiving element 1222 into voltages, an addition section 1270 for adding the output voltages of given two of the quartered portions A, B, C, and D of the photodiode, and a subtraction section 1271 for calculating the X-axis, Y-axis, and Z-axis direction outputs from the added output voltages. The voltage conversion section 1269 includes an operational amplifier 1272 and a resistor R1 for each of the quartered portions A, B, C, and D of the photodiode. The addition section 1270 includes four operational amplifiers 1273 and resistors R2. The subtraction section 1271 includes three operational amplifiers 1274 and resistors R2.

The digital signal processing section 1266 calculates the direction and amount of a load by synthesizing vectors of the three direction outputs, and determines the direction, speed, acceleration of the shift of the cursor 1262 based on the calculated results. Alternatively, in place of the above operation, a simple method using a software processing on the side of the apparatus such as a computer may be conducted after the A/D conversion. For example, the vectors of the three direction outputs may be divided by respective required division numbers. All of these divided ones are combined to form a matrix so as to determine the three-dimensional direction and size.

Next, the detection principle and the input processing of the input device (pointing device) of Example 12 will be described.

First, for the two-dimensional input, the distance between the reflection surface 1234 of the movable section 1224 and the bottom surface of the optical sensor S is H, as shown in FIG. 68A. The reflection surface 1234 is not tilted when the movable body 1220 is not operated. Light emitted from the light emitting element 1221 passes through the light emitting window 1245 of the light shader 1227 and is reflected by the reflection surface 1234 via the lens 1226. Then, the reflected light passes through the light receiving window 1246 of the light shader 1227 via the lens 1226, so as to form an image at the center of the light receiving element 1222. When the top portion 1233 of the movable section 1224 is operated in a two-dimensional direction with a finger, all of the movable section 1224 except for the legs 1228 attached to the fixing section 1225 is displaced. As a result, the movable section 1224 is tilted a little, so as to change the angle between the reflection surface 1234 and the optical axis of the optical sensor S. Light emitted from the light emitting element 1221 is reflected by the reflection surface 1234 of the movable section 1224 after passing through the light emitting window 1245 and the lens 1226 and is then converged on the light receiving element 1222 after passing through the lens 1226 again and the light receiving window 1246. At this time, light images formed on the light receiving element 1222 before and after the displacement of the movable section 1224 are located at different positions.

Figure 71:
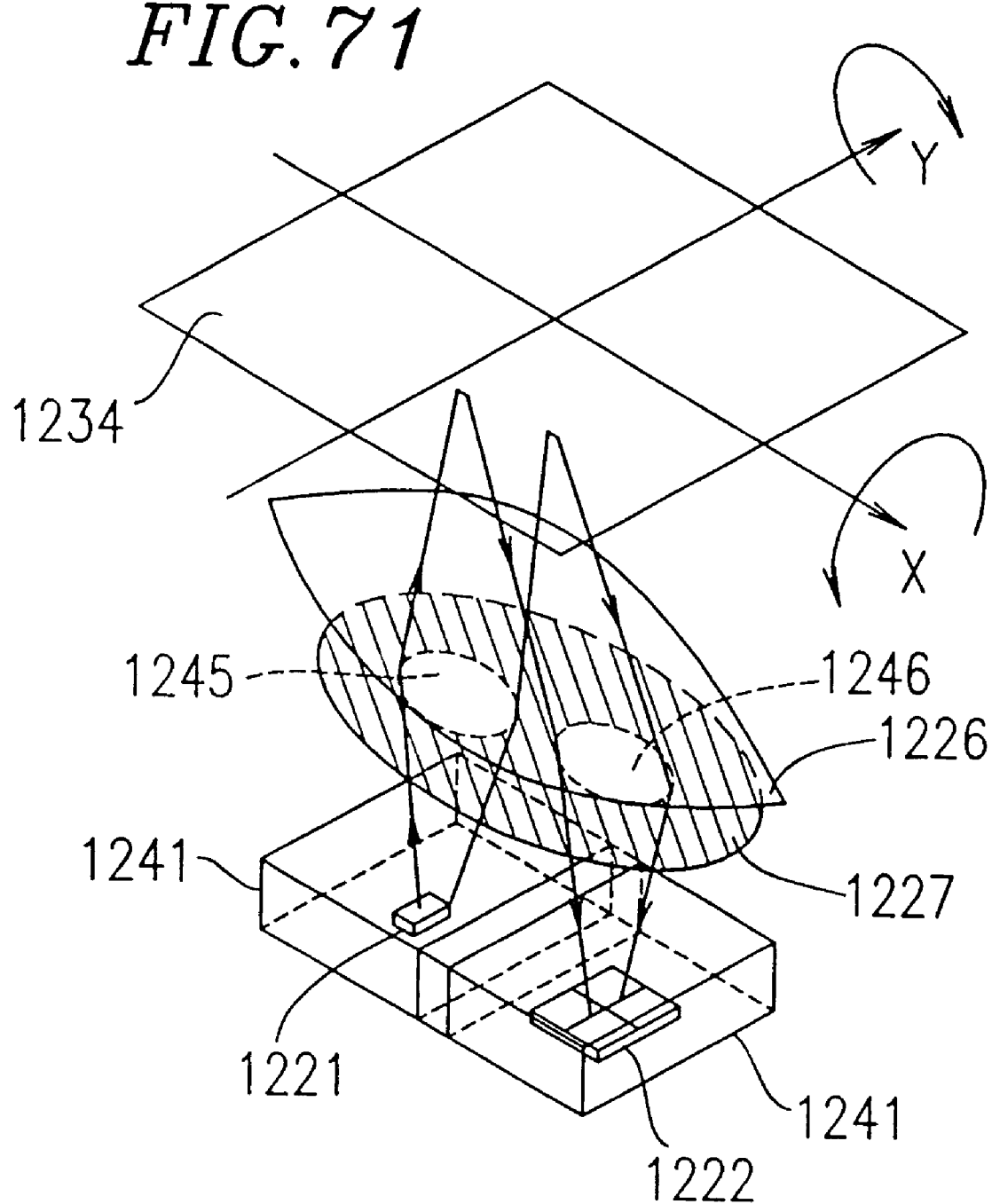
FIG. 71 shows optical paths in the output device according to the present invention.
Figure 72A:
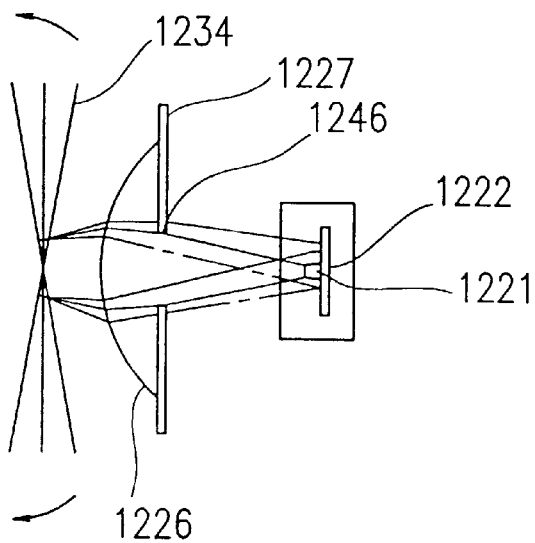
FIGS. 72A and 72B show the displacement of a reflection surface around the X-axis direction and the shift of the light image caused by the displacement shown in FIG. 72A, respectively.
Figure 72B:
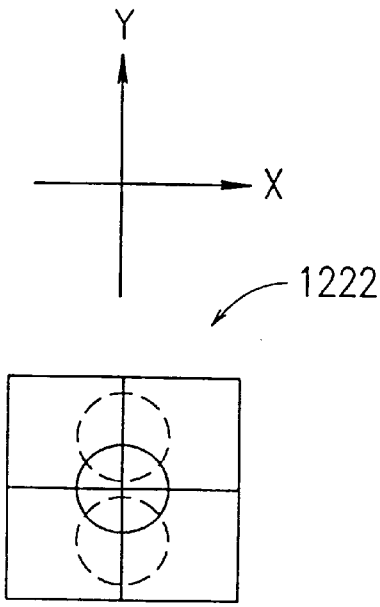

At this time, as shown in FIG. 71, the displacement of the reflection surface 1234 caused by the displacement of the movable section 1224 is represented by the rotations around an axis along which the light emitting element 1221 and the light receiving element 1222 are in line, i.e., the X axis, and the Y axis perpendicular to the X axis. Accordingly, the direction of the load applied to the top portion 1233 of the movable section 1224 by the user can be represented by two directions of rotations around the X axis and the Y axis so as to detect a change of the angle of the reflection surface 1234 for conducting the input processing. For example, the light image formed on the light receiving element 1222 shifts in the Y-axis direction as shown in FIG. 72B, when the reflection surface 1234 is rotated around the X axis as shown in FIG. 72A. Likewise, the light image on the light receiving element 1222 shifts in the X-axis direction as shown in FIG. 73B, when the reflection surface 1234 is rotated around the Y axis shown in FIG. 73A.

The quartered portions A, B, C, and D of the light receiving element 1222 respectively output currents $I_{SCA}$, $I_{SCB}$, $I_{SCC}$, and $I_{SCD}$. The output currents of the element 1222 are supplied to the analog signal processing section 1264 shown in FIG. 69, and are converted into voltages by the voltage conversion section 1269 to obtain $V_A=R1 \times I_{SCA}$, $V_B=R1 \times I_{SCB}$, $V_C=R1 \times I_{SCC}$, $V_D=R1 \times I_{SCD}$ as shown in FIG. 70. Then, since the light image on the light receiving element 1222 shifts in the Y-axis direction for the rotation around the X axis due to the tilt of the reflection surface 1234, the element 1222 is divided into two sets, i.e., a set of the quartered portions A and C and a set of the quartered portions B and D, and the output voltages of each set are added. Likewise, for the rotation around the Y axis, the photodiode is divided into two sets, i.e., a set of the quartered portions A and B and a set of the quartered portions C and D, and the output voltages of each set are added. As a result, as the output from the addition section 1270, $-(V_A+V_C)$ and $-(V_B+V_D)$ are obtained for the rotation around the X axis, while $-(V_A+V_B)$ and $-(V_C+V_D)$ are obtained for the rotation around the Y axis. As the output from the subtraction section 1271, $V_X=(V_A+V_C)-(V_B+V_D)$ is obtained as the X-axis direction output, while $V_Y=(V_A+V_B)-(V_C+V_D)$ is obtained as the Y-axis direction output.

Figure 74:
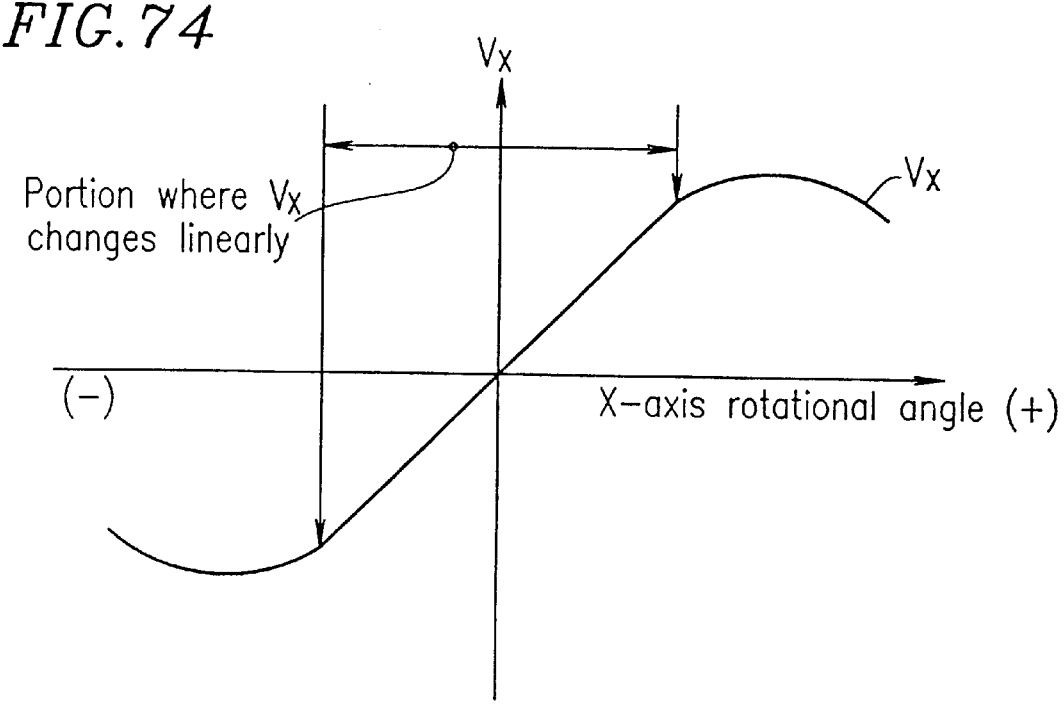
FIG. 74 shows the relationship between the X-axis direction output and the rotational angle according to the present invention.
Figure 75:
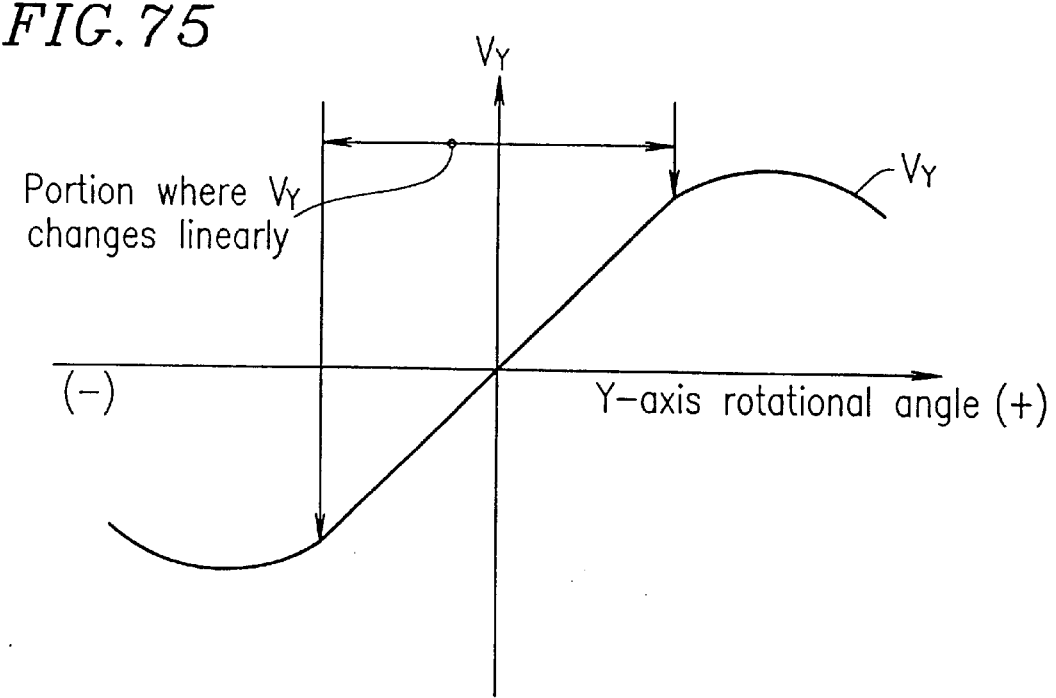
FIG. 75 shows the relationship between the Y-axis direction output and the rotational angle according to the present invention.

The relationship between the rotational angle around the X axis and $V_X$ is represented by a S-shaped curve having a linear portion where $V_X$ changes linearly as shown in FIG. 74. Likewise, the relationship between the rotational angle around the Y axis and $V_Y$ is represented by a S-shaped curve having a linear portion where $V_Y$ changes linearly as shown in FIG. 75. Accordingly, $V_X$ is uniquely determined with respect to the rotational angle around the X axis within the linear portion of $V_X$, while $V_Y$ is uniquely determined with respect to the rotational angle around the Y axis within the linear portion of $V_Y$. Incidentally, the output currents of the quartered portions A and C and B and D are added respectively for the rotation around the X axis, and the output currents of the quartered portions A and B and C and D are added respectively for the rotation around the Y axis in order to enlarge the light receiving area which can be effectively used for the shift of the light image. This addition is also effective for absorbing a variation of the light axis due to a variation of actual assembly.

Figure 76:
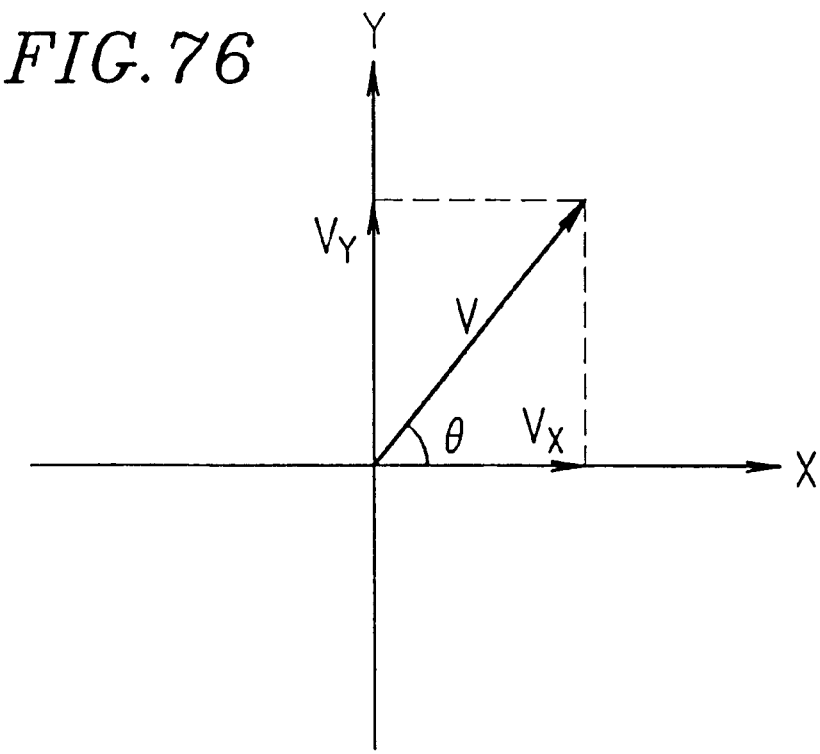
FIG. 76 shows a vector of the X-axis and Y-axis direction outputs.

Once $V_X$ and $V_Y$ are obtained by the analog signal processing section 1264, the direction and magnitude of the load applied to the movable body 1220 are obtained by synthesizing the vectors in the two directions, as shown in FIG. 76.

$$\theta = \tan^{-1}(V_Y/V_X) \tag{32}$$

$$V = V_X/\cos\theta = V_Y/\sin\theta \tag{33}$$

$$= V_X/\cos(\tan^{-1}(V_Y/V_X))$$

$$= V_Y/\sin(\tan^{-1}(V_Y/V_X))$$

where $\theta$ is the direction and V is the magnitude.

Thus, once $V_X$ and $V_Y$ are obtained, the direction $\theta$ and the magnitude V are determined. The shift direction, speed, acceleration, etc. of the cursor 1261 are then determined based on the determined $\theta$ and V.

Figure 77:
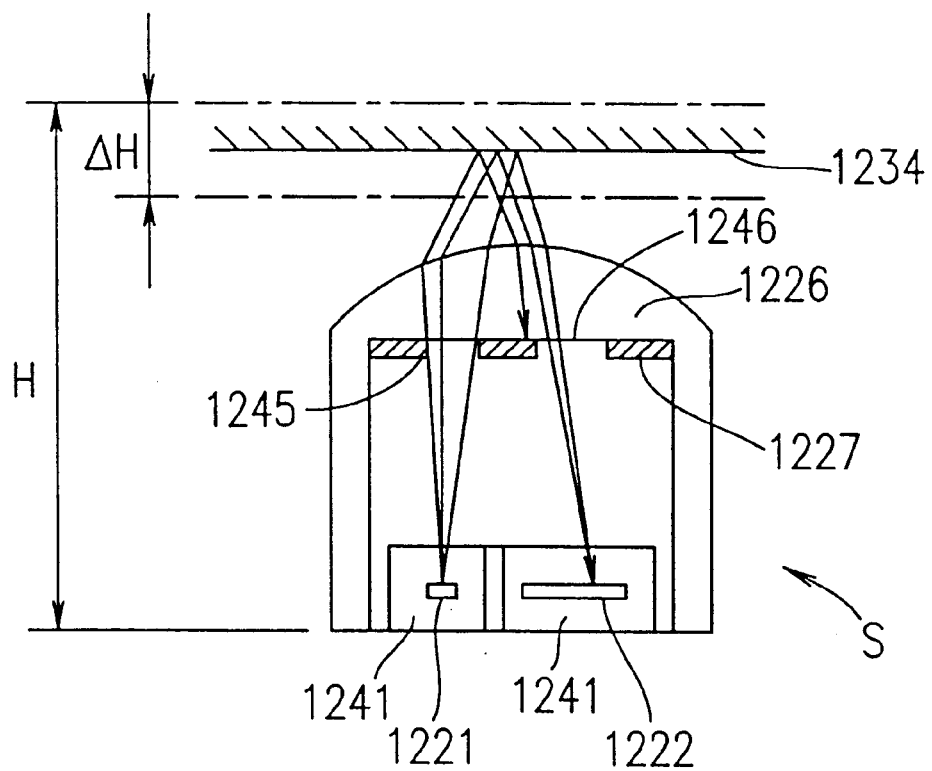
FIG. 77 shows optical paths obtained when a movable body is displaced in the Z-axis direction according to the present invention.

Next, the displacement in the Z-axis direction will be described with reference to FIG. 77.

The movable section 1224 is pressed downward and displaced in the Z-axis direction. Light emitted from the light emitting element 1221 passes through the light emitting window 1245 and the lens 1226 and reflected by the reflection surface 1234. The reflected light passes through the lens 1226 again to reach the light shader 1227. While most of the light passes through the light receiving window 1246 to reach the light receiving element 1222, part of the light is prevented from passing through the light receiving window 1246 and does not reach the light receiving element 1222. Accordingly, the light amount received by the light receiving element 1222 becomes smaller than that received before the displacement of the movable section 1224 in the Z-axis direction. The analog signal processing section 1264 calculates $V_Z=V_A+V_B+V_C+V_D$ based on the light amount received by the light receiving element 1222 as the Z-axis direction output. When the movable section 1224 is displaced by $\Delta H$, all of the light from the light emitting element 1221 is shaded by the light shader 1227, not reaching the light receiving element 1222. Thus, the displacement in the X-axis direction can be obtained by comparing the absolute value of the outputs $V_Z$ before and after the displacement in the Z-axis direction.

The analog signals for a three-dimensional direction obtained by the above processing are input in the control circuit 1263 as shown in FIG. 69. In the control circuit 1263, the A/D conversion section 1265 converts the analog signals into digital signals with a required resolution. The 4-bit or 8-bit resolution is appropriate. The converted signals are then converted into serial signals in the X-axis, Y-axis, and Z-axis directions by the digital signal processing circuit section 1266 and sent to the serial interface 1267. The serial interface 1267 conducts input/output operation with a mouse interface of the apparatus 1260 such as a computer.

As a result, by operating the movable body 1220 in a two-dimensional direction, outputs corresponding to the direction and magnitude of the operation is obtained. The cursor 1262 can be shifted on the display 1261 to a desired position by a desired distance according to this output. When a large load is applied to the movable body 1220 in a given direction, the cursor 1262 shifts in the direction rapidly. When a small load is applied to the movable body 1220 in a given direction, the cursor 1262 shifts in the direction slowly. When the finger leaves the movable body 1220, the cursor 1262 stops shifting. Further, by operating the movable body 1220 in the Z-axis direction, a shift in a three-dimensional direction on the display 1261 corresponding to the amount of operation is obtained. The cursor 1262 can thus be shifted on the display 1261 three-dimensionally.

The operation of the movable body 1220 in the Z-axis direction can also provide a click function. Clicking or dragging can be input by the operation of the movable body 1220 by providing a click circuit. In such a click circuit, the output of the optical sensor S is subjected to level-slicing depending on whether or not the output exceeds a certain threshold. Thus, the click circuit outputs an ON signal when the output exceeds the threshold, while it outputs an OFF signal when the output does not exceed the threshold. In this case, the input device has a two-dimensional input function, not the three-dimensional input function.

In order to implement both the three-dimensional input function and the click function, a temporal element should be added at the detection of the operation of the movable body 1224. More specifically, the time duration of the output of the optical sensor S obtained by the operation in the Z-axis direction is measured. The operation is judged as the click when the output time duration is shorter than a predetermined value, while it is judged as the three-dimensional input when it is longer than the predetermined value. Based on this judgement, either of the above operations is conducted.

Figure 78A:
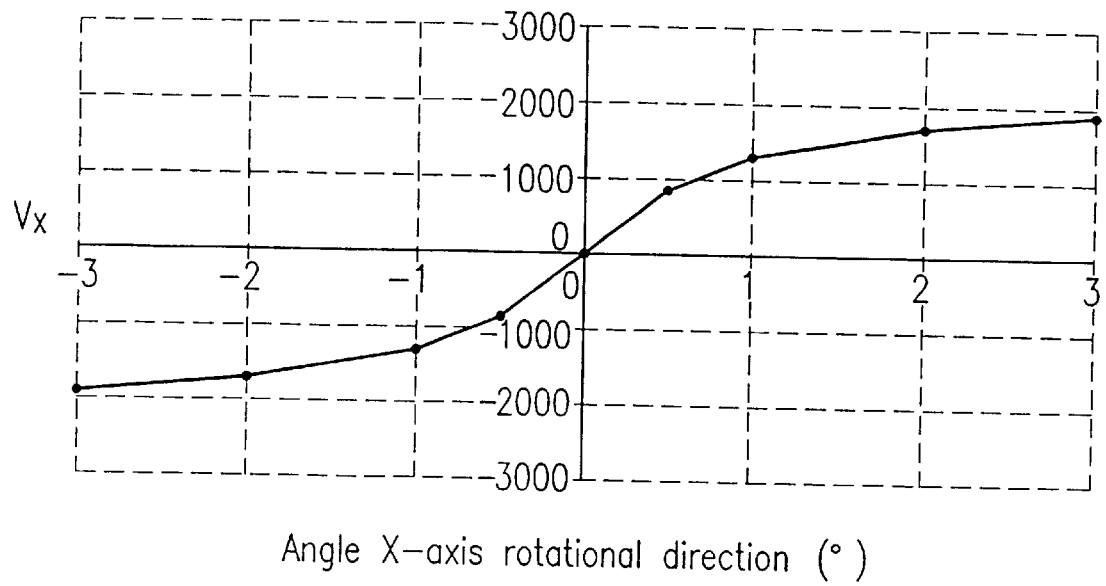
FIGS. 78A and 78B show the simulation results of the relationship between the X-axis direction output and the rotational angle and the relationship between the Y-axis direction output and the rotational angle, respectively.
Figure 78B:
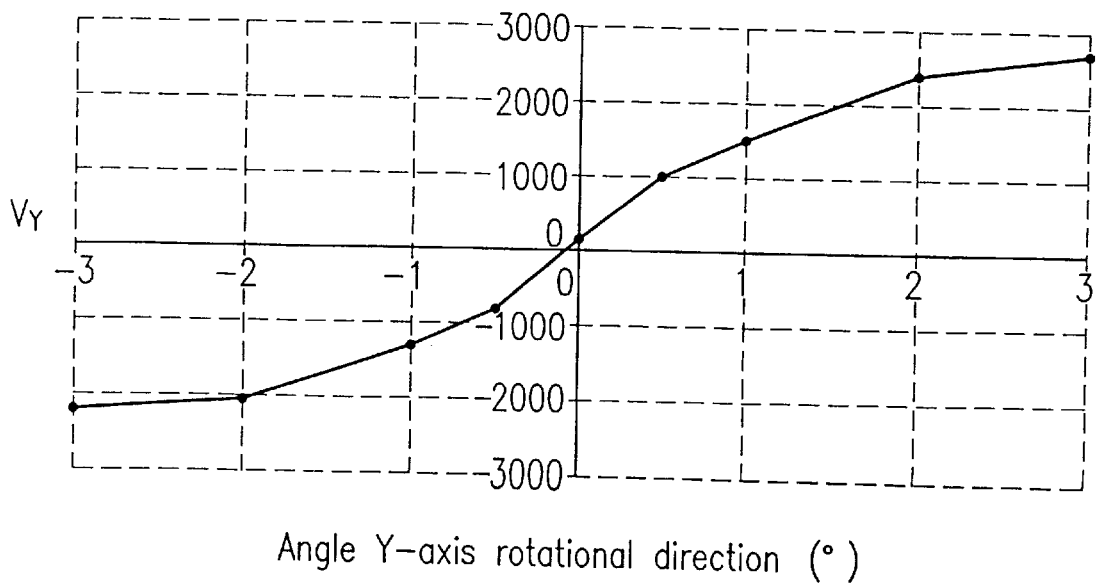

FIGS. 78A and 78B show the results of the optical simulation using light ray tracing method conducted to confirm that $V_X$ and $V_Y$ obtained by the input device (pointing device) of Example 12 show linear changes with respect to the X-axis rotational angle and the Y-axis rotational angle. In this optical simulation, 120 light rays were emitted from the light emitting element 1221 as a point light source within the range of a certain solid angle $\Delta\omega$. The refraction index of a resin used, the curvature of the lens 1226, and the like were input into a computer, and the simulation was conducted for each light ray according to the reflection and refraction principles. The intensities of light rays finally reaching the light receiving element 1222 were then evaluated for the 120 light rays.

In the above technique, the intensity of each of the original light rays is assumed to be 100, and total 120 light rays were emitted (total intensity: 120×100=12000). Using the intensities of the light rays reaching the quartered photodiode as the light receiving element 1222, $V_X=(A+C)-(B+D)$ and $V_Y=(A+B)-(C+D)$ were calculated. The calculated values $V_X$ and $V_Y$ were graphed with the rotational angle as the abscissa. These results of the simulation also show the S-shaped curves of $V_X$ and $V_Y$ with respect to the rotational angle. Thus, it is confirmed that Formulae (32) and (33) for the direction θ and the magnitude V are effective by using the range where $V_X$ or $V_Y$ shows the linear change as the range for the input device (pointing device). Incidentally, the offset in the Y-axis rotational direction in this simulation is caused because the positional relationship between the light emitting element 1221 and the light receiving element 1222 in the Y-axis direction is deviated from the optimal position. The optimal position can be obtained by repeating the simulation.

Figure 79:
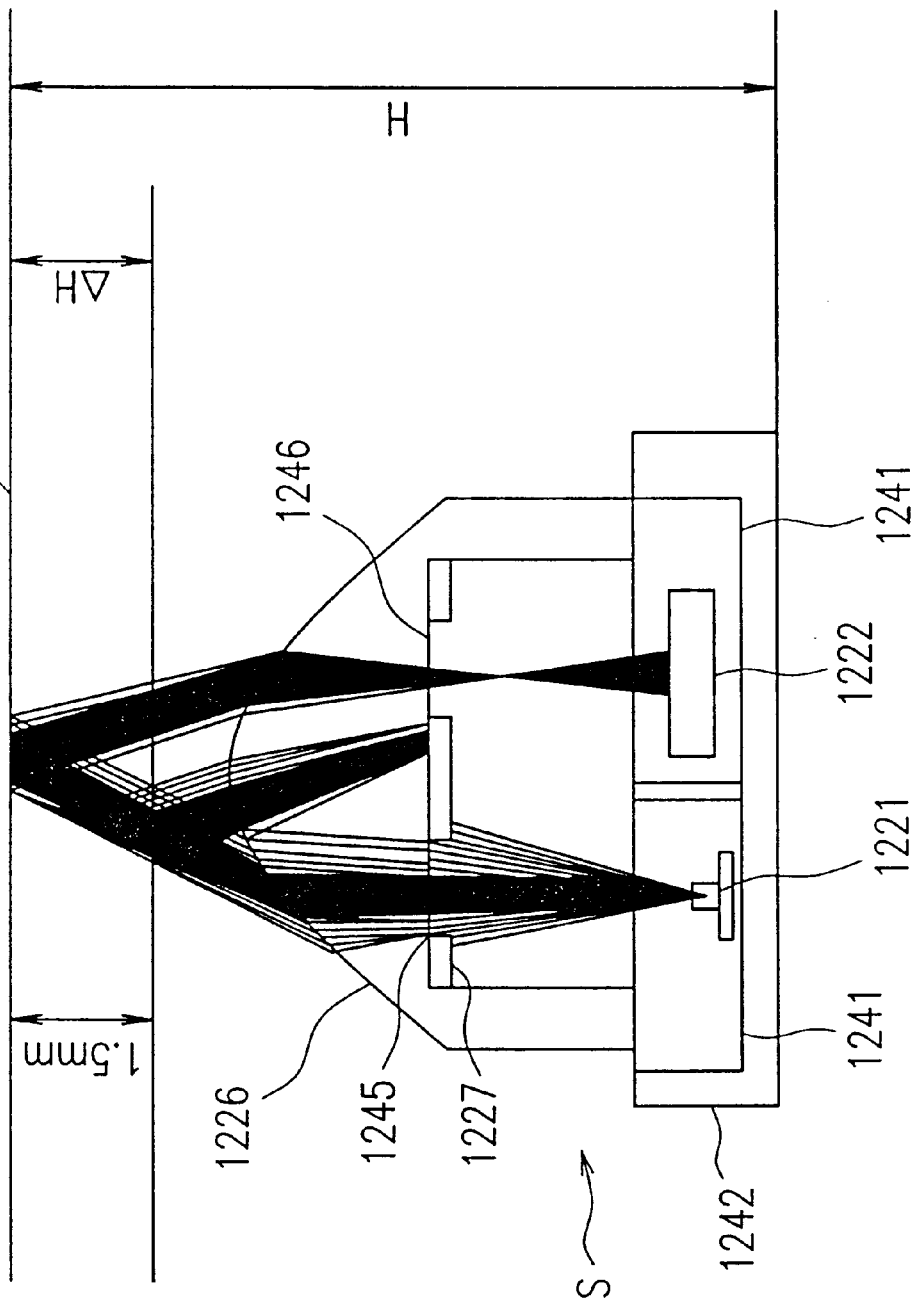
FIG. 79 shows the simulation result when a movable body is displaced in the Z-axis direction.

As the simulation of the displacement in the Z-axis direction, it was observed that, by setting the conditions of the above described parameters, light did not reach the light receiving element 1222 when the reflection surface 1234 was lowered by ΔH (=1.5 mm, when the maximum distance between the lens 1226 and the reflection surface 1234 is 2.4 mm) as shown in FIG. 79. It was also observed that, when the reflection surface 1234 in the tilted state was displaced by ΔH in the Z-axis direction, light did not reach the light receiving element 1222, either, depending on the value of ΔH. The value of ΔH with respect to the distance H between the reflection surface 1234 and the optical sensor S, as well as the sizes of the windows 1245 and 1246 and the positional relationship therebetween, should be designed in consideration of parameters such as the positional relationship between the light emitting element 1221 and the light receiving element 1222, the focal distance of the lens 1226, and the like.

As described above, one input device can provide a plurality of input functions by having the structure of the optical sensor S and the movable body 1220 housing the optical sensor S and movable three-dimensionally. With this structure, the number of components can be reduced and thus the size of the device can be reduced. Such a small input device can be disposed in a space surrounded by keys of the keyboard, saving the space of the apparatus such as a computer. Also, the input device of Example 12 employs a non-contact optical method which does not include any mechanical portion. Accordingly, high reliability and durability can be obtained. Further, since any three-dimensional displacement in all directions can be detected in an analog fashion, the input processing can be easily conducted. Accordingly, a simple program is enough for the input processing, and thus an input device (pointing device) with a low total cost can be provided.

The input device is not always under operation. Accordingly, it is not necessary for the light emitting element 1221 to always emit light when the apparatus 1260 such as a computer is on. Instead, the light emitting element 1221 may be driven to emit light intermittently. In this case, the output current from the light receiving element 1222 may be detected in synchronization with the timing of the emission. This not only reduces the power consumption, but also eliminates an influence of turbulence such as noise, thereby enhancing the reliability of the device.

In Example 12, the click circuit was described where ON/OFF signals were obtained by level-slicing the output of the optical sensor S indicating the displacement of the movable body 1220 in the Z-axis direction. In such a click circuit, however, a clicking touch is not obtained when the movable body 1220 is pressed by the user. This does not provide satisfaction in the aspect of human engineering. Modifications of Example 12 for providing the clicking touch for the displacement in the Z-axis direction will be described as follows.

Figure 80:
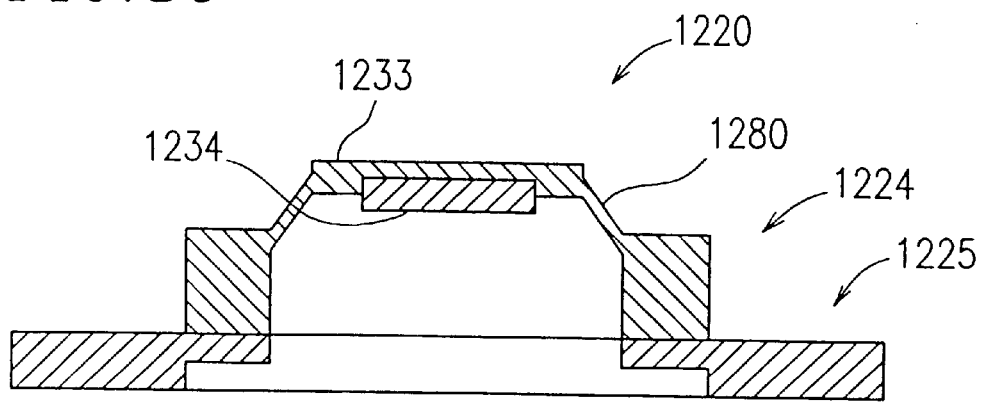
FIG. 80 is a sectional view of a movable body having a clicking touch according to the present invention.
Figure 81:
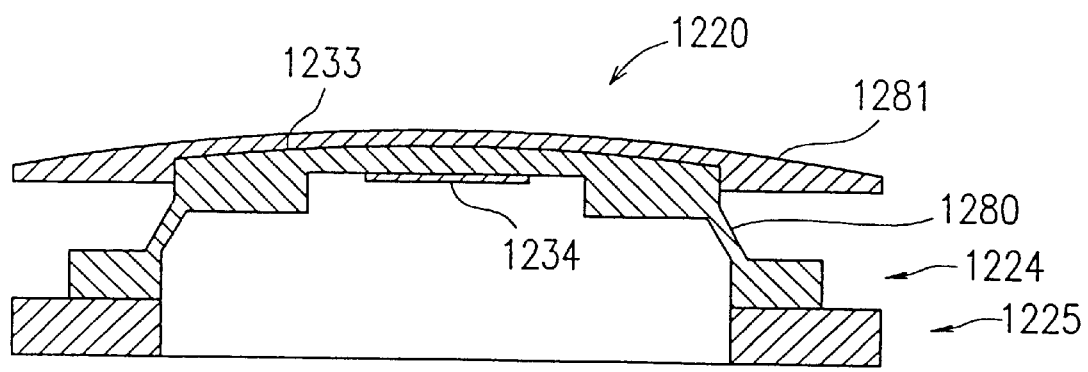
FIG. 81 is a sectional view of another movable body having a clicking touch according to the present invention.

Referring to FIG. 80, in a modified input device, the movable section 1224 constituting the elastic portion. The movable section 1224 includes a top portion 1233 where the reflection surface is formed, a lower portion which is seated on the fixing section 1225, and a coupling portion 1280 having a thin thickness (0.4 mm) and a given angle (30° to 40°) between the top portion 1233 and the lower portion. The remaining structures are the same as those of Example 12. Alternatively, the movable body may have a structure as shown in FIG. 81, where, the movable section 1224 constitutes the elastic portion and includes the top portion 1233, the lower portion, and a coupling portion 1280 having a thin thickness (0.4 mm) and a given angle (30° to 40°) between the top portion 1233 and the lower portion. In this case, the top portion 1233 is covered with a rigid operation portion 1281 with a large diameter. In the latter case, the top portion 1233 must be thickened to have a strength large enough to support the operation portion 1281. This makes the distance between the optical sensor S and the reflection surface 1234 shorter than the minimum distance. In order to solve this problem, a concave area is formed at the center of the bottom of the top portion 1233. With these structures of the modified examples, when the movable section 1224 is pressed to some extent, the coupling portion 1280 abruptly deforms and collapses, thus providing the clicking touch. Accordingly, the user can feel that the click function has been executed. This improves the operability of the device.

Figure 82A:
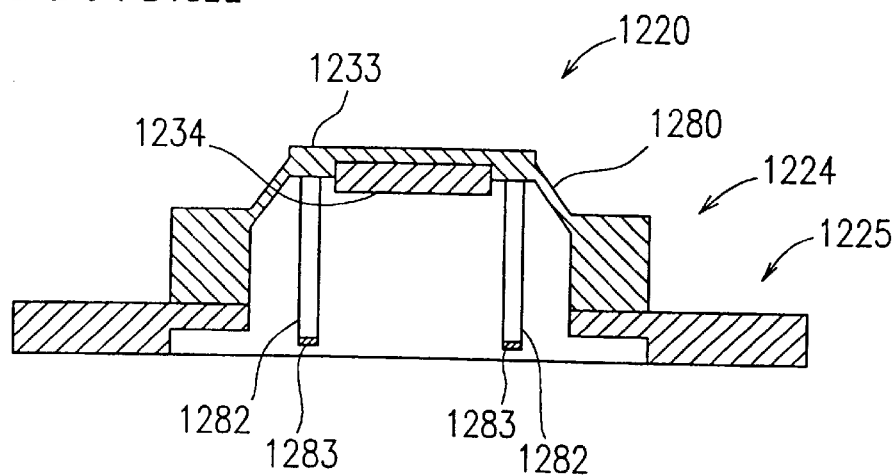
FIGS. 82A and 82B are sectional views of a movable body with a clicking means according to the present invention.
Figure 82B:
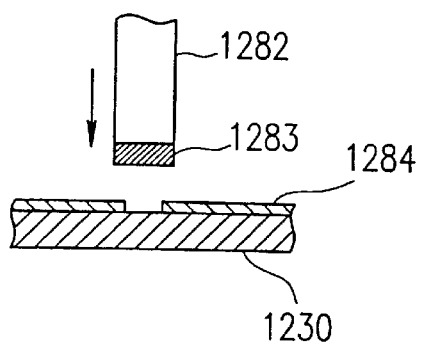
Figure 83:
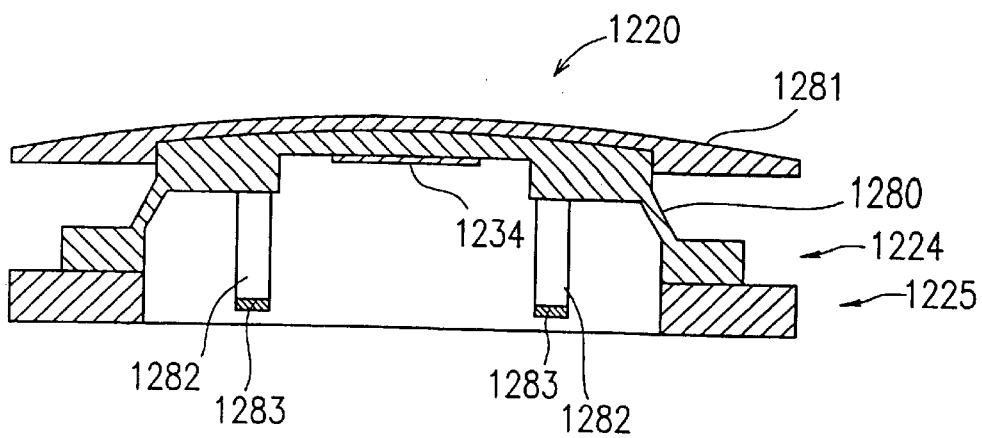
FIG. 83 is a sectional view of another movable body with a click means according to the present invention.

Other modifications of Example 12 are shown in FIGS. 82A, 82B, and 83. In these modified examples, protrusions 1282 extend from the bottom surface of the top portion 1233 of the movable body 1220 shown in FIGS. 80 or 81. A conductor 1283 is disposed on each of the bottom end of the protrusions 1282. A conductive pattern 1284 is formed on the surface of the substrate 1230 facing the protrusions 1282 as shown in FIG. 82B. When the movable section 1224 is displaced in the Z-axis direction, the protrusions 1282 lowers, so that the conductors 1283 contact the conductive pattern 1284, allowing to provide a switch function. This structure can be used to provide the input device with the click function and the drag function. The structure as shown in FIGS. 82A, 82B, and 83 may also be used as a switch function itself additionally provided to the input device (pointing device). In this case, an input device having multi-functions can be realized.

Further, in the above modified examples having the protrusions to provide the click function, the cursor and the like can be shifted three-dimensionally by inputting into the computer signals corresponding to the direction and amount of the operation based on the absolute of the output $V_Z$ of the optical sensor S obtained by the displacement of the movable body 1220 in the Z-axis direction. Thus, a pointing device having both the three-dimensional input function and the click function can be realized.

EXAMPLE 13

A thirteenth example of the input device according to the present invention will be described with reference to FIGS. 84 to 90B.

Figure 84:
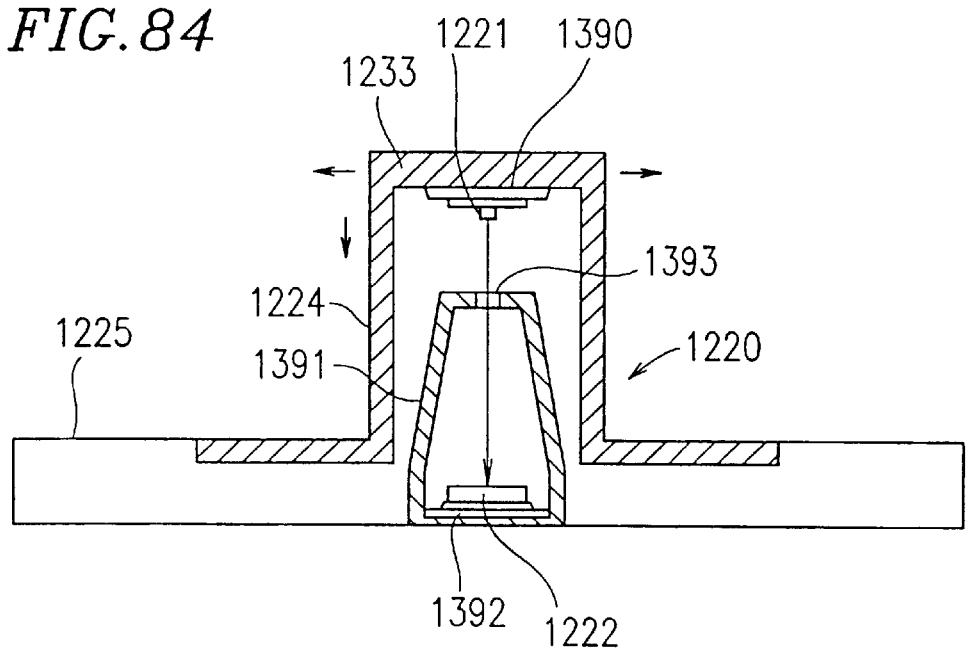
FIG. 84 is a sectional view of a thirteenth example of the input device according to the present invention.

As shown in FIG. 84, a light emitting element 1221 is disposed on a movable section 1224 which can be moved vertically. A light receiving element 1222 is formed to face the light emitting element 1221. More specifically, the light emitting element 1221 is disposed on a substrate 1390 secured to a top portion 1233 of the movable section 1224. The light receiving element 1222 is covered with a holder 1391 made of a light-shading resin and is mounted on a substrate 1392 secured to the bottom of the holder 1391. The holder 1391 is secured to a fixing section 1225. A circular pinhole 1393 for restricting light incident on the light receiving element 1222 is formed at the top portion of the holder 1391 which is located somewhere in the optical axis between the light emitting element 1221 and the light receiving element 1222. Thus, a transmissive type optical sensor is formed. An LED is used as the light emitting element 1221, and a quartered photodiode is used as the light receiving element 1222. The structure of the movable body 1220 is the same as that of Example 12.

Figure 85A:
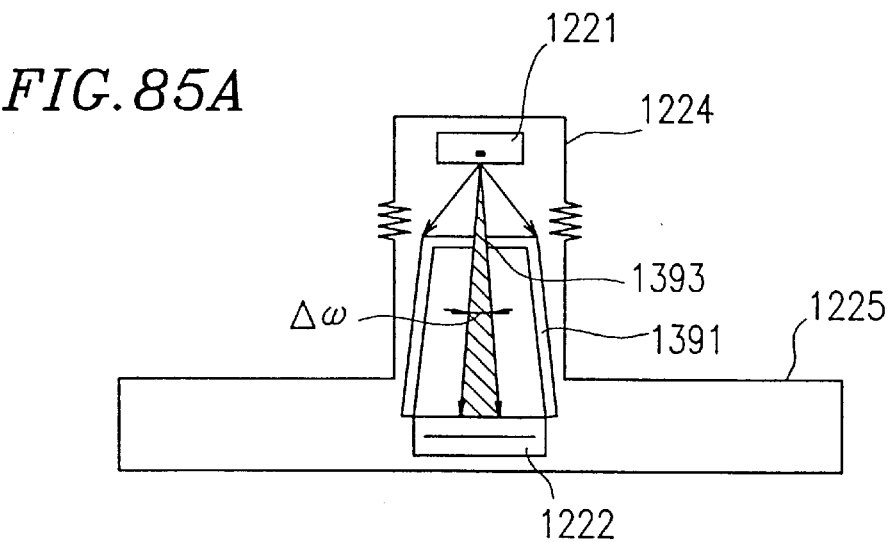
FIGS. 85A and 85B are a schematic view of the input device when no load is applied and a view showing a light image on a light receiving element when the input device is in the state of FIG. 85A according to the present invention.
Figure 85B:
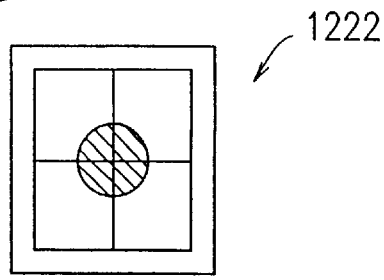

With the above structure, when the user does not operate the movable body 1220, light emitted from the light emitting element 1221 reaches the light receiving element 1222 via the pinhole 1393, as shown in FIG. 85A. In this case, however, the light image formed on the light receiving element 1222 is small and the total light amount received by the light receiving element 1222 is small. This is because only the light in the range of a solid angle $\Delta\omega$ reaches the light receiving element 1222.

Figure 86A:
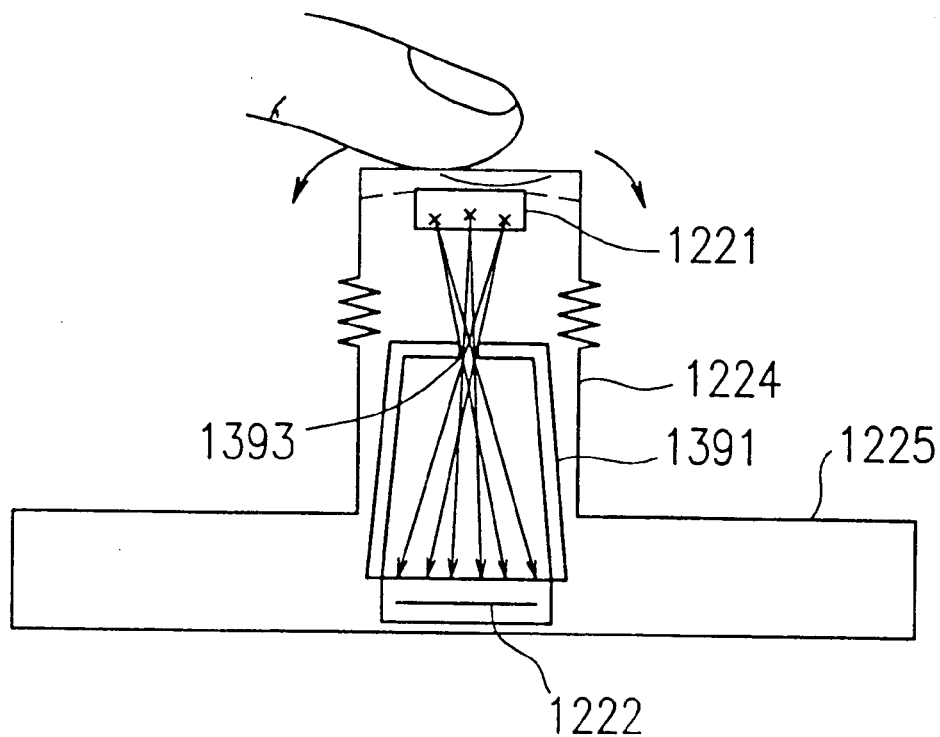
FIGS. 86A and 86B are a schematic view of the input device when a load is applied in a two-dimensional direction and a view showing a light image on a light receiving element when the input device is in the state of FIG. 86A according to the present invention.
Figure 86B:
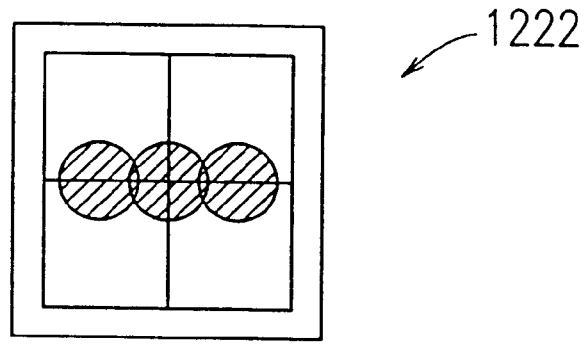

When the movable body 1220 is operated in a two-dimensional direction by a finger as shown in FIG. 86A, the light emitting element 1221 moves in association with the displacement of the movable section 1224. Accordingly, the light image formed on the light receiving element 1222 shifts in a direction opposite to the direction of the displacement of the movable section 1224 while the size of the light image remains unchanged. The detection of the output from the light receiving element 1222 is the same as that described in Example 12. In this case, however, the output change with respect to the angle is replaced with the output change with respect to the displacement.

Figure 87A:
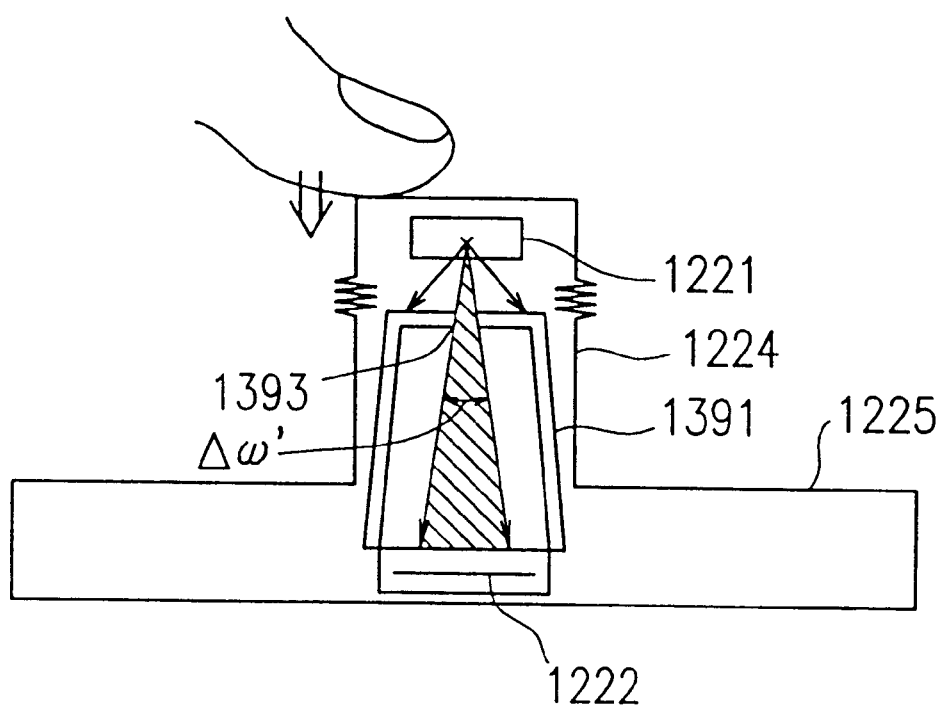
FIGS. 87A and 87B are a schematic view of the input device when a load is applied in the Z-axis direction and a view showing a light image on a light receiving element when the input device is in the state of FIG. 87A according to the present invention.
Figure 87B:
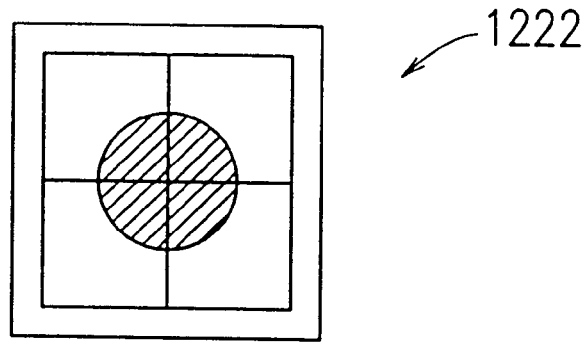
Figure 89A:
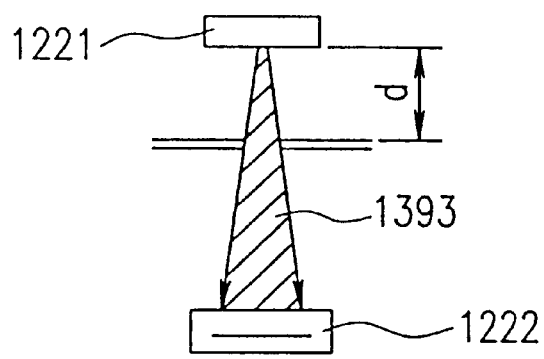
FIGS. 89A and 89B are a view showing the distance between the light emitting element and the pinhole and the relationship between the distance between the light emitting element and the pinhole and the relative received light amount according to the present invention.
Figure 89B:
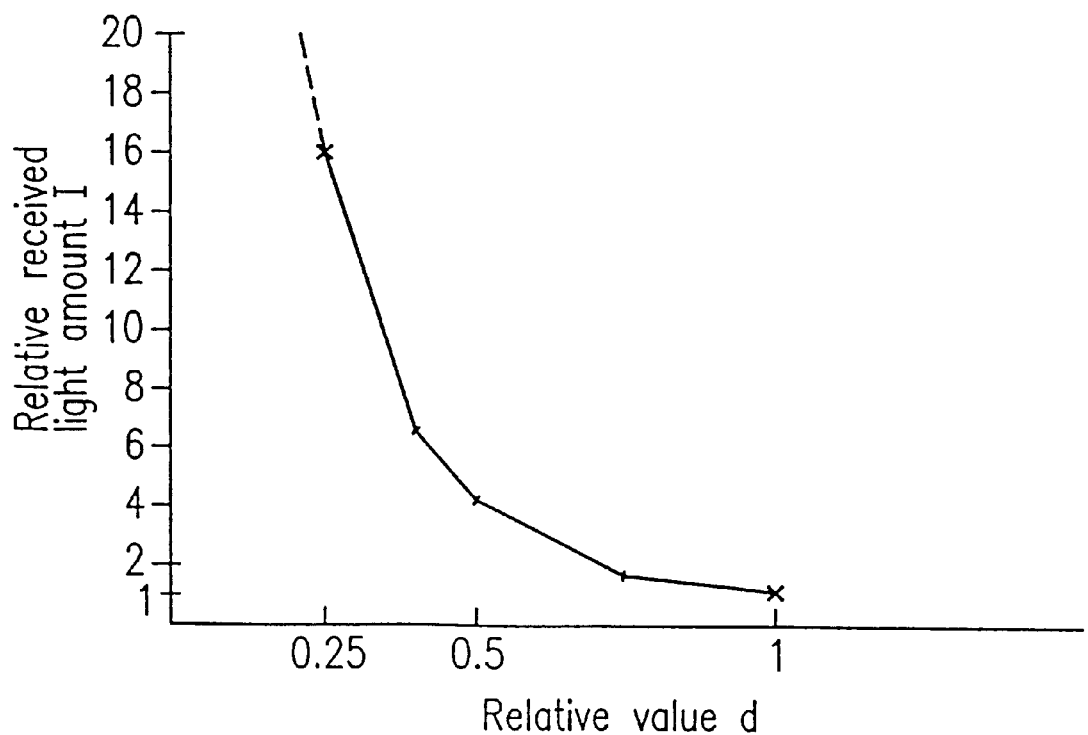

Then, as shown in FIG. 87A, when the movable section 1224 is pressed and displaced in the Z-axis direction, the distance between the light emitting element 1221 and the pinhole 1393 becomes short. At this time, the light in the range of a solid angle $\Delta\omega'$ ($>\Delta\omega$) reaches the light receiving element 1222. Accordingly, the light image on the light receiving element 1222 is larger and the total light amount received by the light receiving element 1222 is larger than the case where the movable section 1224 is not displaced in the Z-axis direction. FIG. 89B shows the variation in the total light amount received by the light receiving element 1222 as a function of the displacement of the movable section 1224 in the Z-axis direction. The relationship between the distance between the light emitting element 1221 and the pinhole 1393 and the relative received light amount is expressed by:

$$I'=I\times(d/d')^2 \tag{34}$$

where d and d' denote the distance between the light emitting element 1221 and the pinhole 1393 before and after the displacement, respectively, and I and I' denote the relative received light amount before and after the displacement, respectively.

Figure 88A:
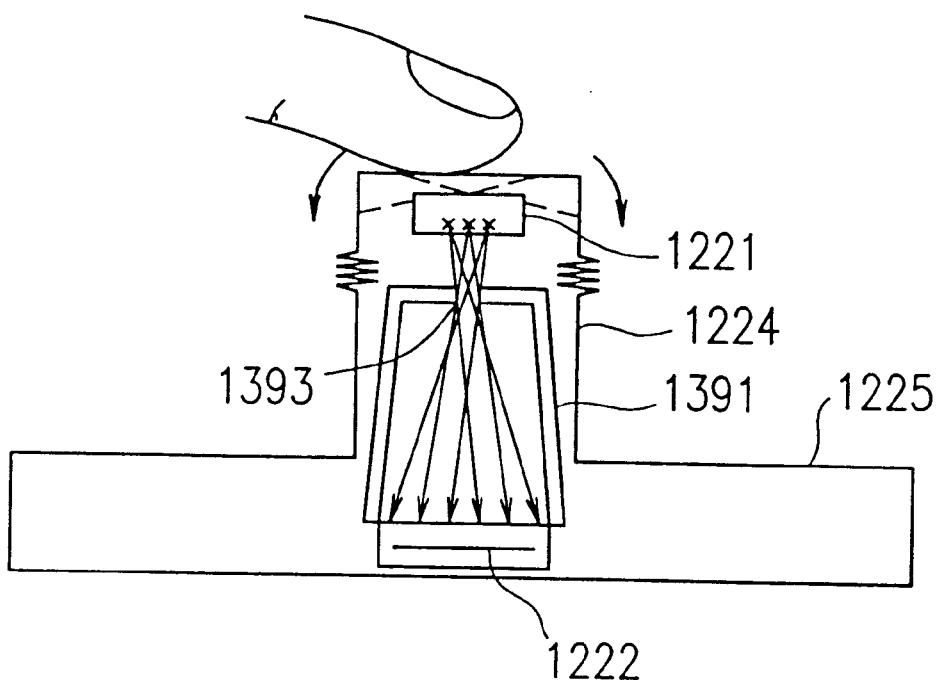
FIGS. 88A and 88B are a schematic view of the input device when a movable section is displaced three-dimensionally and a view showing a light image on a light receiving element when the input device is in the state of FIG. 88A according to the present invention.
Figure 88B:
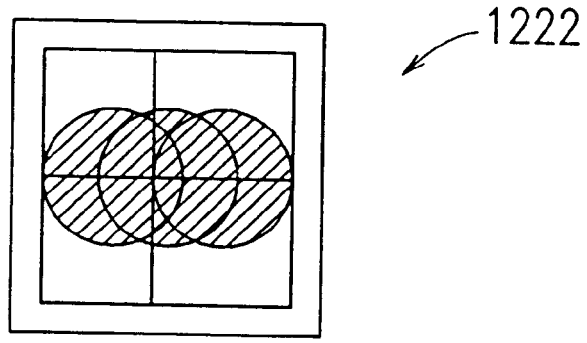

Then, when the movable section 1224 is operated in a two-dimensional direction while being pressed in the Z-axis direction, the movable section 1224 is displaced three-dimensionally, as shown in FIG. 88A. At this time, the light image shows the shift obtained by synthesizing the above-described displacements in the directions, and therefore the shift of the light image on the light receiving element 1222 corresponding to the displacement in the two-dimensional direction is large, as shown in FIG. 88B. The displacement $\Delta L'$ of the light image on the light receiving element 1222 is expressed by:

$$\Delta L'=\Delta L\times D/d' \tag{35}$$

where $\Delta L$ denotes the displacement of the light emitting element 1221, D denotes the distance between the pinhole 1393 and the light receiving element 1222 (constant), and d' denotes the distance between the pinhole 1393 and the light emitting element 1221.

Figure 90A:
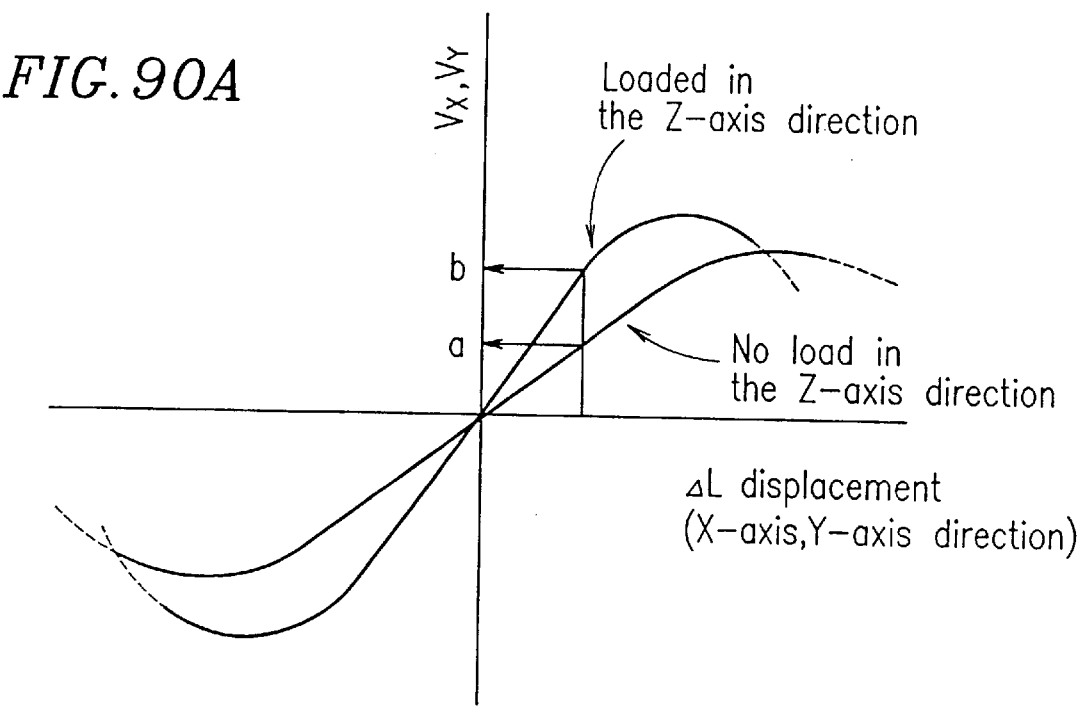
FIGS. 90A and 90B show the difference in the X-axis or Y-axis direction output between when a load in the Z-axis direction is present and when it is not present, and the X-axis or Y-axis direction output before and after the correction, respectively.
Figure 90B:
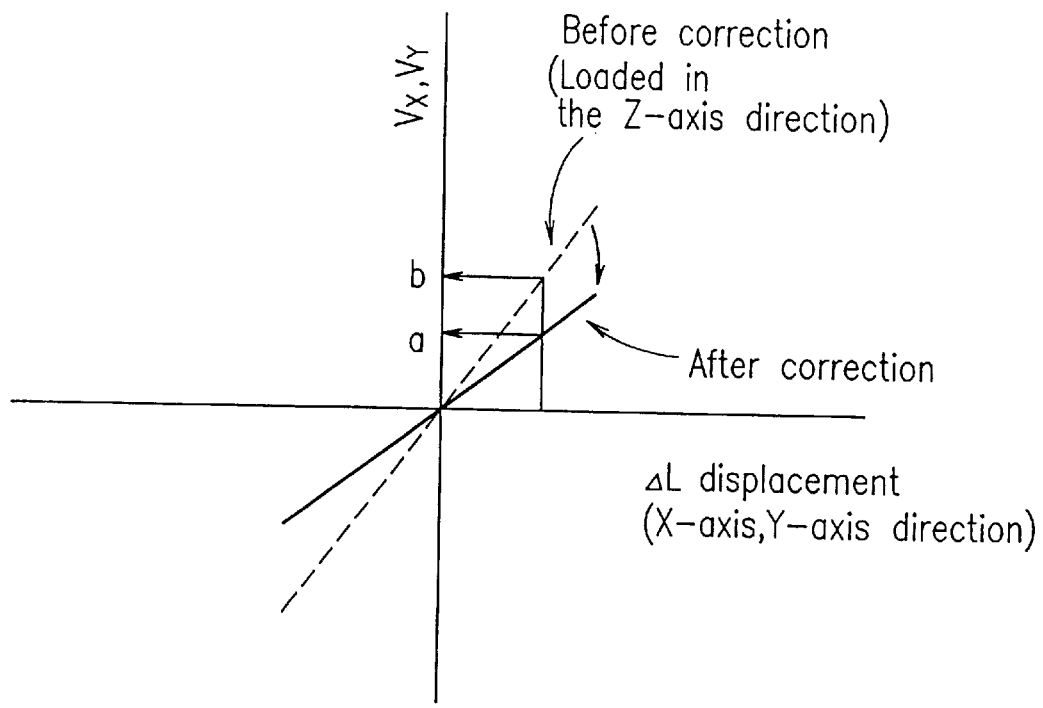
Figure 91:
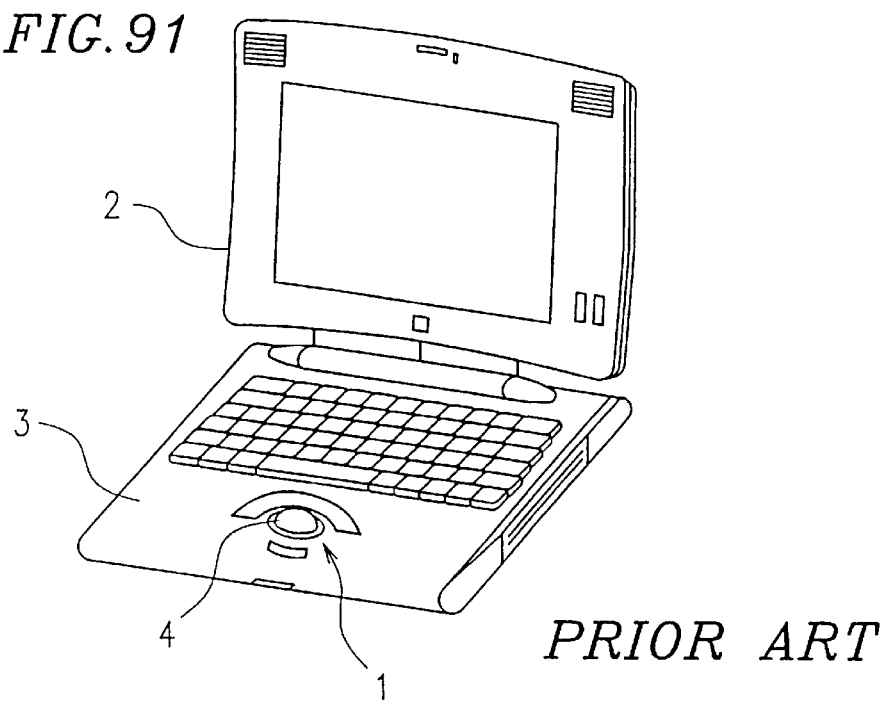
FIG. 91 is a perspective view of a personal computer provided with a conventional track ball.
Figure 92:
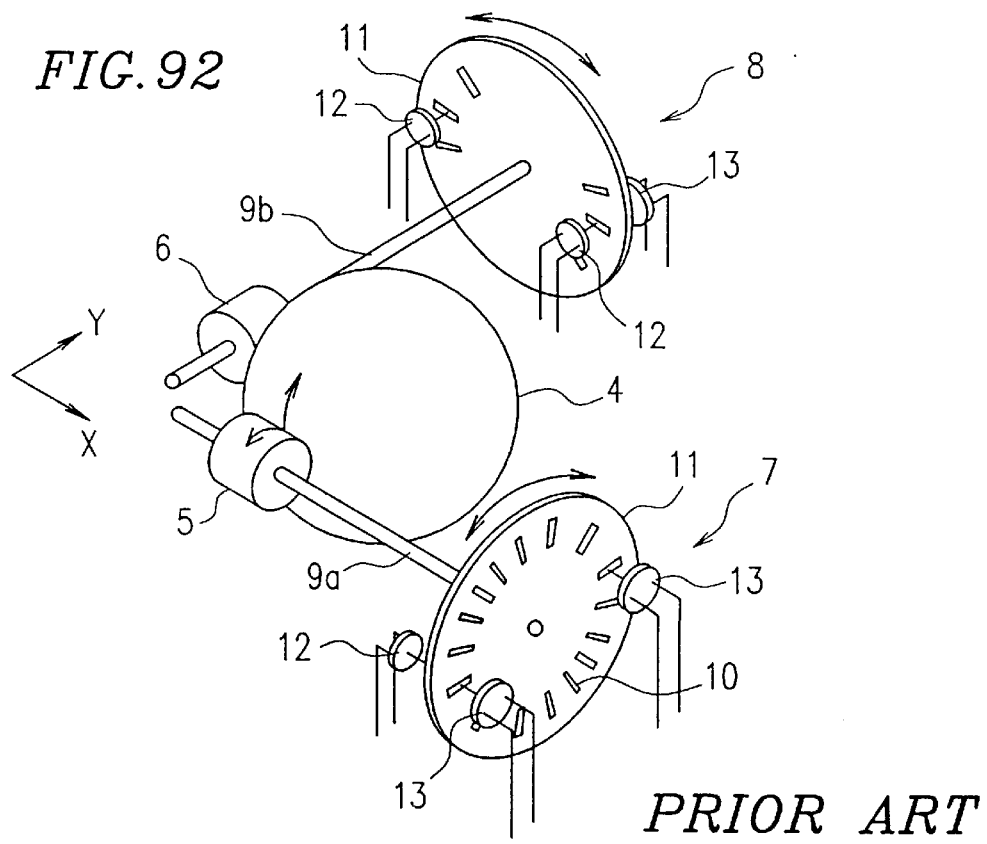
FIG. 92 is a view for explaining the operational principle of the track ball.
Figure 93:
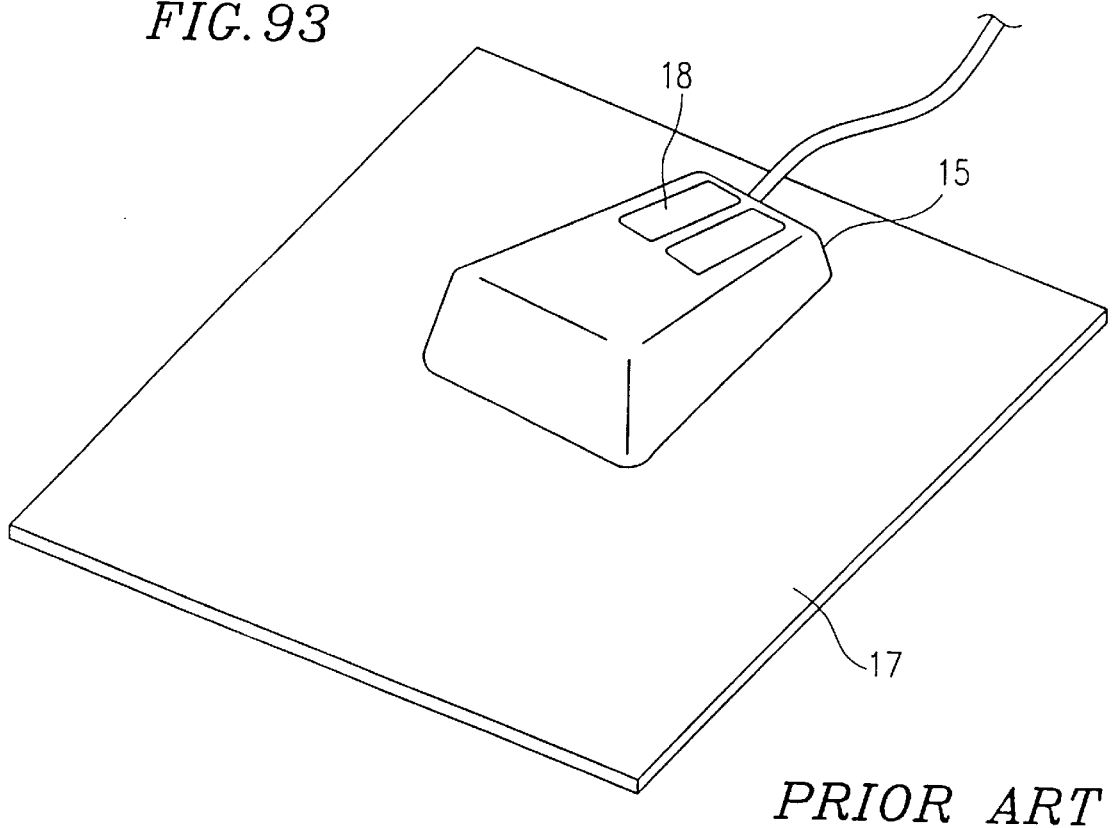
FIG. 93 is a perspective view of a conventional mouse.
Figure 94:
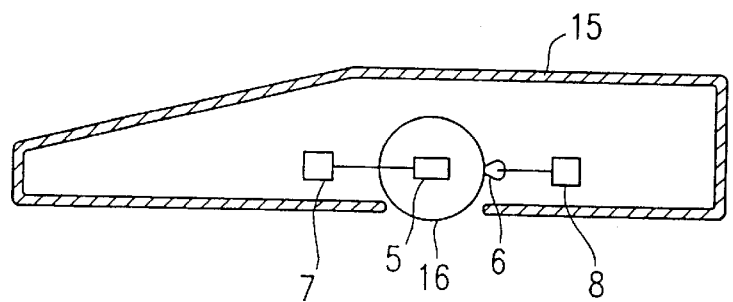
FIG. 94 is a sectional view of the mouse.
Figure 95A:
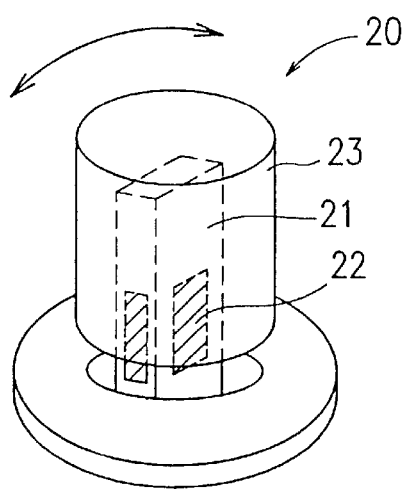
FIGS. 95A and 95B are perspective views of a conventional pointing stick and the interior of the pointing stick, respectively.
Figure 95B:
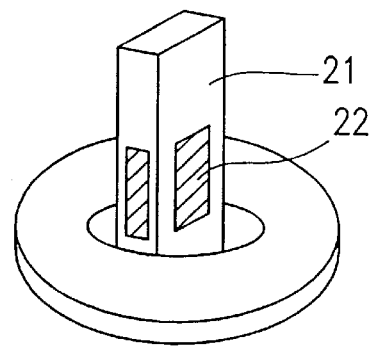
Figure 96A:
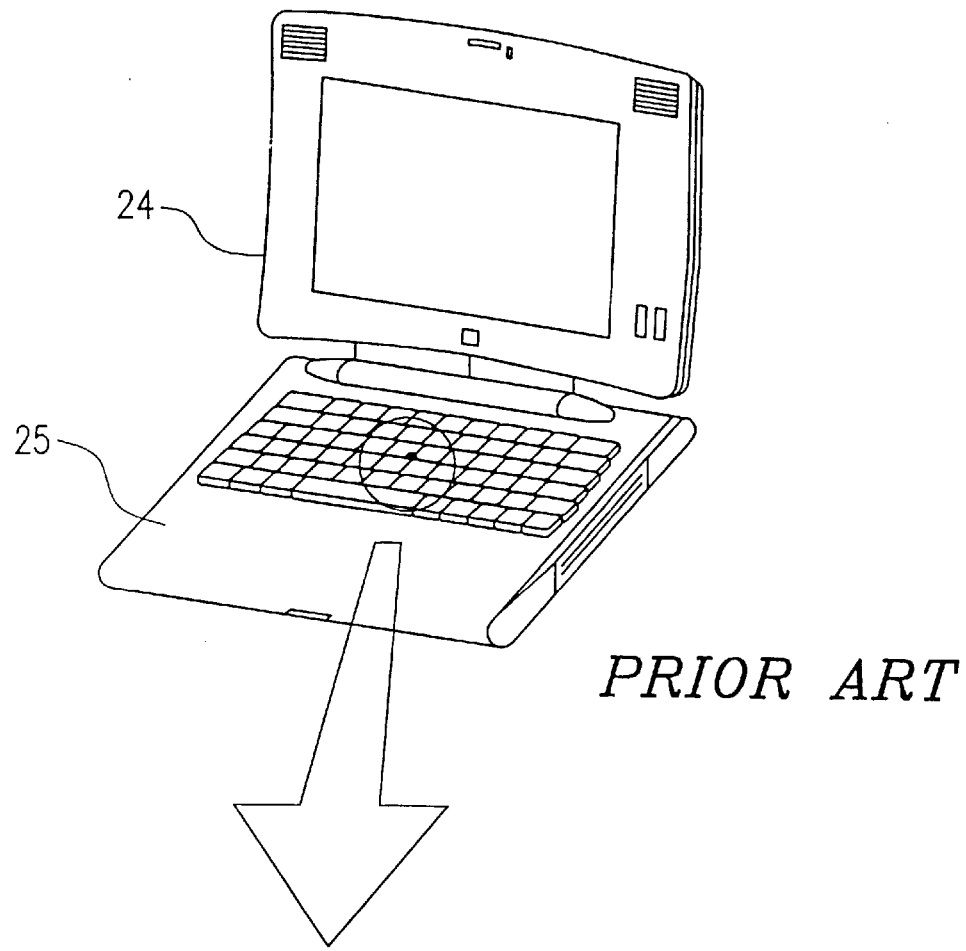
FIGS. 96A and 96B are perspective views of a personal computer provided with the pointing stick.
Figure 96B:
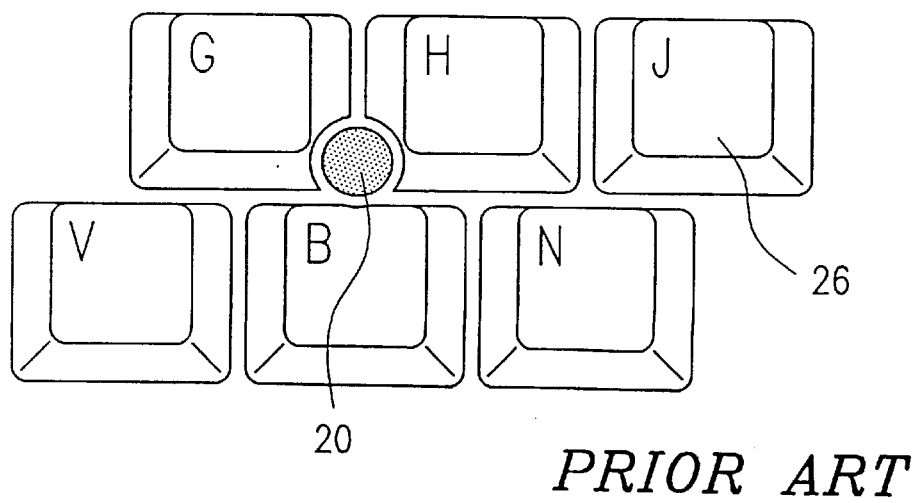

When a load is applied in the Z-axis direction, as well as in a two-dimensional direction, d' is smaller compared with the case where no load is applied in the Z-axis direction. Thus, the $\Delta L'$ is larger when $\Delta L$ is unchanged. In other words, as shown in FIG. 90A, the unit change amount in the S-shaped curve of the outputs $V_X$ and $V_Y$ in the X-axis and Y-axis directions with respect to the displacement $\Delta L$ when a load is applied in the Z-axis direction differs from that when no load is applied in the Z-axis direction. Referring to FIG. 90A, when a load is applied in the Z-axis direction, the sensitivity is higher by b/a than in the case where no load is applied. This changes the outputs in the X-axis and Y-axis directions depending on whether or not a load is applied in the Z-axis direction, and thus lowers the operability. In order to solve this problem, the values $V_X$ and $V_Y$ are multiplied by a correction coefficient obtained based on Formula (34), so as to stabilize the changes of the outputs $V_X$ and $V_Y$ in the X-axis and Y-axis directions within the linear range of the S-shaped curve with respect to the displacement ΔL irrelevant of the displacement in the Z-axis direction, as shown in FIG. 90B. Thus, an appropriate operability can be obtained.

For example, when the distance d' between the pinhole 1393 and the light emitting element 1221 is reduced to a half, the total received light amount of the light receiving element 1222 becomes quadruple. At this time, the sensitivity to the displacement ΔL of the outputs $V_X$ and $V_Y$ in the X-axis and Y-axis directions also becomes quadruple. The change of the distance d' is detected by monitoring the total light amount received by the light receiving element 1222, and the outputs $V_X$ and $V_Y$ are multiplied by a correction coefficient when a change is detected. In this case, the outputs $V_X$ and $V_Y$ are multiplied by ¼, so as to obtain the equal sensitivity to the displacement ΔL of the outputs $V_X$ and $V_Y$ obtained when no load is applied in the Z-axis direction.

Once the outputs of the optical sensor S corresponding to the displacements in the three-axial directions are obtained as described above, the X-axis, Y-axis, and Z-axis direction outputs are obtained in accordance with the signal processing technique described in Example 12, so as to calculate the direction and amount of the load applied to the movable body 1220. Thus, the three-dimensional shift of the cursor 1262 is controlled. The above structure eliminates the necessity of arranging the light emitting element 1221 and the light receiving element 1222 in line. In other words, since only a space for either one of the elements 1221 and 1222 is enough, the movable body 1220 can be made slim, and thus the input device (pointing device) can be made smaller.

Also, as described in Example 12, a temporal element may be added to the operation in the Z-axis direction, so as to provide the input device with the click function. Alternatively, instead of the three-dimensional input function, the two-dimensional input function and the click function may be combined.

In Example 13, instead of disposing the light emitting element 1221 in the movable section 1224, the light emitting element 1221 may be disposed in the fixing section 1225 and an optical guide for guiding light from the light emitting element 1221 to the top portion 1233 of the movable section 1224 may be disposed in the movable section 1224. In this alternative case, the height, as well as the width, of the movable body 1220 can be made smaller. Thus, a small-size input device can be provided. Alternatively, the light receiving element 1222 may be disposed on the movable section 1224, while the light emitting element 1221 may be disposed on the fixing section 1225.

The input devices of Examples 12 and 13 can be modified and changed within the scope of the present invention. For example, in the above examples, the movable section and the fixing section of the movable body are molded with different materials. However, it is possible to mold the movable section and the fixing section with the same material satisfying the conditions of the hardness and the elastic modulus both for the rigid portion and the elastic portion. This reduces the material cost.

A two-dimensional PSD may be used as the light receiving element in place of the quartered photodiode. When light reflected by the reflection surface of the movable body reaches the PSD, electric charges are generated at the light incident position in proportion to the light energy. The charges are output as currents. Based on the currents, the light incident position on the PSD can be determined, so as to obtain the outputs in the X-axis and Y-axis directions. The output in the Z-axis direction is also obtained from the total output current, and thus the three-dimensional input is possible. Alternatively, four photodiodes may be disposed along the X-axis and Y-axis with respect to an LED as the light emitting element so as to surround the LED.

The input device (pointing device) may also be placed somewhere other than on the keyboard as in the above examples, and used as a substitute of a joystick or a mouse of a computer game machine or for a navigation system requiring switching and directional instruction. It is also possible to use the input device for the communications with the computer body via a connector as in the case of the mouse.

As is apparent from the above description, the input device of the present invention integrally includes the movable body capable of displacing three-dimensionally upon receipt of a load in a three-dimensional direction and the optical section regulating light emitted from the light emitting element toward the light receiving element, so as to be provided with the three-dimensional input function and the click function. With this structure, it is possible to achieve a multi-functional output device having many functions. This makes it possible to obtain a small-size apparatus such as a computer with a reduced space required.

Since the detection of the displacement of the movable body is performed by the non-contact optical method, no mechanical operation portion is involved. Thus, an input device with uniform detection precision and high reliability can be provided. Also, an input device where the input processing of the outputs from the light receiving element is easy and the total cost is small can be realized.

Either the light emitting element or the light receiving element may be disposed on the movable section. With this structure, the area where the elements are disposed can be reduced compared with the case where the light emitting element and the light receiving element are arranged in line, allowing for reducing a space required.

Either the movable section or the fixing section is made rigid while the other section is made elastic. It is ensured, therefore, that the movable body is displaced three-dimensionally upon the application of a load to the movable body so as to effect the input as desired.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An input device for a computer comprising:
   a reflection type optical sensor having a light emitter and a light receiver;
   an operation section disposed facing the optical sensor, the operation section being tilted when a load is applied thereto; and
   output means for detecting a tilt status of the operation section based on signals from the light receiver and outputting detected results to a computer body as positional information, wherein the light receiver includes a both-side division type position sensitive detector for two-dimensional position detection,
   wherein the reflection type optical sensor further includes a light shader having a hole disposed therein at a position facing the light receiver, for shading the light receiver from light other than light reflected according to the position of the operation section, whereby the reflected light forms a light spot on the light receiver, and wherein the both-side division type position sensitive detector generates plural outputs by division of a photoelectric current between plural output electrodes, a division ratio of the outputs indicating the position of the light spot relative to each electrode.

2. An input device according to claim 1, wherein a light emitted by the light emitter is reflected from the operation section, and wherein the light receiver receives the reflected light and outputs the signal in accordance with the amount of the received light.

3. An input device according to claim 1, wherein the device further includes a light shader having a hole disposed at a position facing the position sensitive detector, the hole allowing the reflected light to be incident on the both side division type position sensitive detector.

4. An input device according to claim 1, wherein the light receiver includes a plurality of light receiving elements, and the plurality of light receiving elements are arranged around the light emitter.

5. An input device according to claim 1, wherein the operation section is of a dome shape and has a reflection plate formed on an inner surface of the operation section.

6. An input device according to claim 1, wherein the operation section is of a stick shape and has a reflection plate formed on a bottom end of the operation section.

7. An input device according to claim 1, further comprising shift means for controlling the shift of a cursor on a display of the computer body according to the tilt status of the operation section.

8. An input device according to claim 1, wherein the operation section is movable closer to or away from the optical sensor, and the input device further comprises click means for outputting a further signal to the computer body when the operation section is closer to the optical sensor.

9. An input device according to claim 1, wherein the light emitter emits light intermittently.

10. An input device according to claim 1, wherein the operation section is movable vertically, and the output means detects a vertical position, in addition to the tilt status, of the operation section based on the signals from the light receiver, so as to output detected results as three-dimensional positional information.

11. An input device according to claim 10, wherein the light receiver includes a position sensitive detector for one-dimensional positional detection and the both-side division type position sensitive detector for two-dimensional positional detection, and a light shader having a hole is disposed facing each of the position sensitive detectors, the hole allowing the light which is emitted by the light receiver and is reflected from the operation section to be incident on the each of the position sensitive detectors.

12. An input device according to claim 10, wherein the light receiver includes a plurality of position sensitive detectors for one-dimensional positional detection, and two of the plurality of position sensitive detectors are disposed along directions crossing each other at right angles.

13. An input device according to claim 10, further comprising shift means for shifting a cursor on a display of the computer body three-dimensionally according to the three-dimensional positional information from the output means.

14. An input device for a computer comprising:
light emitting means for emitting a light;
two position sensitive detectors for optically detecting a position on which the light is incident and outputting signals in accordance with a detection result;
output means for outputting to a computer body screen input information based on the signals from the two position sensitive detectors, wherein the two position sensitive detectors are both-side division type position sensitive detectors for two dimensional position detection; and
a light shader having two holes disposed at positions facing the two detectors, for shading the detectors from light other than light reflected according to the detected position, whereby the reflected light forms a light spot on each detector,
wherein each both side division type position sensitive detector each generate plural outputs by division of a photoelectric current between plural output electrodes, a division ratio of the outputs indicating the position of the light spot relative to each electrode.

15. An input device according to claim 14, further comprising shift means for controlling the shift of a cursor on a display of the computer body based on the screen input information.

16. An input device according to claim 14, wherein the light emitting means is a light emitting element, and the light emitting element and the two position sensitive detectors are integrally incorporated in the computer body.

17. An input device according to claim 14, further comprising input means for displaying a character on the display of the computer body based on the screen input information.

18. An input device for a computer having a three-dimensional input function for a display of the computer, comprising:
a moveable body which displaces three-dimensionally upon receipt of a load in a three-dimensional direction;
a light emitting element for emitting light;
a light receiving element optically coupled with the light emitting element for receiving an image of the light shifting in association with the displacement of the movable body;
an optical section for regulating the light passing toward the light receiving element,
wherein the light emitting element, the light receiving element, and the optical section are integrally formed; and
a light shader having a hole disposed therein at a position facing light receiving element, for shading the light receiving element from light other than light reflected according to a position of the moveable body, whereby the reflected light forms a light spot on the light reflecting element,
wherein the light receiving element includes a both side division type position sensitive detector for two-dimensional position detection, the both side division type position sensitive detector generating plural outputs by division of a photoelectric current between plural output electrodes, a division ratio of the outputs indicating the position of the light spot relative to each electrode.

19. An input device according to claim 18, wherein the movable body includes a movable section which displaces by an operation of a user and a fixing section for supporting the movable section, and the light emitting element, the light receiving element, and the optical section integrally constitute a reflection type optical sensor which is disposed on either the movable section or the fixing section, while the other section has a reflection surface so as to face the optical sensor.

20. An input device according to claim 19, wherein the optical section includes a converging lens and a light shader for restricting light reflected by the reflection surface and passing toward the light receiving element.

21. An input device according to claim 18, wherein the light emitting element and the light receiving element are disposed to face each other, at least one of the light emitting element and the light receiving element is disposed on the movable body, and a light shader is disposed between the light emitting element and the light receiving element so as to restrict an image of the light from the light emitting element to guide the light to the light receiving element.

22. An input device according to claim 21, wherein the movable body includes a movable section which displaces by an operation of a user and a fixing section for supporting the movable section, the light emitting element is disposed on the movable section, and the light receiving element and the light shader having a pinhole are disposed on the fixing section.

23. An input device according to claim 18, wherein at least one of the movable section and the fixing section has an elastic body.

24. An input device according to claim 18, further comprising click means for outputting an ON/OFF signal according to a vertical displacement of the movable body.

25. An input processing method for an input device for a computer, comprising the steps of:

detecting an image of light shifting in association with a movable body displaced by a three-dimensional operation;

determining a first direction output amount and a second direction output amount from the shift of the image of the light according to a two-dimensional displacement among the displacement by the three-dimensional operation;

determining a third direction output amount from a change of the amount of the light according to a remaining one-directional displacement; and calculating a direction and amount of the three-dimensional operation from the first direction output amount, the second direction output amount, and the third direction output amount, wherein the step of detecting an image of light by:

using a light shader having a hole disposed therein at a position facing a light receiver, for shading the light receiver from light other than light reflected according to a position of the movable body, whereby the reflected light forms a light spot on the light receiver; and using a both side division type position sensitive detector as the light receiver, and generating plural outputs by division of a photoelectric current between plural output electrodes, a division ratio of the outputs indicating the position of the light spot relative to each electrode.

26. An input processing method according to claim 25, further comprising the step of judging ON/OFF from the third direction output amount so as to provide the input device with a click operation.

27. An input processing method for an input device for a computer, comprising the steps of:

detecting an image of light shifting in association with a movable body displaced by a three-dimensional operation by a user;

determining a first direction output amount and a second direction output amount from the shift of the image of the light according to a two-dimensional displacement among the displacement by the three-dimensional operation;

determining a third direction output amount from a change of the amount of the light according to a remaining one-directional displacement; and calculating a direction and amount of the two-dimensional operation from the first direction output amount and the second direction output amount, and judging ON/OFF for a click function from the third direction output amount, wherein the step of detecting an image of light includes detecting light by:

using a light shader having a hole disposed therein at a position facing a light receiver, for shading the light receiver from light other than light reflected according to a position of the movable body, whereby the reflected light forms a light spot on the light receiver; and using a both side division type position sensitive detector as the light receiver, and generating plural outputs by division of a photoelectric current between plural output electrodes, a division ratio of the outputs indicating the position of the light spot relative to each electrode.

* * * * *